(12) United States Patent
Kojima et al.

(10) Patent No.: US 6,366,542 B1
(45) Date of Patent: Apr. 2, 2002

(54) OPTICAL PICKUP APPARATUS AND OBJECTIVE LENS

(75) Inventors: Toshiyuki Kojima; Norikazu Arai, both of Tokyo (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 09/712,122

(22) Filed: Nov. 15, 2000

(30) Foreign Application Priority Data

Nov. 17, 1999 (JP) ............................................ 11-326728
Jan. 26, 2000 (JP) ...................................... 2000-017435

(51) Int. Cl.$^7$ ................................................ G11B 7/12
(52) U.S. Cl. ............................... 369/44.23; 369/112.01; 369/112.23
(58) Field of Search ........................... 369/44.11, 44.12, 369/44.23, 44.24, 44.25, 44.27, 112.01, 112.08, 112.13, 112.2, 112.23, 112.25

(56) References Cited

U.S. PATENT DOCUMENTS

| | | | |
|---|---|---|---|
| 5,757,758 A | * 5/1998 | Yagi et al. | 369/112.25 |
| 6,049,519 A | * 4/2000 | Arai et al. | 369/112.24 |
| 6,229,778 B1 | * 5/2001 | Ikegame et al. | 369/53.22 |

\* cited by examiner

*Primary Examiner*—Muhammad Edun
(74) *Attorney, Agent, or Firm*—Finnegan, Henderson, Farabow, Garrett & Dunner, L.L.P.

(57) ABSTRACT

An optical pickup apparatus to conduct reproducing and/or recording information of an optical information recording medium, comprises a light source to emit a light flux having a wavelength of λ (nm); a converging optical system to converge the light flux emitted from the light source onto a information recording surface of the optical information recording medium, the converging optical system having an objective lens; and an optical detector to receive reflected light from the optical information recording medium. The objective lens is a plastic lens, has a diffracting section on at least one surface thereof and satisfies the following conditional formula: $0.3 \leq \phi R/\phi \leq 1.5$ where $\phi R$ represents a refracting power of the objective lens on wavelength λ (nm) of the light source and φ represents a power of the objective lens in wavelength λ nm of the light source.

35 Claims, 38 Drawing Sheets

FIG. 9
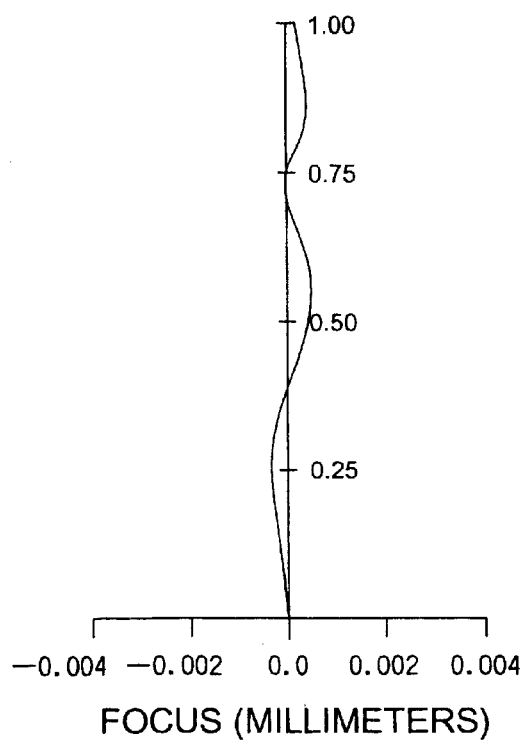
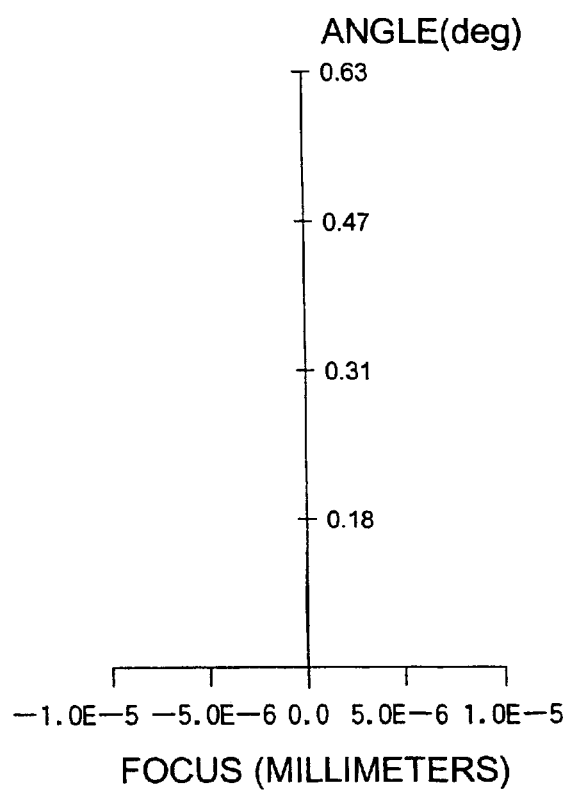

FIG. 11
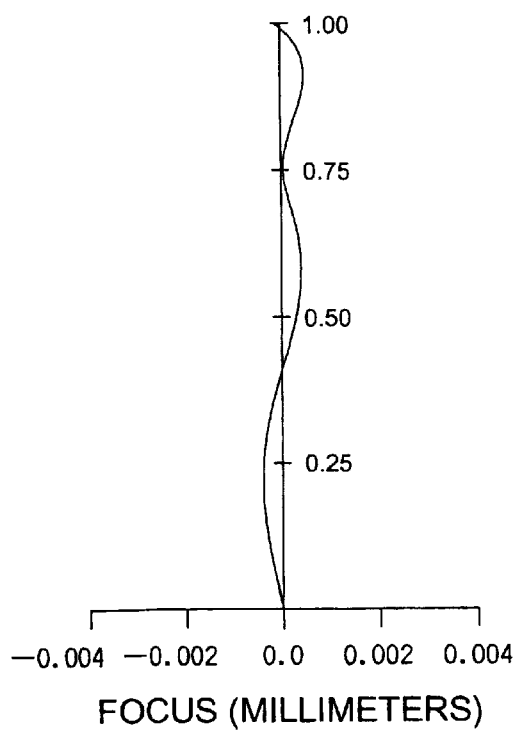
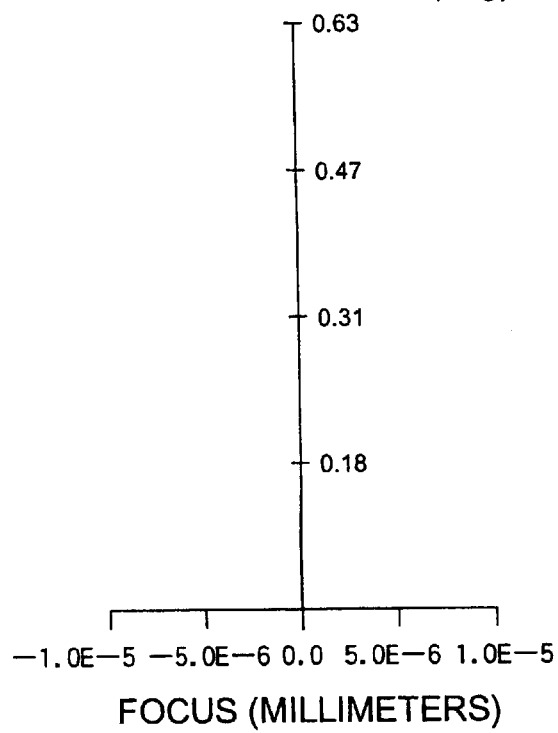

FIG. 17
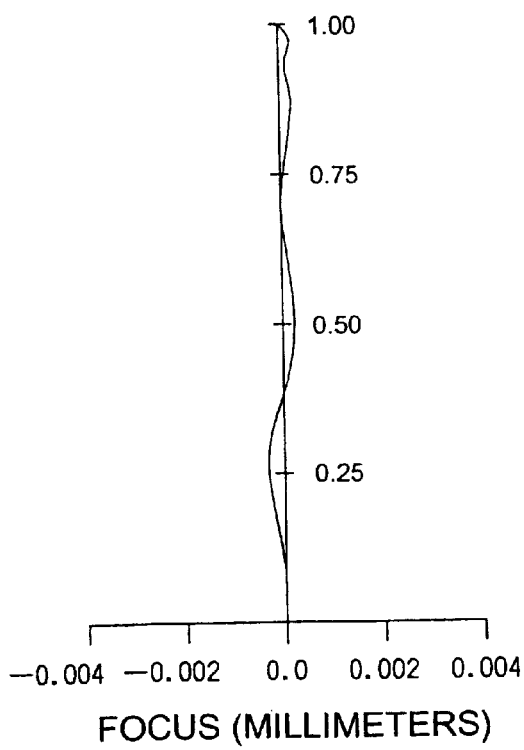
LONGITUDINAL
SPHERICAL ABER
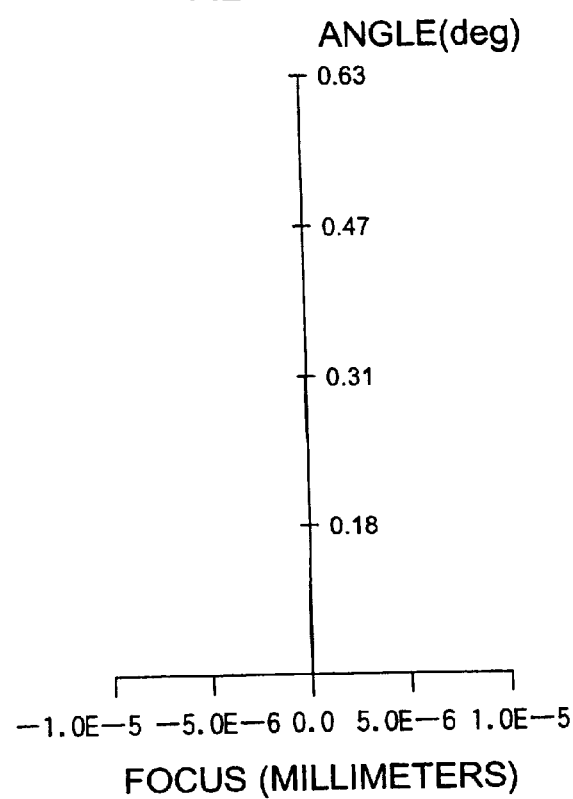
ASTIGMATIC
FIELD CURVES

FIG. 19
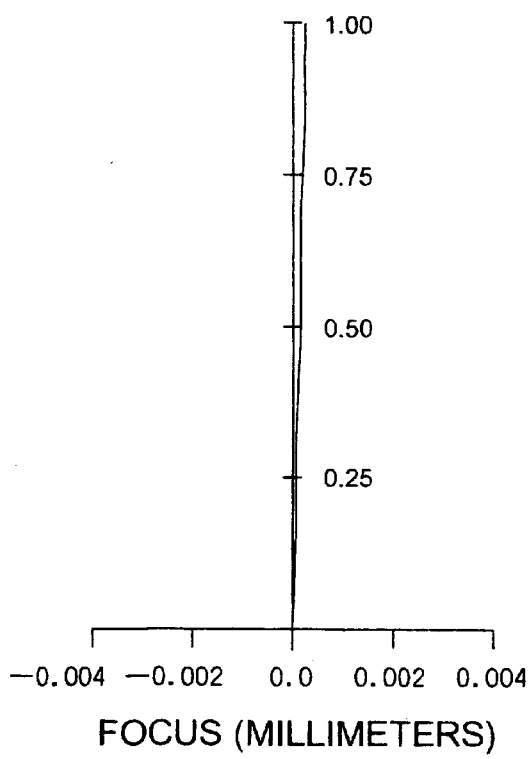
LONGITUDINAL SPHERICAL ABER
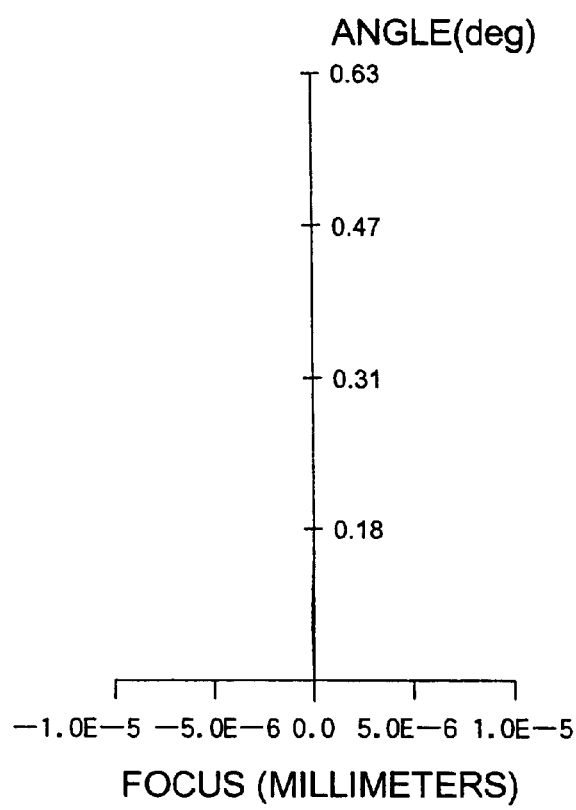
ASTIGMATIC FIELD CURVES

OPTICAL PICKUP APPARATUS AND OBJECTIVE LENS

BACKGROUND OF THE INVENTION

The present invention relates to an optical pickup apparatus and a resin-made objective lens, and in particular, to an objective lens improved in terms of temperature characteristics and aberrations and to an optical pickup apparatus which employs the objective lens mentioned above and is used favorably for recording and/or reproducing an optical information recording medium.

As an optical system for recording and reproducing an optical information recording medium having accuracy required for a conventional CD reproducing apparatus (incidentally, the optical system for recording and reproducing mentioned in the present specification includes an optical system for recording, an optical system for reproducing, an optical system for recording and reproducing, or an apparatus employing them), an optical system of an infinite conjugation type is disclosed in TOKKAISHO No. 57-76512, and an optical system of a finite conjugation type is disclosed in TOKKAISHO No. 61-56314. Further, TOKKAIHEI No. 6-258573 discloses one employing a coupling lens for reducing occurrence of aberrations which are caused by temperature changes when a resin-made objective lens is used. In recent years, however, a lens made of resin (plastic) material is commonly used for the requirement of low cost with regard to an optical system for recording and reproducing, especially to an objective lens for the optical system for recording and reproducing.

However, an objective lens made of resin materials has a problem that an aberration generated by refractive index changes caused by temperature changes is greater than that for a lens made of glass material. In general, a refractive index change for resin materials is ten times or more that for glass materials. When ΔT represents a difference of temperature between standard design temperature and actual ambient temperature used, an aberration is changed by this temperature difference ΔT is mainly third order spherical aberration. When SA represents third order spherical aberration components of wavefront aberration expressed in an rms value, a sign is defined so that SA is greater than zero when spherical aberration is positive (over) and SA is smaller than zero when spherical aberration is negative (under). It is possible to express third order spherical aberration ΔSA rms that changes depending on temperature change ΔT with the following expression, by using numerical aperture NA of an objective lens on the optical information recording medium side (image side), focal length f, image forming magnification m, factor of proportionality k and wavelength of light λ.

$$\Delta SA/\Delta T = k \cdot f(1-m)4(NA)4/\lambda \quad (1)$$

Incidentally, when a lens made of resin materials has positive refracting power, the third order spherical aberration turns out to be over when a temperature rises. Namely, in the above expression (1), factor of proportionality k takes a positive value. When a single lens made of resin materials is made to be an objective lens, the factor of proportionality k takes a large positive value.

In the objective lens for a compact disk that is presently used commonly, aberrations generated by changes in ambient temperatures used do not go up to the problematic level, because NA is about 0.45. However, at the present time wherein optical information recording media are in the trend toward high density, an objective lens constituting an optical system of an apparatus for recording and reproducing is also requested to comply with the trend of high density.

To be concrete, there has been developed, as an optical information recording medium, a DVD (storage capacity: 640 MB) which is similar to CD (storage capacity: 4.7 GB) in terms of size and has been enhanced in terms of recording density, and the DVD is spreading rapidly. For reproducing the DVD, it is general to use a laser beam with prescribed wavelength emitted from a light source whose wavelength is within a range from 635 nm to 660 nm. Further, it is general that a divergent light flux emitted from a laser light source is collimated by a collimator lens, then, is made to enter an objective lens whose NA on the DVD side is 0.6 or more, and is converged on an information recording surface through a transparent base board of DVD.

In recent years, in particular, an optical information recording medium which is the same as CD and DVD having a storage capacity of 10–30 GB is being developed actively by using an objective lens having higher NA and a light source having a shorter wavelength. As a light source having a short wavelength which is considered to be promising, there are available GaN blue semiconductor laser-with oscillation wavelength of about 400 nm and SHG blue laser. Namely, an optical system in an apparatus for recording and reproducing is requested to have high NA and requested to comply with a laser beam whose wavelength is further short.

In consideration of the foregoing from the viewpoint of wavefront aberration, when NA is increased from 0.45 to 0.6 and wavelength λ of the laser beam is shortened from 660 nm to 400 nm, for example, wavefront aberration Wrms is increased by (0.6/0.45)4÷400/660=5.17 times.

Though it is considered that focal length f is made small for controlling wavefront aberration to be small based on expression (1), it is actually difficult to make f to be smaller than the current size, because of necessity to secure a focusing operation distance. Further, in the optical system of a finite conjugation type of m<0 and in the optical system of a infinite conjugation type of m=0, aberrations caused by temperature changes are serious problems in the case of high NA. Though it is considered that temperature characteristics are improved by realizing 0<m<1 in the optical system employing a coupling lens, there is a problem, in this case, that the optical system, and further, the apparatus need to be large in size, because a distance between a subject and an image of an optical system needs to be increased in length, or a coupling lens with high NA is needed, for securing an operation distance necessary for focusing.

As stated above, it has been difficult to realize an optical system having high NA in the lens system wherein a conventional resin-made objective lens is used, because of occurrence of an aberration that is in proportion to $4^{th}$ power of numerical aperture NA of an objective lens on the image side caused by refractive index change Δn of resin material that is further caused by temperature change.

In the optical system of an optical information recording and reproducing apparatus that is requested to attain high density information recording by the short wavelength of a laser light source and by high NA, it is unavoidable to give up the use of resin-made objective lens and to use a glass-mold lens or a glass combined lens wherein a refractive index change for temperature change is small but the cost is high.

For the problems mentioned above, TOKKAIHEI No. 11-337818, for example, discloses a technology for correcting aberrations for temperature change by providing a diffraction lens structure having a prescribed spherical aberration characteristics on an objective lens for an optical head.

However, there also is a demand to reduce the number of lenses in a light-converging optical system for the purpose of achieving compactness and low cost of a recording and reproducing apparatus for an optical information recording medium. To satisfy this demand, it is necessary to constitute an optical system of the so-called finite conjugation type by the use of a single objective lens. However, the objective lens disclosed in TOKKAIHEI No. 11-337818 does not comply with the optical system of a finite conjugation type.

SUMMARY OF THE INVENTION

In an objective lens for a recording and reproducing apparatus (optical pickup apparatus) for an optical information recording medium, an object of the invention is to provide a resin-made objective lens that can secure sufficient capacity for a change of ambient temperature used even when a light source of the apparatus is an SHG laser whose oscillation wavelength is not changed by a change of ambient temperature used, or a semiconductor laser whose oscillation wavelength is changed, or to provide an objective lens including at least one lens made of resin material, and an optical pickup apparatus employing the objective lens mentioned above. Namely, the object is to provide an objective lens, an optical pickup apparatus and a recording and reproducing apparatus for an optical information recording medium which can lessen a change in third order spherical aberration and further a change in spherical aberration for a change of ambient temperature used, independently of the types of a laser light source.

An object of the invention is to provide an objective lens that is made of resin materials capable of securing sufficient capacity for a change of ambient temperature used and is able to constitute an optical system of a finite conjugation type, and to provide an optical pickup apparatus employing the objective lens stated above.

The above object can be attained by the following structures.

(1-1) An optical pickup apparatus to conduct reproducing and/or recording information of an optical information recording medium, comprises:

a light source to emit a light flux having a wavelength of $\lambda$ (nm);

a converging optical system to converge the light flux emitted from the light source onto a information recording surface of the optical information recording medium, the converging optical system having an objective lens; and an optical detector to receive reflected light from the optical information recording medium; wherein the objective lens is a plastic lens, has a diffracting section on at least one surface thereof and satisfies the following conditional formula:

$$0.3 \leq \phi R/\phi \leq 1.5$$

where $\phi R$ represents a refracting power of the objective lens on wavelength $\lambda$ (nm) of the light source and $\phi$ represents a power of the objective lens in wavelength $\lambda$ nm of the light source.

(1-2) In the optical pickup apparatus of (1-1), the following conditional formula is satisfied:

$$(\Delta SA2/\Delta \lambda 1) \times (\Delta SA1/\Delta T) < 0 \ \lambda rms^2/(°C \cdot nm)$$

where $\Delta SA2$ represents a fluctuation amount of third order axial spherical aberration of the objective lens for wavelength variation $\Delta, \lambda 1$ (nm) within a range of ±5 nm in wavelength $\lambda$ (nm) of a light source, and $\Delta SA1$ represents a fluctuation amount of third order axial spherical aberration of the objective lens for temperature variation $\Delta T(°C)$ within a range of 20° C. to 30° C. for ambient temperature, wherein a value of $(\Delta SA2/\Delta \lambda 1)$ is under a constant temperature and a value of $(\Delta SA1/\Delta T)$ is under a constant wavelength.

(1-3) in the optical pickup apparatus of (1-2), a numerical aperture NA of the objective lens at the optical information recording medium-side is not smaller than 0.58 and an image forming magnification mo1 of the objective lens is almost 0 (zero).

(1-4) In the optical pickup apparatus of (1-2), the image forming magnification mo1 of the objective lens satisfies the following conditional formula:

$$-\tfrac{1}{2} \leq mo1 \leq -\tfrac{1}{7.5}$$

(1-5) In the optical pickup apparatus of (1-2), the following conditional formula is satisfied:

$$\Delta SA2/\Delta \lambda 1 < 0 \ \lambda rms/nm$$

$$\Delta SA1/\Delta T > 0 \ \lambda rms/°C.$$

(1-6) In the optical pickup apparatus of (1-1), the following conditional formula is satisfied:

$$|\Delta SA1/\Delta T| \leq 0.001 \ \lambda rms/°C.$$

where $\Delta SA1$ represents a fluctuation amount of third order axial spherical aberration of the objective lens for temperature variation $\Delta T(°C)$ within a range of 20° C. to 30° C. for ambient temperature, wherein a value of $(\Delta SA1/\Delta T)$ is under a constant wavelength.

(1-7) In the optical pickup apparatus of (1-6), the following conditional formula is satisfied:

$$|\Delta SA1/\Delta T| \leq 0.004 \ \lambda rms/°C.$$

(1-8) In the optical pickup apparatus of (1-6), a numerical aperture NA of the objective lens at the optical information recording medium-side is not smaller than 0.58 and an image forming magnification mo1 of the objective lens is almost 0 (zero).

(1-9) In the optical pickup apparatus of (1-6), the wavelength $\lambda$ (nm) of the light source is not larger than 680 (nm).

(1-10) In the optical pickup apparatus of (1-6), a numerical aperture NA of the objective lens at the optical information recording medium-side is not smaller than 0.48 and smaller than 0.58, an image forming magnification mo1 of the objective lens is almost 0 (zero), and the following conditional formula is satisfied:

$$|\Delta SA1/\Delta T| \leq 0.0004 \ \lambda rms/°C.$$

(1-11) In the optical pickup apparatus of (1-6), a numerical aperture NA of the objective lens at the optical information recording medium-side is not smaller than 0.49, an image forming magnification mo1 of the objective lens satisfies the following conditional formula:

$$-\tfrac{1}{2} \leq mo1 \leq -\tfrac{1}{7.5}$$

and the following conditional formula is satisfied.

$$|\Delta SA1/\Delta T| \leq 0.0005 \ \lambda rms/°C.$$

(1-12) In the optical pickup apparatus of (1-11), the objective lens is shiftable in a direction perpendicular to an optical axis thereof, a relative position between the objective lens and the light source is changeable and an astigmatism component of a wavefront aberration of a light flux which have been emitted from the light source and have passed through the objective lens becomes smallest at a position where the optical axis of the objective lens deviates from a center of the light flux of the light source.

(1-13) In the optical pickup apparatus of (1-11), the following conditional formula is satisfied:

$$10 \text{ mm} < U < 40 \text{ mm}$$

where U is a distance of an optical path between the light source and a information recording surface of the optical information recording medium.

(1-14) In the optical pickup apparatus of (1-11), the optical pickup apparatus is an optical pickup apparatus to conduct reproducing and/or recording information of a first information recording medium including a transparent base plate having a thickness of t1 and a second information recording medium including a transparent base plate having a thickness of t2 (t2>t1) and further comprises a second light source to emit a second light flux having a wavelength of $\lambda 2$ ($\lambda < \lambda 2$) in addition to the light source to emit the light flux having the wavelength of $\lambda$;

the converging optical system converges light flux emitted from the light source or the second light source onto an information recording surface of the first optical information recording medium or the second optical information recording medium;

the optical detector receives reflected light from the first optical information recording medium or the second optical information recording medium;

the NA is a numerical aperture of the objective lens at the first optical information recording medium-side and necessary to record or reproduce information in the first optical information recording medium with the light flux of the wavelength of $\lambda$;

the NA2 (NA2<NA) is a numerical aperture of the objective lens at the second optical information recording medium-side and necessary to record or reproduce information in the second optical information recording medium with the light flux of the wavelength of $\lambda 2$;

the mo1 is the image forming magnification when recording or reproducing information in the first optical information recording medium; and the following conditional formula is satisfied:

$$NA \geq 0.56$$

$$-\frac{1}{5} \leq mo1 \leq -\frac{1}{7.5}$$

(1-15) In the optical pickup apparatus of (1-14), wherein the following conditional formula is satisfied:

$$|mo2-mo1|<0.1$$

where mo2 is a image forming magnification when recording or reproducing the second optical information recording medium.

(1-16) In the optical pickup apparatus of (1-1), the following conditional formula is satisfied:

$$0 \text{ nm}/^\circ \text{C.} < \Delta\lambda 2/\Delta T \leq 0.5 \text{ nm}/^\circ \text{C.}$$

where $\Delta\lambda 2$ (nm) represents a wavelength variation amount of the light source for temperature variation $\Delta T(^\circ \text{C.})$ within a range of 20° C. to 30° C. of ambient temperature.

(1-17) In the optical pickup apparatus of (1-1), the following conditional formula is satisfied:

$$-0.002/^\circ \text{C.} \leq \Delta n/\Delta T \leq -0.00005/^\circ \text{C.}$$

where $\Delta n$ represents a refractive index variation amount of the objective lens for temperature variation $\Delta T(^\circ \text{C.})$ within a range of 20° C. to 30° C. of ambient temperature.

(1-18) In the optical pickup apparatus of (1-17), the following conditional formula is satisfied:

$$-0.0002/^\circ \text{C.} < \Delta n/\Delta T < -0.00005/^\circ \text{C.}$$

(1-19) In the optical pickup apparatus of (1-1), the wavelength $\lambda$ of the light source and the numerical aperture NA of the objective lens at the optical information recording medium-side satisfy the following conditional formula:

$$0.00015/\text{nm} \leq (NA)^4/\lambda \leq 40/\text{nm}$$

(1-20) In the optical pickup apparatus of (1-1), the wavelength $\lambda$ of the light source and the numerical aperture NA of the objective lens at the optical information recording medium-side satisfy the following conditional formula:

$$10 \text{ nm} \leq \lambda/NA \leq 1100 \text{ nm}$$

(1-21) In the optical pickup apparatus of (1-1), the following conditional formula is satisfied:

$$|\Delta SA2/\Delta\lambda 1| \leq 0.10 \text{ } \lambda\text{rms/nm}$$

where $\Delta SA2$ represents a fluctuation amount of third order axial spherical aberration of the objective lens for wavelength variation $\Delta\lambda 1$ nm within a range of ±5 nm in wavelength $\lambda$ nm of the light source, wherein $\Delta SA2/\Delta\lambda$ is a value under a constant temperature.

(1-22) In the optical pickup apparatus of (1-1), the following conditional formula is satisfied:

$$|\Delta f/\Delta\lambda 1| \leq 200$$

where $\Delta f$ ($\mu$m) represents a focus position variation amount of the objective lens for wavelength variation $\Delta\lambda 1$ nm within a range of ±5 nm of wavelength $\lambda$ nm of the light source.

(1-23) In the optical pickup apparatus of (1-1), at least one surface of the objective lens is an aspherical surface.

(1-24) In the optical pickup apparatus of (1-1), the diffracting section is a plurality of ring-shaped bands in a form of concentric circles whose centers are mostly on an optical axis of the objective lens, and an optical path difference function showing a position of each of the plurality of ring-shaped bands includes at least $6^{th}$ power term of power series.

(1-25) In the optical pickup apparatus of (1-1), the objective lens is a single lens.

(1-26) In the optical pickup apparatus of (1-1), the following conditional formula is satisfied:

$$1.0 \leq r1/\{(n-1) \cdot fR\} \leq 1.2$$

where r1 (mm) represents an axial radius of curvature on the base surface of the objective lens at an opposite side to an optical information recording medium-side, n represents a refractive index of the objective lens and fR (mm) represents a focal length for refraction of the objective lens.

(1-27) In the optical pickup apparatus of (1-1), the objective lens is made of either one of polyolefin resin, norbornane resin and fluorine resin.

(1-28) In the optical pickup apparatus of (1-1), an axial spherical aberration change amount caused by ambient temperature variation is corrected by making at least one surface of the objective lens to be an aspherical surface and a spherical aberration is corrected by providing a diffracting section on at least one surface of the objective lens.

(1-29) In the optical pickup apparatus of (1-1), when a numerical aperture of the objective lens at the optical information recording medium-side necessary to conduct recording and reproducing the optical information recording medium with the light flux of the wavelength λ is NA, and when a light flux which is emitted from the light source under ambient temperature of 20° C. to 30° C., is inside of NA and is converged on a information recording surface of the optical information recording medium, an absolute value of a third order axial spherical aberration is not larger than 0.074 λrms.

(1-30) In the optical pickup apparatus of (1-1), the optical pickup apparatus is an optical pickup apparatus to conduct reproducing and/or recording information of a first information recording medium including a transparent base plate having a thickness of t1 and a second information recording medium including a transparent base plate having a thickness of t2 (t2>t1) and further comprises a second light source to emit a second light flux having a wavelength of λ2 (λ<λ2) in addition to the light source to emit the light flux having the wavelength of λ;

the converging optical system converges light flux emitted from the light source or the second light source onto an information recording surface of the first optical information recording medium or the second optical information recording medium; and the optical detector receives reflected light from the first optical information recording medium or the second optical information recording medium, wherein the optical pickup apparatus conducts recording and/or reproducing information of the first optical information recording medium by using the light flux having the wavelength of λ and conducts recording and/or reproducing information of the second optical information recording medium by using the light flux having the wavelength of λ2.

(1-31) In the optical pickup apparatus of (1-30), a numerical aperture of the objective lens at the first optical information recording medium-side necessary to record or reproduce information in the first optical information recording medium with the light flux of the wavelength of λ is NA and a numerical aperture of the objective lens at the second optical information recording medium-side necessary to record or reproduce information in the second optical information recording medium with the light flux of the wavelength of λ2 is NA2 (NA2<NA), and wherein when a light flux which is emitted from the light source under ambient temperature of 20° C. to 30° C., is inside of NA and is converged on a information recording surface of the first optical information recording medium, an absolute value of a third order axial spherical aberration is not larger than 0.07 λrms, and when a light flux which is emitted from the second light source under ambient temperature of 20° C. to 30° C., is inside of NA2 and is converged on a information recording surface of the second optical information recording medium, an absolute value of a third order axial spherical aberration is not larger than 0.07 λrms.

(1-32) An objective lens for use in an optical pickup apparatus to conduct reproducing and/or recording information of an optical information recording medium, comprises lens surfaces; and a diffracting section;

wherein the lens is a plastic lens, the diffracting section is provided on at least one of the lens surfaces and the following conditional formula is satisfied:

$$0.3 \leq \phi R/\phi \leq 1.5$$

where φR represents a refracting power of the objective lens on wavelength λ (nm) of the light source and φ represents a power of the objective lens in wavelength λ nm of the light source.

(1-33) In the objective lens of (1-32), the following conditional formula is satisfied:

$$(\Delta SA2/\Delta\lambda 1) \times (\Delta SA1/\Delta T) \leq 0 \; \lambda rms^2/(° C. \cdot nm)$$

where ΔSA2 represents a fluctuation amount of third order axial spherical aberration of the objective lens for wavelength variation Δλ1 (nm) within a range of ±5 nm in wavelength λ (nm) of a light source, and ΔSA1 represents a fluctuation amount of third order axial spherical aberration of the objective lens for temperature variation ΔT(° C.) within a range of 20° C. to 30° C. for ambient temperature, wherein a value of (ΔSA2/Δλ1) is under a constant temperature and a value of (ΔSA1/ΔT) is under a constant wavelength.

(1-34) In the objective lens of (1-32), the following conditional formula is satisfied:

$$|\Delta SA1/\Delta T| \leq 0.001 \; \lambda rms/° C.$$

where ΔSA1 represents a fluctuation amount of third order axial spherical aberration of the objective lens for temperature variation ΔT(° C.) within a range of 20° C.–30° C. for ambient temperature, wherein a value of (ΔSA1/ΔT) is under a constant wavelength).

(1-35) A recording and/or reproducing apparatus to conduct reproducing and recording information of an optical information recording medium, comprises:

an optical pickup apparatus, comprising:
a light source to emit a light flux having a wavelength of λ (nm);
a converging optical system to converge the light flux emitted from the light source onto a information recording surface of the optical information recording medium, the converging optical system having an objective lens; and
an optical detector to receive reflected light from the optical information recording medium; wherein the objective lens is a plastic lens, has a diffracting section on at least one surface thereof and satisfies the following conditional formula:

$$0.3 \leq \phi R/\phi \leq 1.5$$

where φR represents a refracting power of the objective lens on wavelength λ (nm) of the light source and φ represents a power of the objective lens in wavelength λ nm of the light source.

Further, the above object can be also attained by the following preferable structures.

(2-1) An optical pickup apparatus has therein a light source that emits a light flux having wavelength λ nm, an objective lens that converges the light flux emitted from the light source on an information recording surface of an optical information recording medium through a transparent base board of the optical information recording medium, and a photo-detector that receives a reflected light from the optical information recording medium, wherein the objective lens includes a plastic lens having refracting power, a diffraction pattern is provided on at least one surface of the objective lens, numerical aperture NA of the objective lens on the optical information recording medium side satisfies $$NA \geq 0.58$$

and the following expression is satisfied $$(\Delta SA2/\Delta\lambda 1)\times(\Delta SA1/\Delta T) \leq 0 \ \lambda\text{rms}^2/(°\text{C}\cdot\text{nm})$$

when $\Delta SA2$ represents a fluctuation amount of third order axial spherical aberration of the objective lens for wavelength variation $\Delta\lambda 1$ nm within a range of ±5 nm for wavelength $\lambda$ nm of a light source, and $\Delta SA1$ represents a fluctuation amount of third order axial spherical aberration of the objective lens for temperature variation $\Delta T$(° C.) within a range of 20° C.–30° C. for ambient temperature.

(2-2) In the optical pickup apparatus described in (2-1), the third order axial spherical aberration change amount $\Delta SA2$ satisfies the following, $$\Delta SA2/\Delta\lambda 1 < 0 \lambda\text{rms/nm}$$

and the third order axial spherical aberration change amount $\Delta SA1$ satisfies the following.

$$\Delta SA1/\Delta T > 0 \ \lambda\text{rms}/°\text{C}.$$

(2-3) In the optical pickup apparatus described in (2-1), when $\Delta\lambda 2$ nm represents a wavelength change amount of the light source for temperature change $\Delta T°$ C. within a range of 20° C.–30° C. of ambient temperature, the following expression is satisfied, $$0 \text{ nm}/°\text{C}. < \Delta\lambda 2/\Delta T \leq 0.5 \text{ nm}/°\text{C}.$$

(2-4) In the optical pickup apparatus described in (2-1), the third order axial spherical aberration change amount $\Delta SA1$ satisfies the following expression.

$$|\Delta SA1/\Delta T| \leq 0.001 \ \lambda\text{rms}/°\text{C}.$$

(2-5) An optical pickup apparatus having therein a light source that emits a light flux having wavelength $\lambda$ nm, an objective lens that converges the light flux emitted from the light source on an information recording surface of an optical information recording medium through a transparent base board of the optical information recording medium, and a photo-detector that receives a reflected light from the optical information recording medium, wherein the objective lens includes a plastic lens having refracting power, a diffraction pattern is provided on at least one surface of the objective lens, numerical aperture NA of the objective lens on the optical information recording medium side satisfies $$NA \geq 0.58$$

and the following expression is satisfied, $$|\Delta SA1/\Delta T| \leq 0.001 \ \lambda\text{rms}/°\text{C}.$$

where $\Delta SA1$ represents a fluctuation amount of third order axial spherical aberration of the objective lens for temperature variation $\Delta T$(° C.) within a range of 20° C.–30° C. for ambient temperature.

(2-6) An optical pickup apparatus has therein a light source that emits a light flux having wavelength $\lambda$ nm, an objective lens that converges the light flux emitted from the light source on an information recording surface of an optical information recording medium through a transparent base board of the optical information recording medium, and a photo-detector that receives a reflected light from the optical information recording medium, wherein the objective lens includes a plastic lens having refracting power, a diffraction pattern is provided on at least one surface of the objective lens, numerical aperture NA of the objective lens on the optical information recording medium side satisfies $$0.58 > NA \geq 0.48$$

and the following expression is satisfied, $$|\Delta SA1/\Delta T| \leq 0.00040 \ \lambda\text{rms}/°\text{C}.$$

where $\Delta SA1$ represents a fluctuation amount of third order axial spherical aberration of the objective lens for temperature variation $\Delta T$(° C.) within a range of 20° C.–30° C. for ambient temperature.

(2-7) An optical pickup apparatus has therein a light source that emits a light flux having wavelength $\lambda$ nm, an objective lens that converges the light flux emitted from the light source on an information recording surface of an optical information recording medium through a transparent base board of the optical information recording medium, and a photo-detector that receives a reflected light from the optical information recording medium, wherein the objective lens includes a plastic lens having refracting power, a diffraction pattern is provided on at least one surface of the objective lens, wavelength $\lambda$ nm of the above-mentioned light source satisfies the following expression, $$\lambda \leq 680 \text{ nm}$$

and the following expression is satisfied, $$|\Delta SA1/\Delta T| \leq 0.001 \ \lambda\text{rms}/°\text{C}.$$

where $\Delta SA1$ represents a fluctuation amount of third order axial spherical aberration of the objective lens for temperature variation $\Delta T°$ C. within a range of 20° C.–30° C. for ambient temperature.

(2-8) In the optical pickup apparatus described in (2-7), wavelength $\lambda$ nm of the light source stated above satisfies the following expression showing the shorter wavelength.

$$\lambda \leq 500 \text{ nm}$$

(2-9) In the optical pickup apparatus described in one of (2-1) to (2-8), wavelength $\lambda$ nm of the light source and numerical aperture NA of the objective lens on the optical information recording medium side satisfies the following expression, $$0.00015/\text{nm} \leq (NA)^4/\lambda \leq 40/\text{nm}$$

(2-10) In the optical pickup apparatus described in one of (2-1) to (2-9), wavelength $\lambda$ nm of the light source and numerical aperture NA of the objective lens on the optical information recording medium side satisfies the following expression, $$10 \text{ nm} \leq NA \leq 1100 \text{ nm}$$

(2-11) In the optical pickup apparatus described in one of (2-1) to (2-10), the following expression is satisfied when $\Delta SA2$ represents a third order axial spherical aberration change amount of the objective lens for wavelength change $\Delta\lambda$ nm within a range of ±5 nm of wavelength $\lambda$ nm of the light source, $$|\Delta SA2/\Delta\lambda| \leq 0.10 \ \lambda\text{rms/nm}$$

(2-12) In the optical pickup apparatus described in one of (2-1) to (2-11), the following expression is satisfied when $\Delta f$ $\mu$m represents a focus position change amount of the objective lens for wavelength change $\Delta\lambda 1$ nm within a range of ±5 nm of wavelength $\lambda$ nm of the light source, $$|\Delta f/\Delta\lambda 1| \leq 200$$

(2-13) In the optical pickup apparatus described in one of (2-1) to (2-12), at least one surface of the objective lens is an aspherical surface.

(2-14) In the optical pickup apparatus described in one of (2-1) to (2-12), at least two surfaces of the objective lens represent an aspherical surface.

(2-15) In the optical pickup apparatus described in one of (2-1) to (2-12), the diffraction pattern is formed to be a plurality of ring-shaped bands in a shape of concentric circles whose centers are mostly on an optical axis, and the optical path difference function showing the position of each ring-shaped band of the plural ring-shaped bands includes at least $6^{th}$ power term of the power series.

(2-16) In the optical pickup apparatus described in one of (2-1) to (2-15), the objective lens is composed of a single lens representing the plastic lens.

(2-17) In the optical pickup apparatus described in (2-16), the following expression is satisfied when φ represents a power of the objective lens in wavelength λ nm of the light source and φR represents the refracting power, $$0.3 \leq \phi R / \leq \phi \leq 1.5$$

(2-18) In the optical pickup apparatus described in (2-16) or (2-17), the following expression is satisfied when r1 represents an axial radius of curvature on the base surface of the objective lens opposite to an optical information recording medium, n represents the refractive index of the objective lens and fR mm represents a focal length for refraction, $$1.0 \leq r1/\{(n-1) \cdot fR\} \leq 1.2$$

(2-19) In the optical pickup apparatus described in one of (2-16) to (2-18), the following expression is satisfied when Δn represents an amount of refractive index change of the objective lens for temperature change ΔT(° C.) within a range of 20° C.–30° C. of ambient temperatures, $$-0.002/° C. \leq \Delta n/\Delta T \leq -0.00005/° C.$$

(2-20) In the optical pickup apparatus described in one of (2-16) to (2-19), the objective lens stated above is made of either one of amorphous polyolefin resin, norbornane resin and fluorine resin.

(2-21) In the optical pickup apparatus described in one of (2-1) to (2-20), a flange section is provided on an outer circumference of an optical functional section of the objective lens.

(2-22) In the optical pickup apparatus described in (2-16), a cutout section is provided on a part of the flange section.

(2-23) An objective lens for use in an optical pickup apparatus comprises a plastic single lens having a diffracting pattern on at least one surface thereof and the following expression is satisfied when the objective lens is composed of a plastic single lens having refracting power and having a diffraction pattern on at least one surface, and r1 mm represents an axial radius of curvature of the base surface on the side opposite to that where an optical information recording medium is arranged, n represents refractive index and fR mm represents a focal length for refraction, $$1.0 \leq r1/\{(n-1) \cdot fR\} \leq 1.2$$

(2-24) In the optical pickup apparatus described in (2-23), the diffraction pattern is formed to be a plurality of ring-shaped bands in a shape of concentric circles whose centers are on an optical axis, and the optical path difference function showing the position of each ring-shaped band of the plural ring-shaped bands includes at least $6^{th}$ power term of the power series.

(2-25) In the optical pickup apparatus described in (2-23) or (2-24), at least one surface of the objective lens is an aspherical surface.

(2-26) In the optical pickup apparatus described in (2-23) or (2-24), both surfaces of the objective lens represent an aspherical surface.

(2-27) An objective lens for use in an optical pickup apparatus comprises at least one plastic lens having refracting power and an axial spherical aberration change amount caused by ambient temperatures is corrected by making at least one surface to be an aspherical surface and spherical aberration is corrected by providing a diffraction pattern on at least one surface.

(2-28) In the objective lens for use in an optical pickup apparatus described in (2-27), the objective lens is composed of a single lens of the plastic lens.

(2-29) An objective lens for use in an optical pickup apparatus comprises a plastic lens having refracting power, the following expression is satisfied by third order axial spherical aberration change amount ΔSAX when a light flux having wavelength λ nm is made to enter the objective lens having a diffraction pattern on at least one surface thereof from a light source for measurement, and when the third order axial spherical aberration change amount ΔSAX of the objective lens for temperature change ΔT° C. within a range of 20° C.–30° C. of ambient temperatures is measured, $$|\Delta SAX/\Delta T| \leq 0.001 \text{ λrms}/° C.$$

(2-30) In the objective lens for use in an optical pickup apparatus described in (2-29), the measurement is conducted by an interferometer of a Fizeau type or by an interferometer of a Twyman-Green type.

(2-31) In the objective lens for use in an optical pickup apparatus described in (2-29) or (2-30), wavelength λ nm of the light source for measurement stated above is 680 nm or less.

(2-32) In the objective lens for use in an optical pickup apparatus described in (2-29) or (2-30), the wavelength λ nm of the light source for measurement stated above is 633 nm.

(2-33) In the objective lens for use in an optical pickup apparatus described in (2-29) or (2-30), the wavelength λ nm of the light source for measurement stated above is not longer than 500 nm.

(2-34) In the objective lens for use in an optical pickup apparatus described in one of (2-29) to (2-33), a numerical aperture thereof on the side where a light flux is emitted is 0.58 or more.

(2-35) In the objective lens for use in an optical pickup apparatus described in one of (2-29) to (2-33), a numerical aperture thereof on the side where a light flux is emitted is 0.62 or more.

(2-36) In the objective lens for use in an optical pickup apparatus described in one of (2-29) to (2-35), an absolute value of the third order axial spherical aberration component of a wavefront aberration obtained through the measurement stated above is 0.07 λrms or less on ambient temperature range of 20° C. to 30° C.

(2-37) An objective lens for use in an optical pickup apparatus to conduct recording and/or reproduction of information for an optical information recording medium equipped with a transparent base board by using light from a light source, comprises a plastic lens having refracting power, and when a light source for measurement capable of emitting measurement light having the wavelength that is mostly the same as a light flux coming from a light source of the optical pickup apparatus to the objective lens and a measurement medium having the refractive index and thickness which are mostly the same as those of the transparent base board of the optical information recording medium are provided to be equal in terms of the relational position between the light source of the optical pickup apparatus and the transparent base board, and when the measurement light having wavelength λ nm is made to enter the objective lens, and third order axial spherical aberration change amount ΔSAX of the objective lens for temperature change ΔT(° C.) within a range of 20° C.–30° C. of the objective lens temperature is measured, the third order axial spherical aberration change amount ΔSAX satisfies the following expression, $|\Delta SAX/\Delta T| \leq 0.001 \; \lambda rms/° C.$ (3-1) An optical pickup apparatus comprises therein a light source emitting a light flux having wavelength λ1 nm, a light-converging optical system including an objective lens that converges a light flux emitted from the light source on an information recording surface of the optical information recording medium through a transparent base board of the optical information recording medium, and a photo-detector that receives reflected light from the optical information recording medium, and is characterized in that the objective lens is a plastic lens, and the following expressions are satisfied, $NA(1) \geq 0.49 \; -\frac{1}{2} \leq mo1 \leq -\frac{1}{7.5}$ when NA (1) represents a numerical aperture of the objective lens on the optical information recording medium side and mo1 represents an image forming magnification of the objective lens, and the following expression is satisfied when ΔSA1 represents an amount of change in axial spherical aberration of the light-converging optical system for temperature change ΔT (° C.) in a range of 20° C.–30° C. of ambient temperatures.

$|\Delta SA1/\Delta T| \leq 0.0005 \; \lambda rms/° C.$ (3-2) In the optical pickup apparatus described in (3-1), the following expression is satisfied when Δλ1 nm represents an amount of change in wavelength of the light source for temperature change ΔT (° C.) in a range of 20° C.–30° C. of ambient temperatures, $0 \leq \Delta\lambda 1/\Delta T \leq 0.5 \; nm/° C.$ (3-3) In the optical pickup apparatus described in (3-1), the following expression is satisfied when Δn1 represents an amount of change in refractive index of a material of the plastic lens for temperature change ΔT (° C.) in a range of 20° C.–30° C. of ambient temperatures in the case of wavelength λ1 nm, $-0.0002/° C. \leq \Delta n1/\Delta T < -0.00005/° C.$ (3-4) In the optical pickup apparatus described in one of (3-1) to (3-3), the objective lens is driven in the direction perpendicular to an optical axis of the objective lens for tracking and its relative position to the light source is changed, and thereby, the position where the astigmatism component of wavefront aberration of the light flux which has emerged from the objective lens is minimum is a position where the center of the light flux emitted from the light source is deviated from an optical axis of the objective lens.

(3-5) In the optical pickup apparatus described in one of (3-1) to (3-4), the following expression is satisfied when U represents a distance between the light source and the information recording surface of the optical information recording medium, $10 \; mm < U < 40 \; mm$ (3-6) An optical pickup apparatus comprises a first light source with wavelength λ1 nm, a second light source with wavelength λ2 nm (λ2>λ1 nm), a light-converging optical system including an objective lens that converges light fluxes emitted from the first light source and the second light source on an information recording surface of the optical information recording medium through a transparent base board of the optical information recording medium, and a photo-detector that receives reflected light representing a light flux emitted from each of the first and second light sources and is reflected on the optical information recording medium, recording and/or reproducing of information is conducted by the first light flux coming from the first light source for the first optical information recording medium wherein a thickness of a transparent base board is t1, recording and/or reproducing of information is conducted by the second light flux coming from the second light source for the second optical information recording medium wherein a thickness of a transparent base board is t2, the objective lens is a plastic lens, at least one surface of the objective lens has a diffraction pattern, the following expressions hold when NA1 represents a necessary numerical aperture of the light-converging optical system on the optical information recording medium side necessary for recording or reproducing the first optical information recording medium with wavelength λ1, and when NA2 represents a necessary numerical aperture of the light-converging optical system on the optical information recording medium side necessary for recording or reproducing the second optical information recording medium with wavelength λ2, $t1 < t2$ $NA1 > NA2$ the following expressions are satisfied when NA (1) represents a numerical aperture of the objective lens on the side of the optical information recording medium for the first light flux, and mo1 represents image forming magnification of the objective lens for the first light flux, $NA(1) \geq 0.56 \; -\frac{1}{5} \leq mo1 \leq -\frac{1}{7.5}$ and the following expression is satisfied when ΔSA1 represents an amount of change in axial spherical aberration of the light-converging optical system for temperature change ΔT (° C.) in a range of 20° C.–30° C. of ambient temperatures, $|\Delta SA1/\Delta T| \leq 0.0005 \; \lambda rms/° C.$ (3-7) In the optical pickup apparatus described in (3-6), the following expression holds when mo2 represents image forming magnification of the objective lens for the second light flux:

$|mo2 - mo1| \leq 0.10$ (3-8) In the optical pickup apparatus described in (3-6) or (3-7), the optical pickup apparatus comprises a light mixing means capable of mixing the first light flux and the second light flux.

(3-9) In the optical pickup apparatus described in one of (3-6) to (3-7), an aperture regulating means which allows the first light flux and the central portion of the second light flux to pass through and prohibits the outer area of the second light flux to pass through is provided on the optical path through which the first and second light fluxes pass. (3-10) In the optical pickup apparatus described in (3-9), the aperture regulating means stated above is integrated solidly with the objective lens.

(3-11) In the optical pickup apparatus described in (3-10), the aperture regulating means integrated solidly with the objective lens is provided on the surface on one side of the objective lens and is of the partial dichroic coating which allows the first light flux and the central portion of the second light flux to pass through and reflects the outer area of the second light flux. (3-12) In the optical pickup apparatus described in (3-11), the diffraction pattern is provided only on the surface on one side of the objective lens and the partial dichroic coating is provided on the surface where no diffraction pattern is provided.

(3-13) In the optical pickup apparatus described in (3-11) or (3-12), the reflectance of the partial dichroic coating for a light flux having wavelength $\lambda 2$ is in a range from 30% to 70%.

(3-14) In the optical pickup apparatus described in (3-10), each of both surfaces of the objective lens has a diffraction pattern, and the aperture regulating means integrated solidly with the objective lens is a partial diffraction pattern that is provided on the surface on one side of the objective lens to allow the first light flux and the central portion of the second light flux to pass through and to diffract the outer area of the second light flux.

(3-15) In the optical pickup apparatus described in one of (3-6) to (3-14), a beam spot is formed by utilizing mainly an inner light flux and an outer light flux in a light flux emitted from the first light source, and information is recorded and/or reproduced for the first optical information recording medium, and a beam spot is formed by utilizing mainly an inner light flux and an intermediate light flux in a light flux emitted from the second light source, and information is recorded and/or reproduced for the second optical information recording medium, when a light flux entering the information recording surface is divided into at least three light fluxes including an inner light flux near an optical axis, an intermediate light flux that is located outside the inner light flux, and an outer light flux that is located outside the intermediate light flux.

(3-16) In the optical pickup apparatus described in (3-15), third order spherical aberration component of wavefront aberration of the inner area that enters an information recording surface of the second optical information recording medium in a light flux emitted from the second light source is under.

(3-17) In the optical pickup apparatus described in (3-16), the photo-detector is common for both the first light source and the second light source.

(3-18) In the optical pickup apparatus described in one of (3-6) to (3-16), the first light source is equipped with the first photo-detector and the second light source is equipped with the second photo-detector separately, and the first photo-detector and the second photo-detector are positioned to be away from each other spatially.

(3-19) In the optical pickup apparatus described in (3-18), at least the first light source and the first photo-detector, or the second light source and the second photo-detector are integrally unitized.

(3-20) In the optical pickup apparatus described in (3-17), the first light source, the second light source and the common photo-detector (a single photo-detector) are integrally unitized.

(3-21) In the optical pickup apparatus described in one of (3-6) to (3-16), the first photo-detector for the first light source is separate from the second photo-detector for the second light source with regard to the photo-detector, and the first light source, the second light source, the first photo-detector and the second photo-detector are integrally unitized.

(3-22) In the optical pickup apparatus described in one of (3-6) to (3-16), the first light source and the second light source are integrally unitized and are positioned to be away from the photo-detector spatially.

(3-23) In the optical pickup apparatus described in one of (3-6) to (3-22), a coupling lens that makes divergence of a light flux emitted from a light source to be small is provided in at least one of an optical path from the first light source to the objective lens and an optical path from the second light source to the objective lens.

(3-24) An optical pickup apparatus comprises a light source with wavelength $\lambda 1$ nm, a light-converging optical system including an objective lens that converges a light flux emitted from the light source on an information recording surface of the optical information recording medium through a transparent base board of the optical information recording medium, and a photo-detector that receives reflected light representing a light flux emitted from the light source and is reflected on the optical information recording medium, recording and/or reproducing of information is conducted by the light flux coming from the light source for the first optical information recording medium wherein a thickness of a transparent base board is t1 and for the second optical information recording medium wherein a thickness of a transparent base board is t2, the objective lens is a plastic lens, at least one surface of the objective lens has a diffraction pattern, the following expressions hold when NA1 represents a necessary numerical aperture of the light-converging optical system on the optical information recording medium side necessary for recording or reproducing the first optical information recording medium with wavelength $\lambda 1$, and when NA2 represents a necessary numerical aperture of the light-converging optical system on the optical information recording medium side necessary for recording or reproducing the second optical information recording medium with wavelength $\lambda 1$, $$t1 < t2$$

$$NA1 > NA2$$

the following expression is satisfied when mo1 represents image forming magnification of the objective lens, $$-\tfrac{1}{5} \leq mo1 \leq -\tfrac{1}{7.5}$$

the following expression is satisfied when $\Delta SA1$ represents an amount of change in axial spherical aberration of the light-converging optical system for temperature change $\Delta T$ (° C.) in a range of 20° C.–30° C. of ambient temperatures, $$|\Delta SA1/\Delta T| \leq 0.0005 \; \lambda rms/° C.$$

and there is provided an aperture regulating means which allows a central portion of the light flux emitted from a light source to pass through and intercepts an outer area of the light flux when conducting recording and/or reproducing for the second optical information recording medium.

(3-25) An objective lens is an objective lens for use in an optical pickup apparatus having therein a light source emitting a light flux with wavelength $\lambda 1$ nm, a light-converging optical system including an objective lens that converges a light flux emitted from the light source on an information recording surface of the optical information recording medium through a transparent base board of the optical information recording medium, and a photo-detector that receives reflected light coming from the optical information recording medium, and the objective lens is a plastic lens, at least one surface of the objective lens has a diffraction pattern, the following expressions hold when NA (1) represents a numerical aperture of the objective lens on the optical information recording medium side, $$NA(1) \geq 0.49 - \frac{1}{5} \leq mo1 \leq -\frac{1}{15}$$

and the following expression is satisfied when $\Delta SA1$ represents an amount of change in axial spherical aberration of the light-converging optical system for temperature change $\Delta T$ (° C.) in a range of 20° C.–30° C. of ambient temperatures:

$$|\Delta SA1/\Delta T| \leq 0.0005 \; \lambda rms/° \; C.$$

(3-26) In the objective lens described in (3-25), the following expression is satisfied when $\Delta\lambda 1$ represents an amount of change in wavelength of the light source for temperature change $\Delta T$ (° C.) in a range of 20° C.–30° C. of ambient temperatures:

$$0 \leq \alpha\lambda 1/\Delta T \leq 0.5 \; nm/° \; C.$$

(3-27) In the objective lens described in (3-25) or (3-26), the following expression is satisfied when $\Delta n1$ represents an amount of change in refractive index of materials of the plastic lens for temperature change $\Delta T$ (° C.) in a range of 20° C.–30° C. of ambient temperatures:

$$-0.0002/° \; C. < \Delta n1/\Delta T \leq -0.00005/° \; C.$$

(3-28) In the objective lens described in one of (3-25) to (3-27), the relative position between the objective lens and the light source is changed when the objective lens is driven in the direction perpendicular to an optical axis of the objective lens for the reason of tracking in the optical pickup apparatus, and the position where the astigmatism component of wavefront aberration of the light flux emerged out of the objective lens is minimum is a position where the center of a light flux emitted from the light source is deviated from an optical axis of the objective lens.

(3-29) In the objective lens described in one of (3-25) to (3-28), the following expression is satisfied when U represents a distance between the light source and an information recording surface of the optical information recording medium in the optical pickup apparatus:

$$10 \; mm \leq U \leq 40 \; mm$$

(3-30) An optical pickup apparatus is an objective lens of an optical pickup apparatus having therein a first light source with wavelength $\lambda 1$ nm, a second light source with wavelength $\lambda 2$ nm ($\lambda 2 > \lambda 1$), a light-converging optical system including an objective lens that converges a light flux emitted from the first light source and a light source emitted from the second light source on an information recording surface of the optical information recording medium through a transparent base board of the optical information recording medium, and a photo-detector that receives reflected light representing a light flux emitted from the first light source and a light flux emitted from the second light source reflected on the optical information recording medium, wherein recording and/or reproducing of information is conducted by the first light flux emitted from the first light source for the first optical information recording medium wherein a thickness of the transparent base board is t1, and recording and/or reproducing of information is conducted by the second light flux emitted from the second light source for the second optical information recording medium wherein a thickness of the transparent base board is t2, the objective lens is a plastic lens, at least one surface of the objective lens has a diffraction pattern, the following expressions hold when NA1 represents a necessary numerical aperture of the light-converging optical system on the optical information recording medium side necessary for recording or reproducing the first optical information recording medium with wavelength $\lambda 1$, and when NA2 represents a necessary numerical aperture of the light-converging optical system on the optical information recording medium side necessary for recording or reproducing the second optical information recording medium with wavelength $\lambda 2$, $$t1 < t2$$

$$NA1 > NA2$$

the following expressions are satisfied when NA (1) represents a numerical aperture of the objective lens on the optical information recording medium side for the first light flux and mo1 represents image forming magnification of the objective lens for the first light flux, $$NA(1) \geq 0.56 - \frac{1}{5} \leq mo1 \leq -\frac{1}{15}$$

and the following expression is satisfied when $\Delta SA1$ represents an amount of change in axial spherical aberration of the light-converging optical system for temperature change $\Delta T$ (° C.) in a range of 20° C.–30° C. of ambient temperatures:

$$|\Delta SA1/\Delta T| \leq 0.0005 \; \lambda rms/° \; C.$$

(3-31) In the objective lens described in (3-30), the following expression is satisfied when mo2 represents an image forming magnification of the objective lens for the second light flux:

$$|mo2 - mo1| < 0.10$$

(3-32) In the objective lens described in (3-30) or (3-31), the optical pickup apparatus has light mixing means capable of mixing the first light flux and the second light flux.

(3-33) In the objective lens described in one of (3-30) to (3-32), an aperture regulating means which allows the first light flux and a central portion of the second light flux to pass through and intercepts an outer area of the second light flux is provided in the optical path through which the first light flux and the second light flux pass commonly, in the optical pickup apparatus.

(3-34) In the objective lens described in (3-33), the aperture regulating means is unitized integrally with the objective lens.

(3-35) In the objective lens described in (3-34), the aperture regulating means unitized integrally with the objective lens is provided on the surface on one side of the objective lens, and it represents partial dichroic coating that allows the first light flux and a central portion of the second light flux to pass through it and reflects an outer area of the second light flux.

(3-36) In the objective lens described in (3-35), the diffraction pattern is provided on only one side of the objective lens, and the partial dichroic coating is provided on the side where no diffraction pattern is provided. (3-37) In the objective lens described in (3-35) or (3-36), the reflectance of the partial dichroic coating for the light flux with wavelength λ2 is within a range of 30%–70%.

(3-38) In the objective lens described in (3-34), diffraction patterns are provided on both sides of the objective lens, and the aperture regulating means unitized with the objective lens represents partial diffraction pattern which allows the first light flux provided on the surface on one side of the objective lens and a central portion of the second light flux to pass through and diffracts an outer area of the second light flux.

(3-39) In the objective lens described in one of (3-30) to (3-34), a beam spot is formed by using mainly an inner light flux and an outer light flux in a light flux emitted from the first light source, and recording and/or reproducing of information is conducted for the first optical information recording medium, and a beam spot is formed by using mainly an inner light flux and an intermediate light flux in a light flux emitted from the second light source, and recording and/or reproducing of information is conducted for the second optical information recording medium, when a light flux entering the information recording surface is divided into an inner light flux near an optical axis, an intermediate light flux that is outside the inner light flux, and an outer light flux that is outside the intermediate light flux, in the optical pickup apparatus.

(3-40) In the objective lens described in (3-39), third order spherical aberration component of wavefront aberration of the inner area that enters an information recording surface of the second optical information recording medium in a light flux emitted from the second light source is under, in the optical pickup apparatus.

(3-41) In the objective lens described in one of (3-30) to (3-40), the photo-detector of the optical pickup apparatus is common for both the first light source and the second light source.

(3-42) In the objective lens described in one of (3-30) to (3-40), the first light source is equipped with the first photo-detector and the second light source is equipped with the second photo-detector separately, and the first photo-detector and the second photo-detector are positioned to be away from each other spatially.

(3-43) In the objective lens described in (3-42), at least a pair of the first light source and the first photo-detector or a pair of the second light source and the second photo-detector is unitized, in the optical pickup apparatus.

(3-44) In the objective lens described in (3-41), the first light source, the second light source and the common photo-detector (a single photo-detector) are unitized in the optical pickup apparatus.

(3-45) In the objective lens described in one of (3-30) to (3-40), the first photo-detector for the first light source and the second photo-detector for the second light source are separate each other in the photo-detector of the optical pickup apparatus, and the first light source, the second light source, the first photo-detector and the second photo-detector are unitized.

(3-46) In the objective lens described in one of (3-30) to (3-40), the first light source and the second light source are unitized, and they are located to be away from the photo-detector spatially, in the optical pickup apparatus.

(3-47) In the objective lens described in one of (3-30) to (3-46), a coupling lens that makes divergence of a light flux emitted from a light source to be small is provided in at least one of an optical path from the first light source to the objective lens and an optical path from the second light source to the objective lens, in the optical pickup apparatus.

(3-48) An objective lens is an objective lens for an optical pickup apparatus having therein a light source emitting a light flux with wavelength λ1 nm, a light-converging optical system including an objective lens that converges a light flux emitted from the light source on an information recording surface of the optical information recording medium through a transparent base board of the optical information recording medium, and a photo-detector that receives reflected light coming from the optical information recording medium, wherein the optical pickup apparatus conducts recording or reproducing of information using a light flux emitted from the light source, for the first optical information recording medium whose transparent base board has a thickness of t1 and for the second optical information recording medium whose transparent base board has a thickness of t2, the objective lens is a plastic lens, at least one surface of the objective lens has a diffraction pattern, the following expressions hold when NA1 represents a necessary numerical aperture of the light-converging optical system on the optical information recording medium side necessary for recording or reproducing the first optical information recording medium with wavelength λ1, and when NA2 represents a necessary numerical aperture of the light-converging optical system on the optical information recording medium side necessary for recording or reproducing the second optical information recording medium with wavelength λ1, $$t1 \leq t2$$

$$NA1 > NA2$$

the following expression is satisfied when mo1 represents image forming magnification of the objective lens, $$-\tfrac{1}{5} \leq mo1 \leq -\tfrac{1}{7.5}$$

the following expression is satisfied when ΔSA1 represents an amount of change in axial spherical aberration of the light-converging optical system for temperature change ΔT (° C.) in a range of 20° C.–30° C. of ambient temperatures, $$|\Delta SA1/\Delta T| \leq 0.0005 \text{ λrms}/^\circ \text{ C.}$$

and there is provided an aperture regulating means that transmits the central portion of a light flux emitted from a light source and intercepts an outer area thereof for recording and/or reproducing of the second optical information recording medium.

(3-49) An objective lens for use in an optical pickup apparatus is a plastic lens having a diffraction pattern on at least one surface thereof which is characterized in that the following expression holds when ΔZ represents an amount of astigmatism:

$$0.2 \text{ μm} < \Delta Z < 0.7 \text{ μm}$$

(3-50) In the objective lens for use in an optical pickup apparatus described in (3-49), an axial chromatic aberration is over-corrected in the vicinity of the wavelength used.

(3-51) An objective lens is a plastic lens and the following expression is satisfied when Mmin represents image forming magnification of the objective lens at which the third order spherical aberration component of the wavefront aberration is minimum when a light source with wavelength of 620 nm–680 nm is arranged and a polycarbonate transparent base board having a thickness of 0.6 mm is arranged on the side opposite to that for the light source and the third order spherical aberration component is measured through the transparent base board, $$-1/5 \leq M_{min} \leq -1/12$$

and at least one surface has thereon a diffraction pattern.

(3-52) In the objective lens for use in an optical pickup apparatus described in (3-51), the following expression is satisfied by the image forming magnification Mmin.

$$-1/5 \leq M_{min} \leq -1/7.5$$

BRIEF DESCRIPTION OF THE DRAWINGS

FIG. 9 shows a spherical aberration diagram and an astigmatism diagram under the conditions of the standard wavelength and standard temperature (25° C.) relating to the objective lens in Example 4.

FIG. 11 shows a spherical aberration diagram and an astigmatism diagram under the conditions of the standard wavelength and standard temperature (25° C.) relating to the objective lens in Example 5.

FIG. 17 shows a spherical aberration diagram and an astigmatism diagram under the conditions of the standard wavelength and standard temperature (25° C.) relating to the objective lens in Example 8.

FIG. 19 shows a spherical aberration diagram and an astigmatism diagram under the conditions of the standard wavelength and standard temperature (25° C.) relating to the objective lens in Example 9.

DETAILED DESCRIPTION OF THE PREFERRED EMBODIMENT

Figure 1:
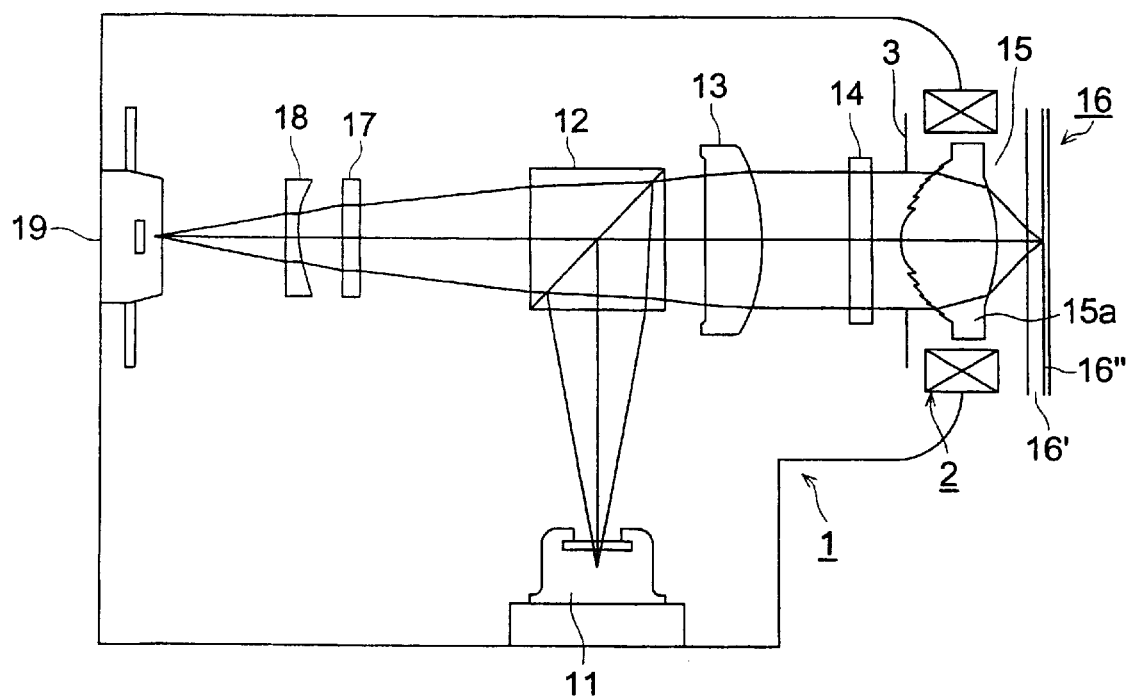
FIG. 1 is a conceptual diagram showing constitution of an optical pickup apparatus of the invention.

An optical pickup apparatus of the invention is one that conducts reproduction and/or recording of information on an optical information recording medium. The optical pickup apparatus has therein a light source that emits a light flux with a wavelength of λ (nm), a light-converging optical system that has an objective lens and converges a light flux emitted from the light source on an information recording surface of the optical information recording medium, and a photo-detector that receives light reflected on the optical information recording surface. Further, the objective lens is a plastic lens and has a diffracting section on at least one surface thereof, and satisfies the following conditional expression.

$$0.3 \leq \phi R/\phi \leq 1.5$$

φR: Refracting power of the objective lens at wavelength of λ (nm) of the light source φ: Power of the objective lens at wavelength of λ (nm) of the light source Namely, φ is the sum of refracting power (φR) of the objective lens and diffracting power of a diffracting section.

Here, in the present invention, it may be preferable to use +1 to +3 order reflected light ray. In particular, it may be more preferable to use +1 order reflected light ray.

Further, when the present invention is construed to be the invention of a lens, it can also be considered as follows. The invention represents a lens for an optical pickup apparatus that conducts reproduction and/or recording of information on an optical information recording medium, and the lens is a plastic lens that has a diffracting section on at least one surface thereof. Further, the lens satisfies the following conditional expression for at least one prescribed wavelength (preferably, 810 nm or less, and 300 nm or more).

$$0.3 \leq \phi R/\phi \leq 1.5$$

φR: Refracting power of the lens at prescribed wavelength of λ (nm)

φ: Power of the lens at prescribed wavelength of λ (nm)

The light-converging optical system is one having therein one optical element or a plurality of optical elements for converging a light flux emitted from the light source on an information recording surface of an optical information recording medium. Further, a part of a plurality of optical elements may be construed as a light-converging optical system. The light-converging optical system may either be composed of an objective lens alone, or be composed of other optical elements such as a coupling lens and a collimator lens, in addition to an objective lens.

Incidentally, the optical pickup apparatus of the invention may be either an optical pickup apparatus having only one light source and conducting reproduction and/or recording of information on an optical information recording medium of only one type, or an optical pickup apparatus having a plurality of light sources and conducting reproduction and/or recording of information of optical information recording media of plural types.

Incidentally, when the number of light sources is only one, it is preferable that an absolute value of a component of third order axial spherical aberration is 0.07 λrms or less, when a light flux which has a numerical aperture that is not more than NA and is emitted from a light source under an ambient temperature of 20° C.–30° C. and passes through an objective lens is converged on an information recording surface of an optical information recording medium, when the numerical aperture of the objective lens on the optical information recording medium side necessary for recording or reproducing the optical information recording medium at wavelength λ is assumed to be NA. The more preferable is 0.04 λrms or less, and the further preferable is 0.03 λrms or less.

On the other hand, in the case of an optical pickup apparatus that has two light sources and conducts reproduction and/or recording of information of optical information recording media in plural types, it is preferable to employ the following structure.

The optical pickup apparatus is one that conducts reproduction and/or recording of information on a first optical information recording medium having a t1-thick first transparent base board and a second optical information recording medium having a t2 (t2>t1)-thick second transparent base board. The optical pickup apparatus has the second light source emitting the second light flux with a wavelength of λ2 (λ<λ2) in addition to the light source emitting the light flux with a wavelength of λ. The light-converging optical system converges a light flux emitted from the light source or from the second light source on the information recording surface of the first optical information recording medium or of the second optical information recording medium, while, the photo-detector receives reflected light from the first optical information recording medium or from the second optical information recording medium. Then, a light flux with a wavelength of λ from the light source is used to conduct reproduction and/or recording of information on the first optical information recording medium, and a light flux with a wavelength of λ2 from the second light source is used to conduct reproduction and/or recording of information on the second optical information recording medium.

It is preferable that an absolute value of a component of third order axial spherical aberration is 0.07 λrms or less (the more preferable is not more than 0.04 λrms and still more preferable is not more than 0.03 λrms), when a light flux which has a numerical aperture that is not more than NA and is emitted from a light source under an ambient temperature of 20° C.–30° C. and passes through an objective lens is converged on an information recording surface of the first optical information recording medium, and that an absolute value of a component of third order axial spherical aberration is 0.07 λrms or less (the more preferable is not more than 0.04 λrms and still more preferable is not more than 0.03 λrms), when a light flux which has a numerical aperture that is not more than NA2 and is emitted from the second light source under an ambient temperature of 20° C.–30° C. and passes through the objective lens is converged on an information recording surface of the second optical information recording medium, when the numerical aperture of the objective lens on the optical information recording medium side necessary for recording or reproducing the first optical information recording medium at wavelength λ is assumed to be NA, and when the numerical aperture of the objective lens on the second optical information recording medium side necessary for recording or reproducing the second optical information recording medium at wavelength λ2 is assumed to be NA2 (NA2<NA).

In the optical pickup apparatus having two light sources, when image forming magnification of the objective lens in the case of recording or reproducing of the first optical information recording medium is represented by mo1 and image forming magnification of the objective lens in the case of recording or reproducing of the second optical information recording medium is represented by mo2, it is preferable to satisfy the following conditional expression.

$$|mo2-mo1|<0.1$$

Incidentally, any of a semiconductor laser, an SHG laser and a gas laser can be used as a light source provided that they represent a laser light source. Though there is no restriction for a wavelength of a light flux, in particular, an effect of the invention is remarkable in many cases when the wavelength is short. It is therefore preferable that the wavelength is not more than 810 nm, and 665 nm or less is more preferable, while 500 nm or less is still more preferable.

Incidentally, though it is preferable that an objective lens is a single lens, the objective lens may also have a plurality of lenses as in a two-element lens. It is further preferable that at least one of surfaces of the objective lens is an aspherical surface. Each of both surfaces of the objective lens may be an aspherical surface. A diffracting section is preferably provided on an aspherical surface. The diffracting section may be provided either on one side or on both sides.

Further, when a paraxial radius of curvature of the base surface farther from an optical information recording medium on an objective lens is represented by r1 mm, a refractive index of the objective lens is represented by n, and a focal length of the objective lens for refraction is represented by fR mm, it is preferable that the following conditional expression is satisfied.

$$1.0 \leq r1/\{(n-1) \cdot fR\} \leq 1.2$$

It is preferable that the objective lens is made of any of polyolefin resin (preferably, amorphous polyolefin), norbornane resin and fluorine resin.

The diffracting section may either be provided on the entire surface or the almost entire surface of the effective diameter (effective aperture) of the optical surface of the objective lens, or be provided only on a part of the optical surface. Incidentally, "the entire surface of the effective diameter" mentioned here means an entire portion on the surface of the objective lens of a certain light-converging optical system through which the light flux satisfying the necessary numerical aperture of the optical information recording medium subjected to reproduction and/or recording by the optical pickup apparatus passes. Further, "the almost entire surface for the effective diameter" means 80 or more of the entire surface for the effective diameter, and 90% is more preferable.

It is preferable that the diffracting section is a diffracting section of a phase type from the viewpoint of efficiency for utilizing light, although it may also be a diffracting section of an amplitude type. It is further preferable that a diffraction pattern of the diffracting section is rotation-symmetrical about an optical axis. It is further preferable that the diffracting section has a plurality of ring-shaped bands which are mostly formed to be concentric circles whose center is on an optical axis or on the point near the optical axis, when they are viewed in the direction of the optical axis. The ring-shaped band may also be an ellipse, though the circle is preferable. In particular, a stepped diffraction surface of ring-shaped bands of blazed type is preferable. Further, a stepped diffraction surface of ring-shaped bands is also acceptable. In addition to the foregoing, there is also accepted a ring-shaped bands diffraction surface formed to be stepwise as ring-shaped bands which shift dispersively in the direction wherein a lens thickness is increased as it becomes more distant from the optical axis. Incidentally, the diffracting section may also be a one-dimensional diffraction grating although it is preferable to be in a shape of ring-shaped bands. When the diffracting section is in a shape of plural ring-shaped bands in a shape of concentric circles, it is preferable that the optical path difference function showing the position of each ring-shaped band of plural ring-shaped bands includes at least $6^{th}$ power term of the power series.

Since an effect of the invention is more remarkable in the higher NA, it is preferable that numerical aperture NA of an objective lens on the optical information recording medium side in an optical pickup apparatus is 0.45 or more, and 0.58 is more preferable.

Further, there are given the following as the structure that is further preferable for securing sufficient capacity for the fluctuation of ambient temperature used.

When $\Delta SA2$ represents a fluctuation amount of third order axial spherical aberration of the objective lens for wavelength variation $\Delta \lambda 1$ nm within a range of $\pm 5$ nm for wavelength $\lambda$ nm of a light source, and $\Delta SA1$ represents a fluctuation amount of third order axial spherical aberration of the objective lens for temperature variation $\Delta T°$ C. within a range of 20° C.–30° C. (preferably, –10° C.–60° C.) for ambient temperature, it is preferable that the following conditional expression is satisfied.

$$(\Delta SA2/\Delta \lambda 1) \times (\Delta SA1/\Delta T) < 0 \ \lambda rms^2/(° \ C. \cdot nm)$$

Incidentally, $\Delta SA2/\Delta \lambda 1$ represents a value under a certain temperature, while, $\Delta SA1/\Delta T$ represents a value under a certain wavelength.

When the foregoing is construed to be the invention of a lens, it is preferable to consider a fluctuation amount of third order axial spherical aberration of the aforesaid lens for wavelength variation $\lambda 1$ nm within a range of $\pm 5$ nm for at least one prescribed wavelength $\lambda$ nm to be $\Delta SA2$. Incidentally, the prescribed wavelength is preferably 810 nm or less.

Though it is possible to apply $(\Delta SA2S\Delta \lambda 1) \times (\Delta SA1/\Delta T) < 0 \ \lambda rms^2/(° \ C. \cdot nm)$ independently of whether the wavelength of the light source changes in accordance with fluctuation of temperature or not, the application is preferable when the wavelength of the light source changes in accordance with fluctuation of temperature.

Incidentally, this "temperature variation within a range of 20° C.–30° C. for ambient temperature" does not mean that the temperature variation is in a range of 20–30° C., but it means that the ambient temperature itself is in a range of 20–30° C., and the temperature variation is for that ambient temperature.

When $(\Delta SA2/\Delta \lambda 1) \times (\Delta SA1/\Delta T) < 0 \ \lambda rms^2/(° \ C. \cdot nm)$ is satisfied, it is more preferable that numerical aperture NA of the objective lens on the optical information recording medium side is not less than 0.58 and image forming magnification mo1 of the objective lens is almost zero. Incidentally, "image forming magnification is almost zero" means that the image forming magnification is in a range from 0.13 to –0.13, and it preferably is in a range from 0.05 to –0.05 and the most preferable is zero.

It is more preferable that the following conditional expressions are satisfied.

$$\Delta SA2/\Delta \lambda 1 < 0 \ \lambda rms/nm$$

$$\Delta SA1/\Delta T > 0 \ \lambda rms/° \ C.$$

Incidentally, when $(\Delta SA2/\Delta \lambda 1) \times (\Delta SA1/\Delta T) < 0 \ \lambda rms^2/(° \ C. \cdot nm)$ is satisfied, image forming magnification mo1 of the objective lens may also satisfy the following conditional expression.

$$-\tfrac{1}{2} \leq mo1 \leq -\tfrac{1}{7.5}$$

Further, there are given the following as other structures which are preferable for securing sufficient capacity for fluctuation of ambient temperatures used.

When $\Delta SA1$ represents a fluctuation amount of third order axial spherical aberration of the objective lens for temperature variation $\Delta T°$ C. within a range of 20° C.–30° C. (preferably, –10° C.–60° C.) for ambient temperature, it is preferable that the following conditional expression is satisfied.

$$0 \leq |\Delta SA1/\Delta T| \leq 0.001 \ \lambda rms/° \ C.$$

Incidentally, $\Delta SA1/\Delta T$ represents a value under a certain wavelength. More preferably, $0 \leq |\Delta SA1/\Delta T| \leq 0.0004$ $\lambda rms/°$ C., still more preferably, $0 \leq |\Delta SA1/\Delta T| \leq 0.0001$ $\lambda rms/°$ C.

Though it is possible to apply $|\Delta SA1/\Delta T| \leq 0.001$ λ rms/° C. dependently of whether the wavelength of the light source changes in accordance with fluctuation of temperature or not, the application is preferable when the wavelength of the light source does not change in accordance with fluctuation of temperature.

It is also possible to satisfy both of the aforesaid $(\Delta SA2/\Delta\lambda1)\times(\Delta SA1/\Delta T)<0$ λrms²/(° C.·nm) and $0\geq|\Delta SA1/\Delta T|\leq 0.001$ λrms/° C.

When $|\Delta SA1/\Delta T|\leq 0.001$ λrms/° C. is satisfied, it is more preferable that numerical aperture NA of the objective lens on the optical information recording medium side is not less than 0.58 and image forming magnification mo1 of the objective lens is almost zero. It is further preferable that wavelength λ nm of the light source is 680 nm or less, and the more preferable is 500 nm or less.

When numerical aperture NA of the objective lens on the optical information recording medium side is 0.48 or more and is less than 0.58 and image forming-magnification mo1 of the objective lens is almost zero, it is preferable to satisfy the following expression.

$$|\Delta SA1/\Delta T| \leq 0.0004 \text{ λrms/° C.}$$

On the other hand, when numerical aperture NA of the objective lens on the optical information recording medium side is 0.49 or more and image forming magnification mo1 of the objective lens is in a range from –½ to –1/7.5, it is preferable to satisfy the following expression.

$$|\Delta SA1/\Delta T| \leq 0.0005 \text{ λrms/° C.}$$

Incidentally, in the optical pickup apparatus, the objective lens usually moves in the direction perpendicular to its optical axis for tracking, thus, the relative position between the objective lens and the light source can be changed. In the case of a definite type optical pickup apparatus such as an occasion wherein image forming magnification mo1 of the objective lens is in a range from –½ to –1/7.5, it is preferable that astigmatism component in the wavefront aberration of the light flux that is emitted from the light source in the position where the light flux center of the light source is deviated from an optical axis of the objective lens and has passed through the objective lens, is minimum. Further, in the case of a definite type optical pickup apparatus, it is preferable that distance U between the light source and an information recording surface of the optical information recording medium is greater than 10 mm and is smaller than 40 mm.

Further, even when numerical aperture NA necessary for reading the first optical information recording medium is 0.56 or more, and magnification mo1 of the objective lens in the course of reading the first optical information recording medium is in a range from –⅕ to –1/7.5 in the optical pickup apparatus having two light sources stated above, it is preferable to satisfy the following conditional expression. The number of light sources does not naturally have to be two.

$$|\Delta SA1/\Delta T| \leq 0.0005 \text{ λrms/° C.}$$

When an amount of change in wavelength of the light source for temperature change ΔT° C. within a range of 20° C.–30° C. for the ambient temperature is represented by Δλ2 nm in the optical pickup apparatus of the invention, it is preferable to satisfy the following conditional expression.

$$0 \text{ nm/° C.} < \Delta\lambda2/\Delta T \leq 0.5 \text{ nm/° C.}$$

When an amount of change in refractive index of the objective lens for temperature change ΔT° C. within a range of 20° C.–30° C. for the ambient temperature is represented by Δn, it is preferable to satisfy the following conditional expression.

$$-0.002/° \text{ C.} \leq \Delta n/\Delta T \leq -0.00005/° \text{ C.}$$

The following is more preferable.

$$-0.0002/° \text{ C.} \leq \Delta n/\Delta T \leq -0.00005/° \text{ C.}$$

It is further preferable that wavelength λ nm of the light source and numerical aperture NA of the objective lens on the optical information recording medium side satisfy the following conditional expression.

$$0.00015/\text{nm} \leq (NA)^4/\lambda \leq 40/\text{nm}$$

Further, it is preferable that wavelength λ nm of the light source and numerical aperture NA of the objective lens on the optical information recording medium side satisfy the following conditional expression.

$$10 \text{ nm} \leq \lambda/NA \leq 1100$$

When ΔSA2 represents a fluctuation amount of third order axial spherical aberration of the objective lens for wavelength variation Δλ1 nm within a range of ±5 nm for wavelength λ nm of a light source, it is preferable to satisfy the following conditional expression.

$$\Delta SA2/\Delta\lambda1 \leq 0.1 \text{ λrms/nm}$$

Incidentally, $\Delta SA2/\Delta\lambda1$ is a value under a certain temperature.

When Δf μm represents a fluctuation amount in a focus position of the objective lens for wavelength variation Δλ1 nm within a range of ±5 nm for wavelength λ nm of a light source, it is preferable to satisfy the following conditional expression.

$$|\Delta f/\Delta\lambda1| \leq 200$$

It is also possible to employ the following structure for securing sufficient capacity for the change in ambient temperatures used.

When at least one surface of the objective lens is made to be an aspherical surface, an amount of change in the axial spherical aberration caused by fluctuation of ambient temperatures is corrected by the base surface of the objective lens, and the spherical aberration is corrected by providing a diffracting section on at least one surface of the objective lens.

Incidentally, the base surface means an enveloping surface of the diffraction pattern in the case of the surface having thereon a diffracting section, and it means a refraction surface itself in the case of a refraction surface having thereon no enveloping surface of the diffraction pattern.

An optical pickup apparatus described in (2-1) has therein a light source that emits a light flux having wavelength λ nm, an objective lens that converges the light flux emitted from the light source on an information recording surface of an optical information recording medium through a transparent base board of the optical information recording medium, and a photo-detector that receives a reflected light from the optical information recording medium, wherein the objective lens includes a plastic lens having refracting power, a diffraction pattern is provided on at least one surface of the objective lens, numerical aperture NA of the objective lens on the optical information recording medium side satisfies $$NA \geq 0.58$$

and the following expression is satisfied $$(\Delta SA2/\Delta\lambda 1) \times (\Delta SA1/\Delta T) < 0 \; \lambda rms^2/(°C \cdot nm) \quad (2)$$

when $\Delta SA2$ represents a fluctuation amount of third order axial spherical aberration of the objective lens for wavelength variation $\Delta\lambda 1$ nm within a range of ±5 nm for wavelength $\lambda$ nm of a light source, and $\Delta SA1$ represents a fluctuation amount of third order axial spherical aberration of the objective lens for temperature variation $\Delta T°$ C. within a range of 20° C.–30° C. for ambient temperature.

When ?SA/?T represents a change in an amount of third order spherical aberration for temperature change of a resin made positive lens in which spherical aberration is corrected such as an aspherical resin made objective single lens having no diffraction pattern that is used commonly for recording and reproducing an optical information recording medium, the following expression holds.

$$\partial SA/\partial T = (\partial SA/\partial e)\cdot(\partial n/\partial T) + (\partial SA/\partial n)\cdot(\partial n/\partial\lambda)\cdot(\partial\lambda/\partial T) = (\partial SA/\partial n)\{(\partial n/\partial T) + (\partial n/\partial\lambda)\cdot(\partial\lambda/\partial T)\} \quad (3)$$

In this case, $(\partial n/\partial T)<0$ and $(\partial n/\partial\lambda)<0$ are for resin materials, $(\partial n/\partial T)=0$ and $(\partial n/\partial\lambda)<0$ are for glass materials, $(\partial\lambda/\partial T)>0$ is for a semiconductor laser, and $(\partial\lambda/\partial T)=0$ is for an SHG laser, a solid state laser and a gas laser.

Incidentally, though $(\partial n/\partial T)$ for glass materials is zero and $(\partial n/\partial T)$ for an SHG laser, a solid state laser and a gas laser is zero in the foregoing, these values are not zero in the strict sense of the word. However, they are considered to be zero in the field of application of the invention, which makes explanation to be simple. Therefore, the explanation will be forwarded under the condition that these values are zero.

Now, when the light source is an SHG laser, a solid state laser or a gas laser and $(\partial\lambda/\partial T)$ is zero, the following expression holds.

$$\partial SA/\partial T = (\partial SA/n)\cdot(\partial n/\partial T) \quad (4)$$

If the lens is of the glass made, $(\partial n/\partial T)=0$ holds, and therefore, $\partial SA/\partial T=0$ holds. On the other hand, if the lens is made of resins, $(\partial n/\partial T)<0$ holds and $\partial SA/\partial T>0$ is for the lens of this type. Therefore, $(\partial SA/\partial n)<0$ holds. Further, when the light source is a semiconductor laser, $(\partial\lambda/\partial T)>0$ holds.

Even when the lens is made of glass in this case, the following expression holds, $$\partial SA/\partial T = (\partial SA/\partial n)\cdot(\partial n/\partial\lambda)\cdot(\partial\lambda/\partial T) \quad (5)$$

and $\partial SA/\partial T>0$ holds because of $(\partial n/\partial\lambda)<0$ and $(\partial SA/\partial n)<0$.

Further, independently of glass materials and resin materials, when a wavelength of incident light is shorter, an absolute value of $(\partial n/\partial\lambda)$ is greater. Therefore, when a semiconductor laser with a short wavelength is used, it is necessary to pay attention to spherical aberration caused by temperature change even when glass materials are used.

On the other hand, when an amount of change of the third order spherical aberration amount for temperature change is formulated in terms of $\partial SA/\partial T$, with regard to an aspherical single lens made of resin having a diffraction pattern, the following expression holds. In this case, it is necessary to take in both of characteristics of a refraction lens section and characteristics of the diffraction pattern surface. The expression can be shown as follows, if it is expressed by suffixing R for amount $\partial SA$ of spherical aberration amount to which the refraction lens section contributes and by suffixing D for amount $\partial SA$ of spherical aberration amount to which the diffraction pattern surface contributes.

$$\partial SA/\partial T = (\partial SA_R/\partial n)\cdot(\partial n/\partial T) + \quad (6)$$
$$(\partial SA_R/\partial n)\cdot(\partial n/\partial\lambda)\cdot(\partial\lambda/\partial T) +$$
$$(\partial SA_D/\partial\lambda)\cdot(\partial\lambda/\partial T)$$

In this case, when a light source is an SHG laser, a solid state laser or a gas laser, and $(\partial\lambda/\partial T)$ is zero, the following expression holds.

$$\partial SA/\partial T = (\partial SA_R/\partial n)\cdot(\partial n/\partial T) \quad (7)$$

In the case of a lens made of glass in this case, $(\partial n/\partial T)$ is zero independently of a value of $(\partial SA_R/\partial n)$, and $\partial SA/\partial T=0$ holds. On the other hand, if a lens is made of resin, $(\partial n/\partial T)<0$ holds, but if $(\partial SA_R/\partial n)$ is zero, $\partial SA/\partial T=0$ can hold.

In the invention, therefore, a diffraction pattern may be introduced on an aspherical single lens made of resin so that $(\partial SA_R/\partial n)=0$ may hold with regard to the refraction lens section. However, in the case of the refraction lens section alone in this case, the spherical aberration remains reluctantly, but it is possible to design an objective lens suitable for recording and reproducing an optical information recording medium, by optimizing the diffraction pattern and by correcting spherical aberration totally.

On the other hand, when a light source is a semiconductor laser, $(\partial\lambda/\partial T)>0$ holds, and in the case of an objective lens having the above-mentioned characteristics of $(\partial SA_R/\partial n)=0$, the expression (6) stated above is led to the following expression.

$$\partial SA/\partial T = (\partial SA_D/\partial\lambda)\cdot(\partial\lambda/\partial T) \quad (8)$$

In general, $(\partial SA_D/\partial\lambda)$ is not zero, and it is understood that an amount of third order spherical aberration is changed depending on temperatures.

Further, the expression (6) can be changed into the following expression.

$$\partial SA/\partial T = (\partial SA_R/\partial n)\cdot\{(\partial n/\partial T) + (\partial n/\partial\lambda)\cdot(\partial\lambda/\partial T)\} + \quad (9)$$
$$(\partial SA_D/\partial\lambda)\cdot(\partial\lambda/\partial T)$$

In the many cases of a resin-made lens, $(\partial SA/\partial T)>0$ holds, and $(\partial\lambda/\partial T)$ is greater than 0 because a light source is a semiconductor laser. Therefore, the following expression holds.

$$(\partial n/\partial T) + (\partial n/\partial\lambda)\cdot(\partial\lambda/\partial T) < 0 \quad (10)$$

Under the assumption of $(\partial SA_R/\partial n)<0$, the expression (10) makes the first term of the expression (9) to be a positive value. To make $\partial SA/\partial T$ to be zero, the second term needs to take a negative value, and the condition for this is $(\partial SA_D/\partial\lambda)<0$, because of $(\partial\lambda/\partial T)>0$.

In the aspherical single lens made of resin having a diffraction pattern of the aforesaid characteristics, $(\partial SA_R/\partial n)$ is smaller than zero and $(\partial n/\partial T)$ is smaller than zero in the expression (7) above in the case of $(\partial\lambda/\partial T)=0$, in other words, in the case that a wavelength of the light flux is constant and only the temperature changes. Therefore, $\partial SA/\partial T$ is greater than zero.

Spherical aberration $\partial SA/\partial\lambda$ under the condition that a temperature is constant and a wavelength only changes can be expressed by the following expression.

$$\partial SA/\partial\lambda=(\partial SA_R/\partial n)\cdot(\partial n/\partial\lambda)+(\partial SA_n/\partial\lambda) \tag{11}$$

In the expression above, the first and second terms are negative, but a sign of $\partial SA/\partial\lambda$ is determined by the second term of the above expression (11), because chromatic aberration of an aspherical single lens having a diffraction pattern is mainly and greatly contributed from the diffraction pattern as is known commonly. Therefore, $\partial SA/\partial\lambda$ is usually greater than zero.

Namely, in the resin-made single lens wherein a diffraction pattern is introduced, it is possible to make $\partial SA/\partial T$ to be zero even when a light source is a semiconductor laser whose wavelength changes in accordance with a change in temperature, by realizing $\partial SA/\partial T>0$ in the case that the wavelength is constant and $\partial SA/\partial\lambda<0$ in the case that the temperature is constant.

When $(\partial SA_R/\partial n)$ is made to be greater than zero, on the contrary, it is possible to make $\partial SA/\partial T$ to be zero even when a light source is a semiconductor laser, by realizing $\partial SA/\partial T<0$ and $\partial SA/\partial\lambda>0$.

Namely, the sign of $\partial SA/\partial T$ has only to be opposite to that of $\partial SA/\partial\lambda$ in terms of a sign.

In this case, the following expression holds.

$$(\partial SA/\partial T)\cdot(\partial SA/\partial\lambda)\leq 0 \tag{12}$$

In this case, $(\partial SA/\partial T)>0$ is more preferable, because characteristics are closer to those of a resin-made aspherical single lens having no diffraction pattern, and a load of the diffraction pattern is less. Structure 1 makes it possible to provide an objective lens which can secure sufficient capacity even for a change of ambient temperature used.

In an optical pickup apparatus conducting recording and/or reproduction of information for an optical information recording medium whose recording density is equal to or lower than DVD, it is possible to use a single lens as an objective lens, by utilizing an aspherical surface and a diffraction surface. However, recording and/or reproduction of information on a higher density optical information recording medium requires an objective lens having a greater numerical aperture, and such objective lens includes two or more positive lenses in many cases. A two-element lens has higher degree of freedom, and it is possible to realize $(\partial SA_R/\partial n)=0$ when an oscillated wavelength does not depend on a temperature by making at least one or both of these positive lenses to be a resin lens, and to realize $(\partial SA/\partial T)=0$ by making either surface to have a diffraction pattern.

Further, even when an oscillated wavelength depends on a temperature, it is possible to realize $(\partial SA/\partial T)=0$.

An optical pickup apparatus described in (2-2) is characterized in that the third order axial spherical aberration change amount $\Delta SA2$ satisfies the following, $$\Delta SA2/\Delta\lambda 1<0\ \lambda\text{rms/nm} \tag{13}$$

and the third order axial spherical aberration change amount $\Delta SA1$ satisfies the following.

$$\Delta SA1/\Delta T>0\ \lambda\text{rms/}^\circ\text{C.} \tag{14}$$

If $(\Delta SA1/\Delta T)>0\ \lambda\text{rms/}^\circ$ C. is realized in this case, characteristics are close to those of a resin-made aspherical single lens having no diffraction pattern, and a load of the diffraction pattern is reduced, which is preferable. The structure (2-2) makes it possible to provide an objective lens which can secure sufficient capacity even for variation of wavelength $\lambda$ and a change of ambient temperature used.

In an optical pickup apparatus described in (2-3), when $\Delta\lambda 2$ nm represents a wavelength change amount of the light source for temperature change $\Delta T^\circ$ C. within a range of 20° C.–30° C. of ambient temperature, the following expression is satisfied, $$0\ \text{nm/}^\circ\ \text{C.}<\Delta\lambda 2/\Delta T\leq 0.5\ \text{nm/}^\circ\ \text{C.} \tag{15}$$

and therefore, it is possible to keep a spherical aberration change amount to be small for fluctuation of ambient temperatures, and to use an inexpensive semiconductor laser.

An optical pickup apparatus described in (2-4) is characterized in that the third order axial spherical aberration change amount $\Delta SA1$ satisfies the following expression.

$$|\Delta SA1/\Delta T|\leq 0.001\ \lambda\text{rms/}^\circ\ \text{C.} \tag{16}$$

When $|\Delta SA1/\Delta T|\leq 0.001\ \lambda$rms is satisfied, it is possible to keep a spherical aberration change amount to be small for fluctuation of ambient temperatures.

An optical pickup apparatus described (2-5) has therein a light source that emits a light flux having wavelength $\lambda$ nm, an objective lens that converges the light flux emitted from the light source on an information recording surface of an optical information recording medium through a transparent base board of the optical information recording medium, and a photo-detector that-receives a reflected light from the optical information recording medium, wherein the objective lens includes a plastic lens having refracting power, a diffraction pattern is provided on at least one surface of the objective lens, numerical aperture NA of the objective lens on the optical information recording medium side satisfies $$NA\geq 0.58 \tag{17}$$

and the following expression is satisfied, $$|\Delta SA1/\Delta T|\leq 0.001\ \lambda\text{rms/}^\circ\ \text{C.} \tag{18}$$

when $\Delta SA1$ represents a fluctuation amount of third order axial spherical aberration of the objective lens for temperature variation $\Delta T^\circ$ C. within a range of 20° C.–30° C. for ambient temperature.

In the optical pickup apparatus described in (2-5), $$\Delta SA1/\Delta T=k\cdot f(1-m)^4(NA)^4/\lambda\leq 0.001\ \lambda\text{rms/}^\circ\ \text{C.} \tag{19}$$

is satisfied based on the expression (1) stated above, and therefore, it is possible to conduct recording and reproduction of information on an optical information recording medium even when using light having a shorter wavelength (for example, blue laser beam) by using an objective lens having a high numerical aperture of 0.58 or more, and thereby, it is possible to realize an optical pickup apparatus including an inexpensive and light plastic lens that can comply with an advanced high density optical information recording medium.

An optical pickup apparatus described in (2-6) has therein a light source that emits a light flux having wavelength $\lambda$ nm, an objective lens that converges the light flux emitted from the light source on an information recording surface of an optical information recording medium through a transparent base board of the optical information recording medium, and a photo-detector that receives a reflected light from the optical information recording medium, wherein the objective lens includes a plastic lens having refracting power, a diffraction pattern is provided on at least one surface of the objective lens, numerical aperture NA of the objective lens on the optical information recording medium side satisfies $$0.58 > NA \geq 0.48 \tag{20}$$

and the following expression is satisfied, $$|\Delta SA1/\Delta T| \leq 0.00040 \text{ }\lambda\text{rms}/°\text{ C.} \tag{21}$$

when $\Delta SA1$ represents a fluctuation amount of third order axial spherical aberration of the objective lens for temperature variation $\Delta T°$ C. within a range of 20° C.–30° C. for ambient temperature.

In the optical pickup apparatus described in (2-6), $$\Delta SA1/\Delta T = k \cdot f(1-m)^4(NA)^4/\lambda \leq 0.00040 \text{ }\lambda\text{rms}/°\text{ C.} \tag{22}$$

is satisfied based on the expression (1) stated above, and therefore, it is possible to conduct recording and reproduction of information on an optical information recording medium, by extending a range of temperatures used and by using light with shorter wavelength (for example, blue laser beam), even when using a conventional optical pickup apparatus employing an objective lens having a numerical aperture of 0.48–0.58, for example, and thereby, it is possible to realize an optical pickup apparatus including an inexpensive and light plastic lens that can comply with an advanced high density optical information recording medium.

An optical pickup apparatus described in (2-7) has therein a light source that emits a light flux having wavelength $\lambda$ nm, an objective lens that converges the light flux emitted from the light source on an information recording surface of an optical information recording medium through a transparent base board of the optical information recording medium, and a photo-detector that receives a reflected light from the optical information recording medium, wherein the objective lens includes a plastic lens having refracting power, a diffraction pattern is provided on at least one surface of the objective lens, wavelength $\lambda$ nm of the above-mentioned light source satisfies the following expression, $$\lambda \leq 680 \text{ nm} \tag{23}$$

and the following expression is satisfied, $$|\Delta SA1/\Delta T| \leq 0.001 \text{ }\lambda\text{rms}/°\text{ C.} \tag{24}$$

when $\Delta SA1$ represents a fluctuation amount of third order axial spherical aberration of the objective lens for temperature variation $\Delta T°$ C. within a range of 20° C.–30° C. for ambient temperature.

In the optical pickup apparatus described in (2-7), $$\Delta SA1/\Delta T = k \cdot f(1-m)^4(NA)^4/\lambda \leq 0.001 \text{ }\lambda\text{rms}/°\text{ C.} \tag{25}$$

is satisfied based on the expression (1) stated above, and therefore, it is possible to conduct recording and reproduction of information on an optical information recording medium, even when using a beam (for example, blue laser beam) whose wavelength is not more than 680 nm that is equal to or shorter than that of a laser beam of an existing optical pickup apparatus, and thereby, it is possible to realize an optical pickup apparatus including an inexpensive and light plastic lens that can comply with an advanced high density optical information recording medium.

An optical pickup apparatus described in (2-8) is characterized in that wavelength $\lambda$ nm of the light source stated above satisfies the following expression showing the shorter wavelength.

$$\lambda \leq 500 \text{ nm} \tag{26}$$

In the optical pickup apparatus described in (2-9), wavelength $\lambda$ nm of the light source and numerical aperture NA of the objective lens on the optical information recording medium side satisfies the following expression, $$0.00015/\text{nm} \leq (NA)^4/\lambda \leq 40/\text{nm} \tag{27}$$

and therefore, it is possible to realize an inexpensive and light optical pickup apparatus which improves temperature characteristics of an optical pickup apparatus for an existing optical information recording medium and can cope with an super high density optical information recording medium that uses near ultra-violet rays and has a large numerical aperture.

In the optical pickup apparatus described in (2-10), wavelength $\lambda$ nm of the light source and numerical aperture NA of the objective lens on the optical information recording medium side satisfies the following expression, $$10 \text{ nm} \leq NA \leq 1100 \text{ nm} \tag{28}$$

and therefore, it is possible to realize an inexpensive and light optical pickup apparatus which improves temperature characteristics of an optical pickup apparatus for an existing optical information recording medium and can cope with an super high density optical information recording medium that uses near ultra-violet rays and has a large numerical aperture.

In the optical pickup apparatus described in (2-11), the following expression is satisfied when $\Delta SA2$ represents a third order axial spherical aberration change amount of the objective lens for wavelength change $\Delta \lambda$ nm within a range of $\pm 5$ nm of wavelength $\lambda$ nm of the light source, $$|\Delta SA2/\Delta \lambda| \leq 0.10 \text{ }\lambda\text{rms}/\text{nm} \tag{29}$$

and therefore, it is possible to construct an optical pickup apparatus wherein an influence of wavelength variation of the light source can be ignored.

In the optical pickup apparatus described in (2-12), the following expression is satisfied when $\Delta f$ $\mu$m represents a focus position change amount of the objective lens for wavelength change $\Delta \lambda 1$ nm within a range of $\pm 5$ nm of wavelength $\lambda$ nm of the light source, $$|\Delta f/\Delta \lambda 1| \leq 200 \tag{29}$$

and therefore, it is possible to construct an optical pickup apparatus wherein an influence of wavelength variation of the light source can be ignored.

In the optical pickup apparatus described in (1-13), at least one surface of the objective lens is an aspherical surface, which makes it possible to reduce spherical aberration with the objective lens alone, and thereby to construct an optical pickup apparatus having excellent tracking characteristics.

In the optical pickup apparatus described in (2-14), at least two surfaces of the objective lens represent an aspherical surface, which makes it possible to reduce spherical aberration with the objective lens alone, and thereby to construct an optical pickup apparatus wherein excellent tracking characteristics can be obtained even when incident light to the objective lens is not parallel light.

In the optical pickup apparatus described in (2-15), the diffraction pattern is formed to be a plurality of ring-shaped bands in a shape of concentric circles whose centers are mostly on an optical axis, and the optical path difference function showing the position of each ring-shaped band of the plural ring-shaped bands includes at least $6^{th}$ power term of the power series, which makes it possible to keep a spherical aberration change amount to be small for fluctuation of ambient temperatures even when the numerical aperture is large.

In the optical pickup apparatus described in (2-16), the objective lens is composed of a single lens representing the plastic lens, which makes it possible to simplify the structure and thereby to lower the cost.

In the optical pickup apparatus described in (2-17), the following expression is satisfied when φ represents a power of the objective lens in wavelength λ nm of the light source and φR represents the refracting power, $$0.3 \leq \phi R/\leq \phi \leq 1.5 \tag{30}$$

and therefore, it is possible to construct an optical pickup apparatus wherein fluctuation of a focus position caused by wavelength variation of a light source is small.

In the optical pickup apparatus described in (2-18), the following expression is satisfied when r1 represents an axial radius of curvature on the base surface of the objective lens opposite to an optical information recording medium, n represents the refractive index of the objective lens and fR mm represents a focal length for refraction, $$1.0 \leq r1/\{(n-1) \cdot fR\} \leq 1.2 \tag{31}$$

and therefore, it is possible to make an amount of an aspherical surface small and thereby to make its manufacture easy.

In the optical pickup apparatus described in (2-19), the following expression is satisfied when Δn represents an amount of refractive index change of the objective lens for temperature change ΔT° C. within a range of 20° C.–30° C. of ambient temperatures, $$-0.002/° C. \leq \Delta n/\Delta T \leq -0.00005/° C. \tag{32}$$

and therefore, it is possible to use resins whose transmissivity is excellent.

The optical pickup apparatus described in (2-20) is characterized in that the objective lens stated above is made of either one of amorphous polyolefin resin, norbornane resin and fluorine resin.

Namely, as plastic materials for an objective lens, there may be used various resin materials including acryl type resins such as "Acrypet VH" made by Mitsubishi Rayon, "Acrypet WF 100" made by Mitsubishi Rayon, "Aptolets OZ-1000" made by Hitachi Kasei and "Barapet MI-91" made by Kurare, amorphous polyolefin type resins such as "ZEONEX" made by Nihon Zeon and "APEL" made by Mitsui Petrol Chemistry, norbornane type resins such as "ARTON" made by Nihon Synthetic Rubber and fluorine type resins such as "O-PET" made by Kanebo. However, amorphous polyolefin type resins such as "ZEONEX" made by Nihon Zeon and "APEL" made by Mitsui Petrol Chemistry, norbornane type resins such as "ARTON" made by Nihon Synthetic Rubber and fluorine type resins such as "O-PET" made by Kanebo are preferable, because they show excellent property for transfer to a metal mold in the course of injection molding and they make it easy to obtain a target of optical capacity. Among them, fluorine type resins which make it possible to shorten the injection molding time and thereby to reduce cost and make high refractive index to be feasible are especially preferable.

The optical pickup apparatus described in (2-21) is characterized in that a flange section is provided on an outer circumference of an optical functional section of the objective lens. Due to the flange section provided, it is possible to secure optical properties of the optical functional section. Further, by providing the surface that is almost perpendicular to an optical axis on the flange section, it is possible to improve accuracy for mounting on the optical pickup apparatus and to attain easy mounting.

The optical pickup apparatus described in (2-22) is characterized in that a cutout section is provided on a part of the flange section. A machined surface of the cutout section that is almost in parallel with an optical axis can be made to take various shapes including a straight line form and an arc shape when it is viewed in the direction of the optical axis, and this cutout section makes it possible to recognize a position of the gate section in the course of injection molding. It is therefore preferable that the position of the cutout section agrees with the position corresponding to the gate section.

The objective lens for the optical pickup apparatus described in (2-23) comprises a plastic single lens having a diffracting pattern on at least one surface thereof and the following expression is satisfied when the objective lens is composed of a plastic single lens having refracting power and having a diffraction pattern on at least one surface, and r1 mm represents an axial radius of curvature of the base surface on the side opposite to that where an optical information recording medium is arranged, n represents refractive index and fR mm represents a focal length for refraction, $$1.0 \leq r1/\{(n-1) \cdot fR\} \leq 1.2 \tag{33}$$

and therefore, it is possible to make an amount of aspherical surface small and to make its manufacturing to be easy.

In the objective lens described in (2-24), the diffraction pattern is formed to be a plurality of ring-shaped bands in a shape of concentric circles whose centers are on an optical axis, and the optical path difference function showing the position of each ring-shaped band of the plural ring-shaped bands includes at least $6^{th}$ power term of the power series, which makes it possible to keep a spherical aberration change amount to be small for fluctuation of ambient temperatures even when the numerical aperture is large.

In the objective lens described in (2-25), at least one surface of the objective lens is an aspherical surface, which makes it possible to reduce spherical aberration with the objective lens alone, and thereby to construct an optical pickup apparatus having excellent tracking characteristics.

In the objective lens described in (2-26), both surfaces of the objective lens represent an aspherical surface, which makes it possible to reduce spherical aberration with the objective lens alone, and thereby to construct an optical pickup apparatus wherein excellent tracking characteristics can be obtained even when incident light to the objective lens is not parallel light.

The objective lens for use in an optical pickup apparatus described in (2-27) comprises at least one plastic lens having refracting power and an axial spherical aberration change amount caused by ambient temperatures is corrected by making at least one surface to be an aspherical surface and spherical aberration is corrected by providing a diffraction pattern on at least one surface, it is possible to keep a spherical aberration change amount to be small for fluctuation of ambient temperatures.

In the objective lens for an optical pickup apparatus described in (2-27), it is possible to control a change of axial spherical aberration caused by a change of refractive index caused by temperature changes that is a drawback of a lens made of resin, by correcting an axial spherical aberration change amount caused by ambient temperature changes with a base surface (envelope surface of a diffraction pattern), and by correcting spherical aberration with a diffraction pattern provided on at least one surface. The objective lens mentioned above may also be one wherein a fine structure (relief) for diffraction representing a refraction pattern is formed on the surface of a lens having refracting power. In this case, an envelope surface of the fine structure for refraction forms a shape of a refraction surface of the lens. For example, it may be an aspherical single objective lens wherein a diffraction pattern of the so-called blazed type is provided on at least one surface thereof, and it may also be a lens wherein ring-shaped bands whose meridian section is serrated are provided on the entire surface on one side, and an envelope surface on one side thereof is an aspherical surface and the other surface is an aspherical surface, or both surfaces are aspherical surfaces.

Namely, the wording of the diffraction pattern (or diffraction surface) used in the present specification means a form (or surface) wherein a relief is provided on the surface of an optical element such as, for example, a lens, and a function of converging light or diverging light through diffraction is provided, and when one optical surface has an area that takes charge of diffraction and an area that does not take charge of diffraction, the area that takes charge of diffraction is called the diffraction pattern. As a form of the relief, there is known a form wherein ring-shaped bands in a shape of concentric circles whose centers are mostly on an optical axis are formed on the surface of an optical element, for example, and a form of this type is included in the form of the relief.

The objective lens described in (2-28) is composed of a single lens representing the plastic lens, which makes it possible to simplify the structure and thereby to lower the cost.

The objective lens for use in an optical pickup apparatus described in (2-29) includes a plastic lens having refracting power, the following expression is satisfied by third order axial spherical aberration change amount $\Delta SAX$ when a light flux having wavelength $\lambda$ nm is made to enter the objective lens having a diffraction pattern on at least one surface thereof from a light source for measurement, and when the third order axial spherical aberration change amount $\Delta SAX$ of the objective lens for temperature change $\Delta T°$ C. within a range of 20° C.–30° C. of ambient temperatures is measured, $$|\Delta SAX/\Delta T| \leq 0.001 \ \lambda rms/° C. \tag{34}$$

and therefore, it is possible to keep an amount of change in spherical aberration for fluctuation of ambient temperatures to be smaller.

In the objective lens described in (1-30), when aforesaid measurement is made by an interferometer of a Fizeau type or by an interferometer of a Twyman-Green type, it is possible to evaluate by interferometers used commonly.

The objective lens described in (2-31) is suitable for an optical pickup apparatus capable of recording and/or reproducing information for a higher density optical information recording medium, because wavelength $\lambda$ nm of the light source for measurement stated above is 680 nm or less.

The objective lens described in (2-32) is suitable for an optical pickup apparatus capable of recording and/or reproducing information for a higher density optical information recording medium, because wavelength $\lambda$ nm of the light source for measurement stated above is 633 nm.

The objective lens described in (2-33) is suitable for an optical pickup apparatus capable of recording and/or reproducing information for a higher density optical information recording medium, because wavelength $\lambda$ nm of the light source for measurement stated above is 500 nm or less.

The objective lens described in (2-34) is suitable for an optical pickup apparatus capable of recording and/or reproducing information for a higher density optical information recording medium, because a numerical aperture thereof on the side where a light flux is emitted is 0.58 or more.

The objective lens described in (2-35) is suitable for an optical pickup apparatus capable of recording and/or reproducing information for a higher density optical information recording medium, because a numerical aperture thereof on the side where a light flux is emitted is 0.62 or more.

In the objective lens described in (2-36), spherical aberration of the objective lens is small because an absolute value of the third order axial spherical aberration component of a wavefront aberration obtained through the measurement stated above is 0.07 $\lambda$rms or less on ambient temperature range of 20° C. to 30° C., which makes it possible to construct an optical pickup apparatus having excellent tracking characteristics.

The objective lens described in (2-37) is an objective lens for use in an optical pickup apparatus to conduct recording and/or reproduction of information for an optical information recording medium equipped with a transparent base board by using light from a light source, comprises a plastic lens having refracting power, and when a light source for measurement capable of emitting measurement light having the wavelength that is mostly the same as a light flux coming from a light source of the optical pickup apparatus to the objective lens and a measurement medium having the refractive index and thickness which are mostly the same as those of the transparent base board of the optical information recording medium are provided to be equal in terms of the relational position between the light source of the optical pickup apparatus and the transparent base board, and when the measurement light having wavelength $\lambda$ nm is made to enter the objective lens, and third order axial spherical aberration change amount $\Delta SAX$ of the objective lens for temperature change $\Delta T°$ C. within a range of 20° C.–30° C. of the objective lens temperature is measured, the third order axial spherical aberration change amount $\Delta SAX$ satisfies the following expression, $$|\Delta SAX/\Delta T| \leq 0.001 \ \lambda rms/° C. \tag{35}$$

and therefore, it is possible to keep an amount of change in spherical aberration for fluctuation of ambient temperatures to be smaller.

In the optical pickup apparatus, optical characteristics which vary depending on temperature change and contributes to deterioration of reproduction signals when controlling a focus are mainly third order spherical aberration. Therefore, a definition and a method of evaluation of the spherical aberration will be described below. With regard to the spherical aberration, there are two ways to express it; one is to express with longitudinal aberration and the other is to express with a wavefront aberration. In the optical design for an optical pickup apparatus for recording and reproducing an optical information recording medium and for an objective lens to be used in the optical pickup apparatus, longitudinal aberration is basically the evaluation means. However, when evaluating actual spherical aberration of the objective lens and the optical pickup apparatus, it is common to use wavefront aberration as an evaluation means. In this case, an interferometer is used for evaluation of the wavefront aberration, then, two-dimensional wavefront aberration distribution is obtained from interference fringes thus obtained, and function fitting is conducted through Zernike's polynomial. An rms value represented by SA3 for third order spherical aberration component of the wavefront aberration can be expressed by the following expression with $Z_{40}$ ($\rho$, $\theta$)=$6\rho^4-\rho^2+1$ coefficient $A_{40}$.

$$SA3=|A_{40}|/\sqrt{5} \tag{36}$$

Incidentally, although the spherical aberration has its own sign, there is no distinction, in the aforesaid definition, between the occasion where the spherical aberration is positive (over) and the occasion where the spherical aberration is negative (under). In this case, therefore, an amount wherein a sign is given to an rms value of the spherical aberration depending on positive $A_{40}$ or negative $A_{40}$ is made to be an rms component of the wavefront aberration. That is expressed by the following expression.

$$SA3=(A_{40}/|A_{40}|)/\sqrt{5} \tag{37}$$

Incidentally, $A_{40}$ takes a positive value when the wavefront is behind the reference spherical surface, namely, when the spherical aberration is over.

Further, the wavefront aberration of an objective lens can be measured by an interferometer of a Fizeau type and an interferometer of a Twyman-Green type. Further, for the wavefront aberration of an optical pickup apparatus, there is used an interferometer of a Mach-Zehnder type of a radial shear. Further, there is available on the market an interferometer having a function to measure wavefront aberration of an optical pickup apparatus and wavefront aberration of an objective lens of the optical pickup apparatus, then, to use Zernike's polynomial for analyses of interference frings, and to obtain an rms value of third order spherical aberration component.

Further, with regard to a means to evaluate temperature specification for wavefront aberration of an objective lens, there is known a method to heat an objective lens section in the Twyman-Green interferometer introduced in the development of the measuring instrument for temperature specification for an objective lens of an optical disk (KONICA TECHNICAL REPORT Vol. 10, p79–p82, 1997).

In the Fizeau interferometer or Twyman-Greem interferometer, there is housed a light source that is usually a He—Ne laser having a wavelength of 633 nm which, however, can be replaced with a laser oscillating another wavelength.

For evaluating temperature characteristics of wavefront aberration of an optical pickup apparatus, an interferometer of a Mach-Zehnder type of a radial shear is used equally, and an optical pickup apparatus section has only to be heated.

The invention makes it possible to improve temperature characteristics of wavefront aberration on an individual objective lens by providing a diffraction pattern on an objective lens including a plastic lens. Incidentally, it is possible to improve temperature characteristics of an optical pickup apparatus without increasing the number of ring-shaped bands of the diffraction pattern carelessly by combination with a known means such as operating a collimator under ambient temperatures, making a collimator to be a diffraction collimator, or making a collimator to be a PL positive lens and a negative glass lens, or by combination with a means to improve temperature change characteristics of wavefront aberration such as making an incident light to an objective lens to be a converged light. Further, the temperature characteristic of wavefront aberration of the optical pickup apparatus does not always need to be perfectly zero, and it has only to be not more than an allowable quantity that is dependent on the numerical aperture of the optical pickup apparatus, a wavelength of a light source and recording density of an optical information recording medium. Practically, therefore, temperature change of wavefront aberration of an individual objective lens does not necessarily need to be zero.

To attain the object mentioned above, the optical pickup apparatus described in (3-1) has therein a light source emitting a light flux having wavelength $\lambda 1$ nm, a light-converging optical system including an objective lens that converges a light flux emitted from the light source on an information recording surface of the optical information recording medium through a transparent base board of the optical information recording medium, and a photo-detector that receives reflected light from the optical information recording medium, and is characterized in that the objective lens is a plastic lens, and the following expressions are satisfied, $$NA(1) \geq 0.49 \tag{1}$$

$$-\tfrac{1}{2} \leq mo1 \leq -\tfrac{1}{7.5} \tag{2}$$

when NA (1) represents a numerical aperture of the objective lens on the optical information recording medium side and mo1 represents an image forming magnification of the objective lens, and the following expression is satisfied when $\Delta SA1$ represents an amount of change in axial spherical aberration of the light-converging optical system for temperature change $\Delta T$ (° C.) in a range of 20° C.–30° C. of ambient temperatures.

$$|\Delta SA1/\Delta T| \leq 0.0005 \; \lambda\text{rms}/° \text{C.} \tag{3}$$

In an optical pickup apparatus that conducts recording and/or reproducing of information for the optical information recording medium whose recording density is the same as or lower than that of DVD, an objective lens may be made to be a single lens by utilizing an aspherical surface or a diffraction- surface. In this case, the objective lens can constitute an optical system of a finite conjugation type that satisfies the following expression (2).

$$-\tfrac{1}{2} \leq mo1 \leq -\tfrac{1}{7.5} \tag{2}$$

If it is possible to make an objective lens to be a single lens as stated above, it is possible to keep an optical pickup apparatus to be compact.

Since the optical pickup apparatus described in (3-2) satisfies the following expression when $\Delta\lambda 1$ nm represents an amount of change in wavelength of the light source for temperature change $\Delta T$ (° C.) in a range of 20° C.–30° C. of ambient temperatures, $$0 \leq \Delta\lambda 1/\Delta T \leq 0.5 \; \text{nm}/° \text{C.} \tag{14}$$

it is possible to keep an amount of change in spherical aberration for fluctuation of ambient temperatures, and to use inexpensive semiconductor lasers.

Since the optical pickup apparatus described in (2-3) satisfies the following expression when $\Delta n1$ represents an amount of change in refractive index of a material of the plastic lens for temperature change $\Delta T$ (° C.) in a range of 20° C.–30° C. of ambient temperatures in the case of wavelength λ1 nm, $$-0.0002/° C.<\Delta n1/\Delta T<-0.00005/° C. \quad (15)$$

it is possible to use resins having excellent transmissivity as materials for an objective lens.

In the optical pickup apparatus described in (3-4), the objective lens is driven in the direction perpendicular to an optical axis of the objective lens for tracking and its relative position to the light source is changed, and thereby, the position where the astigmatism component of wavefront aberration of the light flux which has emerged from the objective lens is minimum is a position where the center of the light flux emitted from the light source is deviated from an optical axis of the objective lens, which makes it possible to broaden the range wherein the astigmatism component is lower than the prescribed value.

Since the optical pickup apparatus described in (3-5) satisfies the following expression when U represents a distance between the light source and the information recording surface of the optical information recording medium, $$10 \text{ mm}<U<40 \text{ mm} \quad (16)$$

it is possible to provide an optical pickup apparatus which is more compact.

The optical pickup apparatus described in (3-6) has therein a first light source with wavelength λ1 nm, a second light source with wavelength λ2 nm (λ2>λ1 nm), a light-converging optical system including an objective lens that converges light fluxes emitted from the first light source and the second light source on an information recording surface of the optical information recording medium through a transparent base board of the optical information recording medium, and a photo-detector that receives reflected light representing a light flux emitted from each of the first and second light sources and is reflected on the optical information recording medium, recording and/or reproducing of information is conducted by the first light flux coming from the first light source for the first optical information recording medium wherein a thickness of a transparent base board is t1, recording and/or reproducing of information is conducted by the second light flux coming from the second light source for the second optical information recording medium wherein a thickness of a transparent base board is t2, the objective lens is a plastic lens, at least one surface of the objective lens has a diffraction pattern, the following expressions hold when NA1 represents a necessary numerical aperture of the light-converging optical system on the optical information recording medium side necessary for recording or reproducing the first optical information recording medium with wavelength λ1, and when NA2 represents a necessary numerical aperture of the light-converging optical system on the optical information recording medium side necessary for recording or reproducing the second optical information recording medium with wavelength λ2, $$t1<t2$$

$$NA1>NA2$$

the following expressions are satisfied when NA (1) represents a numerical aperture of the objective lens on the side of the optical information recording medium for the first light flux, and mo1 represents image forming magnification of the objective lens for the first light flux, $$NA(1) \geq 0.56 \quad (17)$$

$$-\tfrac{1}{5}<mo1<-\tfrac{1}{7.5} \quad (18)$$

and the following expression is satisfied when ΔSA1 represents an amount of change in axial spherical aberration of the light-converging optical system for temperature change ΔT (° C.) in a range of 20° C.–30° C. of ambient temperatures, $$|\Delta SA1/\Delta T| \leq 0.0005 \; \lambda \text{rms}/° C. \quad (19)$$

which makes it possible to provide an inexpensive and compact optical pickup apparatus because aberrations are corrected properly even when light fluxes coming from light sources having different wavelengths are used, and an optical system of a finite conjugation type can be constituted with a single objective lens.

The optical pickup apparatus described in (3-7).is characterized in that the following expression holds when mo2 represents image forming magnification of the objective lens for the second light flux.

$$|mo2-mo1|<0.10 \quad (20)$$

The optical pickup apparatus described in (3-8) is characterized to have a light mixing means capable of mixing the first light flux and the second light flux such as, for example, a beam splitter.

The optical pickup apparatus described in (3-9) is characterized in that an aperture regulating means which allows the first light flux and the central portion of the second light flux to pass through and prohibits the outer area of the second light flux to pass through is provided on the optical path through which the first and second light fluxes pass.

The optical pickup apparatus described in (3-10) is characterized in that the aperture regulating means stated above is integrated solidly with the objective lens.

The optical pickup apparatus described in (3-11) is characterized in that the above-mentioned aperture regulating means integrated solidly with the objective lens is provided on the surface on one side of the objective lens and is of the partial dichroic coating which allows the first light flux and the central portion of the second light flux to pass through and reflects the outer area of the second light flux.

The optical pickup apparatus described in (3-12) is characterized in that the diffraction pattern is provided only on the surface on one side of the objective lens and the partial dichroic coating is provided on the surface where no diffraction pattern is provided.

The optical pickup apparatus described in (3-13) is characterized in that the reflectance of the partial dichroic coating for a light flux having wavelength λ2 is in a range from 30% to 70%.

The optical pickup apparatus described in (3-14) is characterized in that each of both surfaces of the objective lens has a diffraction pattern, and the aperture regulating means integrated solidly with the objective lens is a partial diffraction pattern that is provided on the surface on one side of the objective lens to allow the first light flux and the central portion of the second light flux to pass through and to diffract the outer area of the second light flux.

The optical pickup apparatus described in (3-15) is characterized in that a beam spot is formed by utilizing mainly an inner light flux and an outer light flux in a light flux emitted from the first light source, and information is recorded and/or reproduced for the first optical information recording medium, and a beam spot is formed by utilizing mainly an inner light flux and an intermediate light flux in a light flux emitted from the second light source, and information is recorded and/or reproduced for the second optical information recording medium, when a light flux entering the information recording surface is divided into at least three light fluxes including an inner light flux near an optical axis, an intermediate light flux that is located outside the inner light flux, and an outer light flux that is located outside the intermediate light flux.

The optical pickup apparatus described in (3-16) is characterized in-that third order spherical aberration component of wavefront aberration of the inner area that enters an information recording surface of the second optical information recording medium in a light flux emitted from the second light source is under.

The optical pickup apparatus described in (3-17) is characterized in that the photo-detector is common for both the first light source and the second light source.

The optical pickup apparatus described in (3-18) is characterized in that the first light source is equipped with the first photo-detector and the second light source is equipped with the second photo-detector separately, and the first photo-detector and the second photo-detector are positioned to be away from each other spatially.

The optical pickup apparatus described in (3-19) is characterized in that at least the first light source and the first photo-detector, or the second light source and the second photo-detector are integrally unitized.

The optical pickup apparatus described in (3-20) is characterized in that the first light source, the second light source and the common photo-detector (a single photo-detector) are integrally unitized.

The optical pickup apparatus described in (3-21) is characterized in that the first photo-detector for the first light source is separate from the second photo-detector for the second light source with regard to the photo-detector, and the first light source, the second light source, the first photo-detector and the second photo-detector are integrally unitized.

The optical pickup apparatus described in (3-22) is characterized in that the first light source and the second light source are integrally unitized and are positioned to be away from the photo-detector spatially.

The optical pickup apparatus described in (3-23) is characterized in that a coupling lens that makes divergence of a light flux emitted from a light source to be small is provided in at least one of an optical path from the first light source to the objective lens and an optical path from the second light source to the objective lens.

In the optical pickup apparatus described in (3-24) having therein a light source with wavelength $\lambda 1$ nm, a light-converging optical system including an objective lens that converges a light flux emitted from the light source on an information recording surface of the optical information recording medium through a transparent base board of the optical information recording medium, and a photo-detector that receives reflected light representing a light flux emitted from the light source and is reflected on the optical information recording medium, recording and/or reproducing of information is conducted by the light flux coming from the light source for the first optical information recording medium wherein a thickness of a transparent base board is t1 and for the second optical information recording medium wherein a thickness of a transparent base board is t2, the objective lens is a plastic lens, at least one surface of the objective lens has a diffraction pattern, the following expressions hold when NA1 represents a necessary numerical aperture of the light-converging optical system on the optical information recording medium side necessary for recording or reproducing the first optical information recording medium with wavelength $\lambda 1$, and when NA2 represents a necessary numerical aperture of the light-converging optical system on the optical information recording medium side necessary for recording or reproducing the second optical information recording medium with wavelength $\lambda 1$, $$t1 < t2$$

$$NA1 > NA2$$

the following expression is satisfied when mo1 represents image forming magnification of the objective lens, $$-\tfrac{1}{5} \leq mo1 \leq -\tfrac{1}{7.5} \tag{22}$$

the following expression is satisfied when $\Delta SA1$ represents an amount of change in axial spherical aberration of the light-converging optical system for temperature change $\Delta T$ (° C.) in a range of 20° C.–30° C. of ambient temperatures, $$|\Delta SA1/\Delta T| \leq 0.0005 \; \lambda\text{rms}/°\text{C.} \tag{23}$$

and there is provided an aperture regulating means which allows a central portion of the light flux emitted from a light source to pass through and intercepts an outer area of the light flux when conducting recording and/or reproducing for the second optical information recording medium, which makes it possible to provide an inexpensive and compact optical pickup apparatus because aberrations are corrected properly even when light fluxes coming from light sources having different wavelengths are used, and an optical system of a finite conjugation type can be constituted with a single objective lens.

The objective lens described in (3-25) is an objective lens for an optical pickup apparatus having therein a light source emitting a light flux with wavelength $\lambda 1$ nm, a light-converging optical system including an objective lens that converges a light flux emitted from the light source on an information recording surface of the optical information recording medium through a transparent base board of the optical information recording medium, and a photo-detector that receives reflected light coming from the optical information recording medium, and the objective lens is a plastic lens, at least one surface of the objective lens has a diffraction pattern, the following expressions hold when NA (1) represents a numerical aperture of the objective lens on the optical information recording medium side, $$NA(1) \geq 0.49 \tag{1}$$

$$-\tfrac{1}{5} \leq mo1 \leq -\tfrac{1}{7.5} \tag{2}$$

and the following expression is satisfied when $\Delta SA1$ represents an amount of change in axial spherical aberration of the light-converging optical system for temperature change $\Delta T$ (° C.) in a range of 20° C.–30° C. of ambient temperatures.

$$|\Delta SA1/\Delta T| \leq 0.0005 \; \lambda\text{rms}/°\text{C.} \tag{3}$$

Therefore, the objective lens is ideal as one for an optical pickup apparatus capable of conducting recording and/or reproducing of information for an optical information recording medium having higher information density, because aberrations can be corrected properly even in the case of a high numerical apertures, and an inexpensive and compact optical pickup apparatus can be provided, because an optical system of a finite conjugation type can be constituted with a single objective lens.

The objective lens described in (3-26) is characterized in that the following expression is satisfied when Δλ1 represents an amount of change in wavelength of the light source for temperature change ΔT (° C.) in a range of 20° C.–30° C. of ambient temperatures.

$$0 \leq \Delta\lambda 1/\Delta T \leq 0.5 \text{ nm/}° \text{C.} \tag{14}$$

The objective lens described in (3-27) is characterized in that the following expression is satisfied when Δn1 represents an amount of change in refractive index of materials of the plastic lens for temperature change ΔT (° C.) in a range of 20° C.–30° C. of ambient temperatures.

$$-0.0002/° \text{C.} < \Delta n 1/\Delta T < -0.00005/° \text{C.} \tag{15}$$

The objective lens described in (3-28) is characterized in that the relative position between the objective lens and the light source is changed when the objective lens is driven in the direction perpendicular to an optical axis of the objective lens for the reason of tracking in the optical pickup apparatus, and the position where the astigmatism component of wavefront aberration of the light flux emerged out of the objective lens is minimum is a position where the center of a light flux emitted from the light source is deviated from an optical axis of the objective lens.

The objective lens described in (3-29) is characterized in that the following expression is satisfied when U represents a distance between the light source and an information recording surface of the optical information recording medium in the optical pickup apparatus.

$$10 \text{ mm} < U < 40 \text{ mm} \tag{16}$$

The optical pickup apparatus described in (3-30) is an objective lens of an optical pickup apparatus having therein a first light source with wavelength λ1 nm, a second light source with wavelength λ2 nm (λ2>λ1), a light-converging optical system including an objective lens that converges a light flux emitted from the first light source and a light source emitted from the second light source on an information recording surface of the optical information recording medium through a transparent base board of the optical information recording medium, and a photo-detector that receives reflected light representing a light flux emitted from the first light source and a light flux emitted from the second light source reflected on the optical information recording medium, wherein recording and/or reproducing of information is conducted by the first light flux emitted from the first light source for the first optical information recording medium wherein a thickness of the transparent base board is t1, and recording and/or reproducing of information is conducted by the second light flux emitted from the second light source for the second optical information recording medium wherein a thickness of the transparent base board is t2, the objective lens is a plastic lens, at least one surface of the objective lens has a diffraction pattern, the following expressions hold when NA1 represents a necessary numerical aperture of the light-converging optical system on the optical information recording medium side necessary for recording or reproducing the first optical information recording medium with wavelength λ1, and when NA2 represents a necessary numerical aperture of the light-converging optical system on the optical information recording medium side necessary for recording or reproducing the second optical information recording medium with wavelength λ2, $$t1 < t2$$

$$NA1 > NA2$$

the following expressions are satisfied when NA (1) represents a numerical aperture of the objective lens on the optical information recording medium side for the first light flux and mo1 represents image forming magnification of the objective lens for the first light flux, $$NA(1) \geq 0.56 \tag{17}$$

$$-\frac{1}{5} \leq mo1 \leq -\frac{1}{7.5} \tag{18}$$

and the following expression is satisfied when ΔSA1 represents an amount of change in axial spherical aberration of the light-converging optical system for temperature change ΔT (° C.) in a range of 20° C.–30° C. of ambient temperatures.

$$|\Delta SA1/\Delta T| \leq 0.0005 \text{ λrms/}° \text{C.} \tag{19}$$

which makes it possible to correct aberrations properly even when light fluxes emitted from light sources having different wavelengths are used, and to provide an inexpensive and compact optical pickup apparatus because an optical system of a finite conjugation type can be constituted with a single objective lens.

The objective lens described in (3-31) is characterized in that the following expression is satisfied when mo2 represents an image forming magnification of the objective lens for the second light flux.

$$|mo2 - mo1| < 0.10 \tag{20}$$

The objective lens described in (3-32) is characterized in that the optical pickup apparatus has light mixing means capable of mixing the first light flux and the second light flux.

The objective lens described in (3-33) is characterized in that an aperture regulating means which allows the first light flux and a central portion of the second light flux to pass through and intercepts an outer area of the second light flux is provided in the optical path through which the first light flux and the second light flux pass commonly, in the optical pickup apparatus.

The objective lens described in (3-34) is characterized in that the aperture regulating means is unitized integrally with the objective lens.

The objective lens described in (3-35) is characterized in that the aperture regulating means unitized integrally with the objective lens is provided on the surface on one side of the objective lens, and it represents partial dichroic coating that allows the first light flux and a central portion of the second light flux to pass through it and reflects an outer area of the second light flux.

The objective lens described in-(3-36) is characterized in that the diffraction pattern is provided on only one side of the objective lens, and the partial dichroic coating is provided on the side where no diffraction pattern is provided.

The objective lens described in (3-37) is characterized in that the reflectance of the partial dichroic coating for the light flux with wavelength λ2 is within a range of 30%–70%.

The objective lens described in (3-38) is characterized in that diffraction patterns are provided on both sides of the objective lens, and the aperture regulating means unitized with the objective lens represents partial diffraction pattern which allows the first light flux provided on the surface on one side of the objective lens and a central portion of the second light flux to pass through and diffracts an outer area of the second light flux.

The objective lens described in (3-39) is characterized in that a beam spot is formed by using maily an inner light flux and an outer light flux in a light flux emitted from the first light source, and recording and/or reproducing of information is conducted for the first optical information recording medium, and a beam spot is formed by using mainly an inner light flux and an intermediate light flux in a light flux emitted from the second light source, and recording and/or reproducing of information is conducted for the second optical information recording medium, when a light flux entering the information recording surface is divided into an inner light flux near an optical axis, an intermediate light flux that is outside the inner light flux, and an outer light flux that is outside the intermediate light flux, in the optical pickup apparatus.

The objective lens described in (3-40) is characterized in that third order spherical aberration component of wavefront aberration of the inner area that enters an information recording surface of the second optical information recording medium in a light flux emitted from the second light source is under, in the optical pickup apparatus.

The objective lens described in (3-41) is characterized in that the photo-detector of the optical pickup apparatus is common for both the first light source and the second light source.

The objective lens described in (3-42) is characterized in that the first light source is equipped with the first photo-detector and the second light source is equipped with the second photo-detector separately, and the first photo-detector and the second photo-detector are positioned to be away from each other spatially.

The objective lens described in (3-43) is characterized in that at least a pair of the first light source and the first photo-detector or a pair of the second light source and the second photo-detector is unitized, in the optical pickup apparatus.

The objective lens described in (3-44) is characterized in that the first light source, the second light source and the common photo-detector (a single photo-detector) are unitized in the optical pickup apparatus.

The objective lens described in (3-45) is characterized in that the first photo-detector for the first light source and the second photo-detector for the second light source are separate each other in the photo-detector of the optical pickup apparatus, and the first light source, the second light source, the first photo-detector and the second photo-detector are unitized.

The objective lens described in (3-46) is characterized in that the first light source and the second light source are unitized, and they are located to be away from the photo-detector spatially, in the optical pickup apparatus.

The objective lens described in (3-47) is characterized in that a coupling lens that makes divergence of a light flux emitted from a light source to be small is provided in at least one of an optical path from the first light source to the objective lens and an optical path from the second light source to the objective lens, in the optical pickup apparatus.

The objective lens described in (3-48) is an objective lens for an optical pickup apparatus having therein a light source emitting a light flux with wavelength $\lambda 1$ nm, a light-converging optical system including an objective lens that converges a light flux emitted from the light source on an information recording surface of the optical information recording medium through a transparent base board of the optical information recording medium, and a photo-detector that receives reflected light coming from the optical information recording medium, wherein the optical pickup apparatus conducts recording or reproducing of information using a light flux emitted from the light source, for the first optical information recording medium whose transparent base board has a thickness of t1 and for the second optical information recording medium whose transparent base board has a thickness of t2, the objective lens is a plastic lens, at least one surface of the objective lens has a diffraction pattern, the following expressions hold when NA1 represents a necessary numerical aperture of the light-converging optical system on the optical information recording medium side necessary for recording or reproducing the first optical information recording medium with wavelength $\lambda 1$, and when NA2 represents a necessary numerical aperture of the light-converging optical system on the optical information recording medium side necessary for recording or reproducing the second optical information recording medium with wavelength $\lambda 1$, $$t1 < t2$$

$$NA1 > NA2$$

the following expression is satisfied when mo1 represents image forming magnification of the objective lens, $$-1/5 \leq mo1 \leq -1/7.5 \qquad (22)$$

the following expression is satisfied when $\Delta SA1$ represents an amount of change in axial spherical aberration of the light-converging optical system for temperature change $\Delta T$ (° C.) in a range of 20° C.–30° C. of ambient temperatures, $$|\Delta SA1/\Delta T| \leq 0.0005 \ \lambda \text{rms}/° \text{C.} \qquad (23)$$

and there is provided an aperture regulating means that transmits the central portion of a light flux emitted from a light source and intercepts an outer area thereof for recording and/or reproducing of the second optical information recording medium, which makes it possible to correct aberrations properly even when light fluxes emitted from light sources having different wavelengths are used, and to provide an inexpensive and compact optical pickup apparatus because an optical system of a finite conjugation type can be constituted with a single objective lens.

The objective lens described in (3-49) is a plastic lens having a diffraction pattern on at least one surface thereof which is characterized in that the following expression holds when $\Delta Z$ represents an amount of astigmatism.

$$0.2 \ \mu m < \Delta Z < 0.7 \ \mu m \qquad (24)$$

The objective lens of this kind makes it possible to correct effectively an astigmatism component caused by deviation from an optical axis, even when an optical system of an infinite conjugation type is constituted.

The objective lens described in (3-50) is characterized in that an axial chromatic aberration is over-corrected in the vicinity of the wavelength used.

The objective lens described in (3-51) is a plastic lens that is characterized in that the following expression is satisfied when Mmin represents image forming magnification of the objective lens at which the third order spherical aberration component of the wavefront aberration is minimum when a light source with wavelength of 620 nm–680 nm is arranged and a polycarbonate transparent base board having a thickness of 0.6 mm is arranged on the side opposite to that for the light source and the third order spherical aberration component is measured through the transparent base board, $$-1/5 \leq \text{Mmin} \leq -1/12 \qquad (25)$$

and at least one surface has thereon a diffraction pattern.

The objective lens described in (3-52) is characterized in that the following expression is satisfied by the image forming magnification Mmin.

$$-1/5 \leq \text{Mmin} \leq -1/7.5 \quad (26)$$

In the objective lens of the invention, it is possible to repress a change in axial spherical aberration caused by a change of refractive index caused by temperature fluctuation that is a weak point of a resin-made lens, by correcting, with a base surface (enveloping surface of a diffraction pattern), the axial spherical aberration change amount caused by ambient temperature fluctuation, and by correcting spherical aberration with a diffraction pattern provided on at least one surface. The objective lens of this kind may be one wherein the fine construction (relief) for diffraction representing a diffraction pattern is formed on the surface of the lens having refracting power. In this case, an enveloping surface of the fine construction for diffraction is a form of a refraction surface of the lens. For example, it may also be a lens wherein a diffraction pattern of the so-called blazed type is provided on at least one side of an aspherical single objective lens, and ring-shaped bands whose meridinal section is serrated are provided on an entire surface on at least one side, and an enveloping surface of the surface on one side is an aspherical surface while the other side is aspherical, or both sides are aspherical.

Namely, the diffraction pattern (or refraction surface) used in the present specification means a form (or surface) having functions to converge or to diverge a light flux through diffraction that is carried out by a relief provided on the surface of an optical element, for example, of a lens. When an area where diffraction is caused and an area where no diffraction is caused are arranged on one optical surface, the area where diffraction is caused means the diffraction pattern. A form of the relief includes, for example, a form wherein ring-shaped bands which are mostly concentric circles whose centers are on an optical axis are formed on the surface of an optical element, and a section of each ring-shaped band is known to be serrated when it is viewed in a plane including an optical axis.

In the present specification, the objective lens means, in a narrow sense, a piece of lens having a light-converging function that is arranged at the position closest to an optical information recording medium to face it under the condition that the optical information recording medium is loaded on an optical pickup apparatus, and it means, in a broad sense, a lens group which can be moved together with the aforesaid lens in at least the direction its optical axis by an actuator. The lens group in this case means at least one or more lenses, and it includes also one composed of a single lens only. Therefore, numerical aperture NA of the objective lens on the optical information recording medium side means numerical aperture NA of the objective lens surface positioned to be closest to the optical information recording medium. Further, the numerical aperture NA is numerical aperture NA defined to be the result wherein a light flux emitted from the light source is restricted by parts or members having stopping functions such as a diaphragm and a filter provided on the optical pickup apparatus.

In the present specification, the optical information recording media include various CDs such as, for example, CD-R, CD-RW, CD-Video and CD-ROM, various DVDs such as DVD-OM, DVD-RAM, DVD-R, DVD-RW and DVD-Video, or existing disk-shaped optical information recording media such as MD and advanced recording media. On an information recording surface of each of many optical information recording media, there is provided a transparent base board. However, some optical information recording media wherein a thickness of a transparent base board is almost zero, or a transparent base board is not provided at all are also existing, or, they have been proposed. Though there is a description saying "through a transparent base board" in the present specification for the convenience of explanation, it also includes an occasion where a thickness of the transparent base board is zero, namely, the transparent base board is not provided at all.

In this specification, recording and reproduction of information mean respectively recording the information on an information recording surface of the information recording medium mentioned above and reproducing the information recorded on the information recording surface. An optical pickup apparatus of the invention may be either one used only for recording or reproducing, or one used for both recording and reproducing. It may further be one used for recording for a certain information recording medium and for reproducing for another information recording medium, or, it may be one used for recording or reproducing for a certain information recording medium and for recording and reproducing for another information recording medium. Incidentally, the wording of reproducing mentioned here includes mere reading of information.

An optical pickup apparatus of the invention may be housed in an apparatus for recording and/or reproducing voice and/or image, such as various players or drives, or AV equipment, personal computers and other information terminals. It may be preferable that these apparatus comprise a spindle motor.

An ideal embodiment of the invention will be explained as follows, referring to drawings.

In general, a pitch of diffraction ring-shaped bands (position of each ring-shaped band) is defined by the use of a phase difference function which will be explained minutely in the example stated later or by the use of an optical path difference function. To be concrete, phase difference function $\Phi b$ is expressed by the following expression (1) with a unit of radian, while, optical path difference function $\Phi B$ is expressed by the following expression (2) with a unit of mm.

Expression (1)

$$\Phi_b = \sum_{i=1}^{\infty} b_{2i} h^{2i}$$

Expression (2)

$$\Phi_B = \sum_{i=1}^{\infty} B_{2i} h^{2i}$$

These two methods of expression are different each other in terms of unit, but they are the same in terms of meaning to express a pitch for diffraction ring-shaped bands. Namely, if coefficient b of a phase difference function is multiplied by $\lambda/2\pi$ for dominant wavelength $\lambda$ (unit: mm, it is possible to convert into coefficient B of the optical path difference function, and if the coefficient B of the optical path difference function is multiplied by $2\pi/\lambda$, it is possible to convert into coefficient b of the optical path difference function.

Now, a diffraction lens employing primary diffraction light will be explained to make the explanation simple. In that case, ring-shaped bands are formed each time the function value exceeds a multiple of integer of dominant wavelength $\lambda$ for the optical path difference function, while, ring-shaped bands are formed each time the function value exceeds a multiple of integer of $2\pi$ for the phase difference function.

For example, when dominant wavelength is $0.5\mu = 0.0005$ mm, secondary coefficient of an optical path difference function (the second power term) is $-0.05$ (which indicates $-628.3$ when it is converted into the secondary coefficient of the phase difference function), and all of coefficients of other orders are zero in the assumption of a cylindrical lens having no refracting power wherein diffraction ring-shaped bands are formed on the side closer to a subject among both sides of the lens, radius h of the first ring-shaped band is 0.1 mm and radius h of the second ring-shaped band is 0.141 mm. With regard to focal length f of the diffraction lens, it is known that $f = -1/(2 \cdot B2) = 10$ mm holds for secondary coefficient $B2$ of the optical path difference function $= -0.05$.

Based on the definition stated above, it is possible to make a lens to have power by making the secondary coefficient of the phase difference function or of the optical path difference function to take a value that is not zero. It is also possible to control spherical aberration by making coefficients other than the secondary coefficient of the phase difference function or of the optical path difference function including, for example, $4^{th}$ power coefficient, $6^{th}$ power coefficient, $8^{th}$ power coefficient and $10^{th}$ power coefficient to take a value that is not zero. Incidentally, the wording "control" used in this case is to correct the spherical aberration of the section having refractive power by generating reverse spherical aberration, or by making all spherical aberrations to have desired values.

EXAMPLES

Concrete examples of the objective lens will be explained as follows.

The objective lens for an optical pickup apparatus in Examples 1–5 has an aspherical surface form expressed by the following expression 3 on each of its both optical surfaces.

Expression 3

$$z = \frac{h^2/R_0}{1 + \sqrt{1 - (1+\kappa)(h/R_0)^2}} + \sum_{i=1}^{\infty} A_i h^{P_i}$$

In the above expression, Z represents an axis in the direction of an optical axis, h represents an axis in the direction perpendicular to the optical axis (for the height from the optical axis, the direction of light advancement is positive), Ro represents an axial radius of curvature, $\kappa$ represents a constant of the cone, A represents a constant of the aspheric surface and P represents the power number.

Table 1 shows refracting power rate $\phi R/\phi$ in each Example, r1, refractive index n, focal length f, a ring-shaped bands minimum pitch and a value of the following expression (38). In the expression, fR is a focal length for refraction.

$$R1/\{(n-1) \cdot fR\} \quad (38)$$

TABLE 1

| Example No. | $\phi$ R/$\phi$ | r1/(n−1) fr | r1 | n | f | Number of ring-shaped bands | Minimum pitch ($\mu$m) |
|---|---|---|---|---|---|---|---|
| 1 | 0.78 | 1.08 | 1.55720 | 1.55720 | 2.14 | 445 | 1.1 |
| 2 | 0.50 | 1.06 | 3.37969 | 3.37969 | 2.75 | 512 | 1.4 |
| 3 | 0.60 | 1.15 | 3.05633 | 3.05633 | 2.75 | 439 | 1.6 |
| 4 | 0.78 | 1.13 | 2.30026 | 2.30026 | 2.75 | 269 | 2.7 |
| 5 | 0.90 | 1.13 | 2.00228 | 2.00228 | 2.75 | 159 | 4 |
| 6 | 0.95 | 1.14 | 1.91187 | 1.91187 | 2.75 | 103 | 5.2 |
| 7 | 1.00 | 1.15 | 1.83457 | 1.83457 | 2.75 | 62 | 6.9 |
| 8 | 1.10 | 1.17 | 1.68602 | 1.68602 | 2.75 | 49 | 22.1 |
| 9 | 0.95 | 1.14 | 1.91187 | 1.91187 | 2.75 | 82 | 7.5 |
| Comparative Example 1 | 1.00 | 1.22 | 1.37228 | 1.37228 | 2.14 | | |
| Comparative Example 2 | 1.00 | 1.17 | 1.85619 | 1.85619 | 2.75 | | |

Example 1

Figure 2:
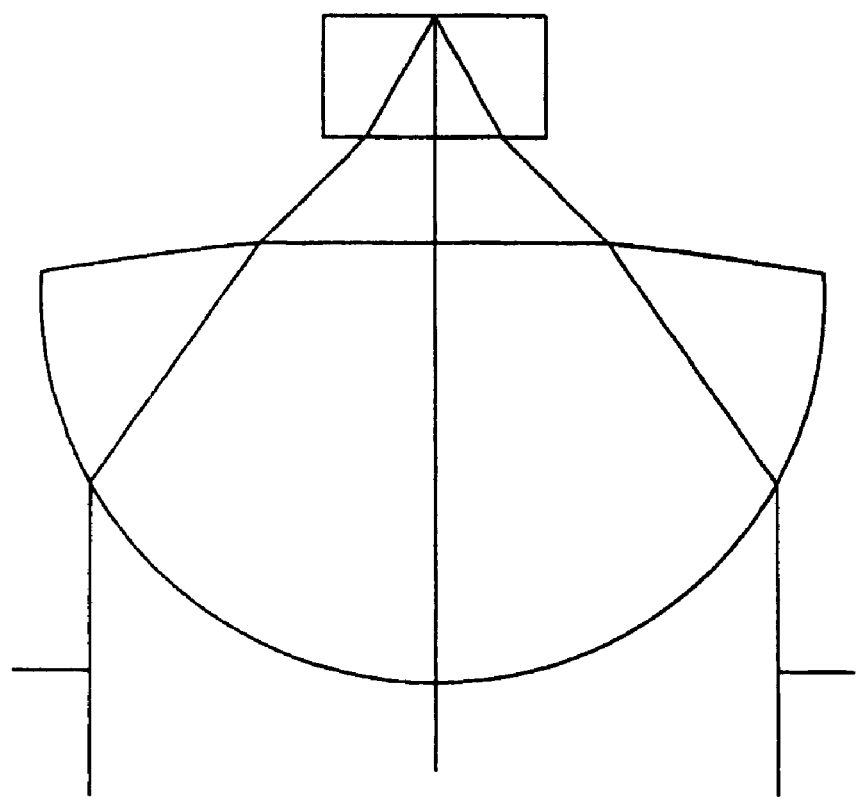
FIG. 2 is a sectional view relating to the objective lens in Example 1.
Figure 3:
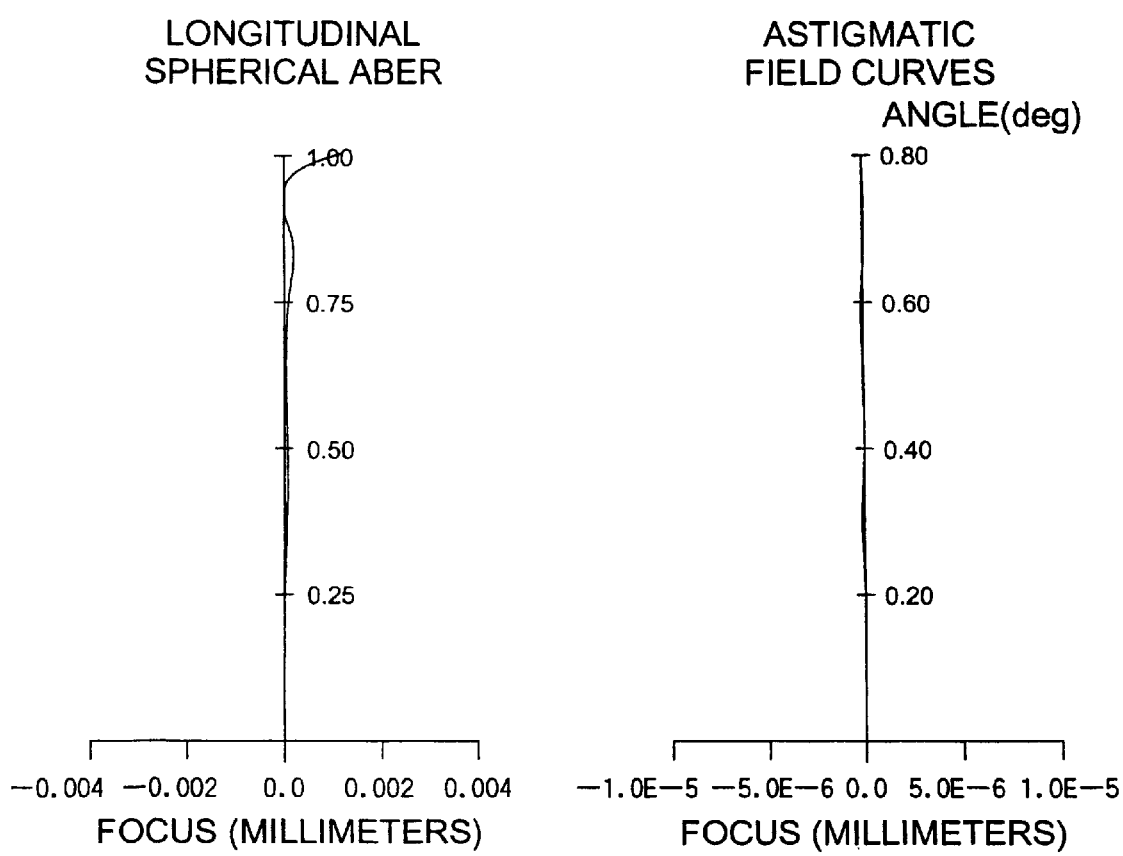
FIG. 3 shows a spherical aberration diagram and an astigmatism diagram under the conditions of the standard wavelength and standard temperature (25° C.) relating to the objective lens in Example 1.

Example 1, standard wavelength $\lambda$ is 400 nm, focal length f is 2.14 mm, a numerical aperture is 0.70, and olefin resins are used as materials. Table 2 shows lend data, FIG. 2 shows a sectional view, and FIG. 3 shows a standard wavelength, and spherical aberration diagram and astigmatism diagram both at standard temperature (25° C.). On the other hand, Table 3 shows a spherical aberration value for temperature change (±30° C.) and wavelength change ($\lambda$±10 nm). Incidentally, third order spherical aberration only is shown here, bacause a third order spherical aberration component is a main portion of a change of spherical aberration caused by temperature change and wavelength change. In the Table, there is shown a single lens for refraction only designed to be the same in terms of focal length, numerical aperture and materials, as Comparative Example. In the present Example, the spherical aberration change caused by temperature change generated on the lens in Comparative Example is corrected sufficiently. Incidentally, in the lens data shown in Table 2 and in other Tables, the power number for 10 (for example, $3 \times 10^{-2}$) is expressed by using E (for example, 3E-2).

TABLE 2

| fo = 2.14 | NA = 0.70 | $\phi$ R/$\phi$ = 0.78 | |
|---|---|---|---|
| Standard wavelength $\lambda$ = 400 nm | | | |
| i | ri | di | Materials |
| 1 | ∞ | ∞ | |
| 2 | 1.5572 | 2.000 | Olefin resin |
| 3 | −9.90803 | 0.520 | |
| 4 | ∞ | 0.600 | PC |

| Aspherical surface data | | | |
|---|---|---|---|
| Second surface Aspherical surface coefficient | | | |
| k | −1.78220E−01 | | |
| A1 | −7.26140E−03 | P1 | 4.0 |
| A2 | −5.52710E−03 | P2 | 6.0 |
| A3 | 2.47530E−03 | P3 | 8.0 |
| A4 | −1.02020E−03 | P4 | 10.0 |
| Optical path difference function | | | |
| B2 | −5.42630E−02 | | |
| B4 | −6.83350E−03 | | |
| B6 | −1.92900E−03 | | |
| B8 | 6.16120E−04 | | |
| B10 | −2.71760E−04 | | |
| Third surface Aspherical surface coefficient | | | |
| k | −1.1254844E+03 | | |
| A1 | 8.17572E−02 | P1 | 4.0 |
| A2 | 1.41887E−01 | P2 | 6.0 |
| A3 | −2.97576E−01 | P3 | 8.0 |
| A4 | 2.41422E−01 | P4 | 10.0 |

TABLE 3

| Example No. | ϕR/ϕ | Wavelength (nm) | ΔT (°C.) | −30 | 0 | 30 | fb (μm) |
|---|---|---|---|---|---|---|---|
| 1 | 0.78 | 410 | SA3 (λrms) | −0.167 | −0.166 | −0.164 | −10.0 |
| | | 400 | SA3 | −0.003 | 0.002 | 0.006 | 0.0 |

TABLE 3-continued

| Example No. | ϕR/ϕ | Wavelength (nm) | ΔT (°C.) | −30 | 0 | 30 | fb (μm) |
|---|---|---|---|---|---|---|---|
| | | 390 | SA3 (λrms) | 0.180 | 0.189 | 0.197 | 9.7 |
| Comparative Example 1 | 1 | 410 | SA3 (λrms) | −0.037 | 0.035 | 0.104 | 3.8 |
| | | 400 | SA3 (λrms) | −0.069 | 0.002 | 0.077 | 0.0 |
| | | 390 | SA3 (λrms) | −0.107 | −0.032 | 0.043 | −3.9 |

In the specifications of Examples 2–9, a ratio of refracting power ϕR/ϕ is in a range of 0.5–1.1, standard wavelength λ is 650 nm, focal length f is 2.14 mm, a numerical aperture is 0.65 and PC (polycarbonate) resin is used as a material.

Table 4 shows spherical aberration values for temperature change (standard temperature ±30° C.) and wavelength change (standard wavelength ±10 nm). Incidentally, third order spherical aberration only is shown here, because a main portion of the spherical aberration change caused by temperature change and wavelength change is third order spherical aberration component. In the Table, there is shown, as a comparative example, a single lens having only the refraction system designed with the same focal length, the same numerical aperture and the same materials. An amount of a change of focal length between the standard wavelength at the standard temperature and the moment when the standard wavelength is changed by ±10 nm at the standard temperature is shown by with fb in the Table.

TABLE 4

| Example No. | ϕR/ϕ | Wavelength (nm) | ΔT(°C.) | −30 | 0 | 30 | fb(μm) |
|---|---|---|---|---|---|---|---|
| 2 | 0.5 | 660 | SA3 (λrms) | 0.007 | 0.008 | 0.009 | −20.6 |
| | | 650 | SA3 (λrms) | −0.002 | 0.000 | 0.002 | 0.0 |
| | | 640 | SA3 (λrms) | −0.012 | −0.010 | −0.008 | 20.9 |
| 3 | 0.6 | 660 | SA3 (λrms) | −0.020 | −0.021 | −0.023 | −16.7 |
| | | 650 | SA3 (λrms) | 0.001 | −0.002 | −0.002 | 0.0 |
| | | 640 | SA3 (λrms) | 0.021 | 0.020 | 0.019 | 16.9 |
| 4 | 0.78 | 660 | SA3 (λrms) | −0.029 | −0.029 | −0.031 | −8.4 |
| | | 650 | SA3 (λrms) | 0.001 | 0.001 | −0.001 | 0.0 |
| | | 640 | SA3 (λrms) | 0.032 | 0.032 | 0.030 | 8.3 |
| 5 | 0.9 | 660 | SA3 (λrms) | −0.046 | −0.046 | −0.047 | −2.6 |
| | | 650 | SA3 (λrms) | −0.002 | 0.000 | 0.002 | 0.0 |
| | | 640 | SA3 (λrms) | 0.050 | 0.050 | 0.049 | 2.5 |
| 6 | 0.95 | 660 | SA3 (λrms) | −0.053 | −0.052 | −0.052 | −0.1 |
| | | 650 | SA3 (λrms) | 0.000 | 0.001 | 0.001 | 0.0 |
| | | 640 | SA3 (λrms) | 0.055 | 0.057 | 0.057 | 0.0 |
| 7 | 1 | 660 | SA3 (λrms) | −0.062 | −0.062 | −0.064 | 2.4 |
| | | 650 | SA3 (λrms) | −0.002 | −0.001 | 0.001 | 0.0 |
| | | 640 | SA3 (λrms) | 0.067 | 0.067 | 0.066 | −2.6 |
| 8 | 1.1 | 660 | SA3 (λrms) | −0.052 | −0.057 | −0.063 | 7.9 |
| | | 650 | SA3 (λrms) | 0.002 | 0.001 | 0.000 | 0.0 |
| | | 640 | SA3 (λrms) | 0.065 | 0.062 | 0.056 | −7.9 |
| 9 | 0.95 | 660 | SA3 (λrms) | −0.041 | −0.024 | −0.008 | −0.1 |
| | | 650 | SA3 (λrms) | −0.013 | 0.001 | 0.015 | 0.0 |
| | | 640 | SA3 (λrms) | −0.009 | 0.027 | 0.043 | 0.0 |
| Comparative Example2 | 1 | 660 | SA3 (λrms) | −0.025 | 0.007 | 0.040 | 2.5 |
| | | 650 | SA3 (λrms) | −0.031 | 0.001 | 0.034 | 0.0 |
| | | 640 | SA3 (λrms) | −0.038 | −0.006 | 0.028 | −2.5 | f = 2.75
NA = 0.65

The values of ΔSA1/ΔT, ΔSA2/Δλ, and (ΔSA2/Δλ1)×(ΔSA1/ΔT) in Examples 1 to 9 and Comparative Example 1 and 2 are indicated in the following Table.

| Example No. | ΔSA1/ΔT | ΔSA2/Δλ | (ΔSA2/ΔT) × (ΔSA1/Δλ) |
|---|---|---|---|
| Example No. 1 | 0.00015 | −0.01775 | −2.7E−06 |
| Comparative Example No. 1 | 0.00243 | 0.00335 | 8.2E−06 |
| Example No. 2 | 0.00007 | 0.00090 | 6.0E−08 |
| Example No. 3 | −0.00005 | −0.00205 | 1.0E−07 |
| Example No. 4 | −0.00003 | −0.00305 | 1.0E−07 |
| Example No. 5 | 0.00007 | −0.00480 | −3.2E−07 |
| Example No. 6 | 0.00002 | −0.00545 | −9.1E−08 |
| Example No. 7 | 0.00005 | −0.00645 | −3.2E−07 |
| Example No. 8 | −0.00003 | −0.00595 | 2.0E−07 |
| Example No. 9 | 0.00047 | −0.00255 | −1.2E−06 |
| Comparative Example No. 2 | 0.00108 | 0.00065 | 7.0E−07 |

Example 2

Figure 4:
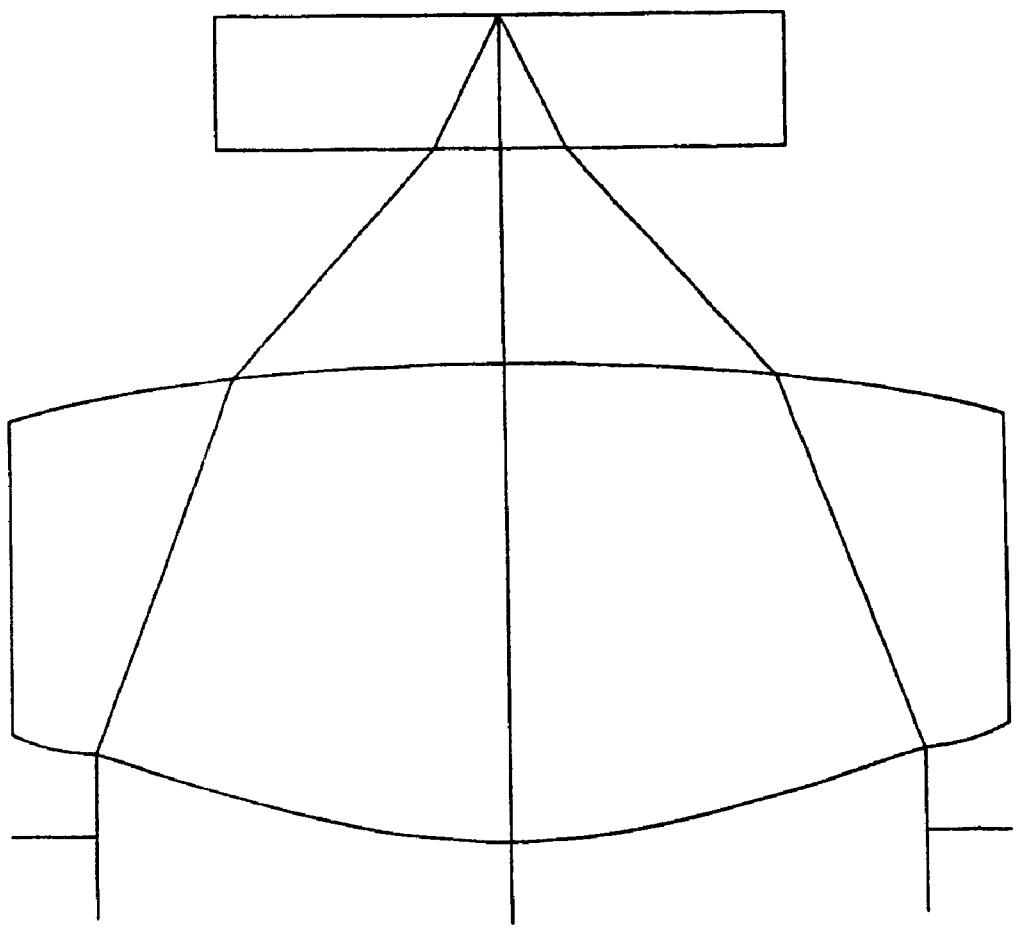
FIG. 4 is a sectional view relating to the objective lens in Example 2.
Figure 5:
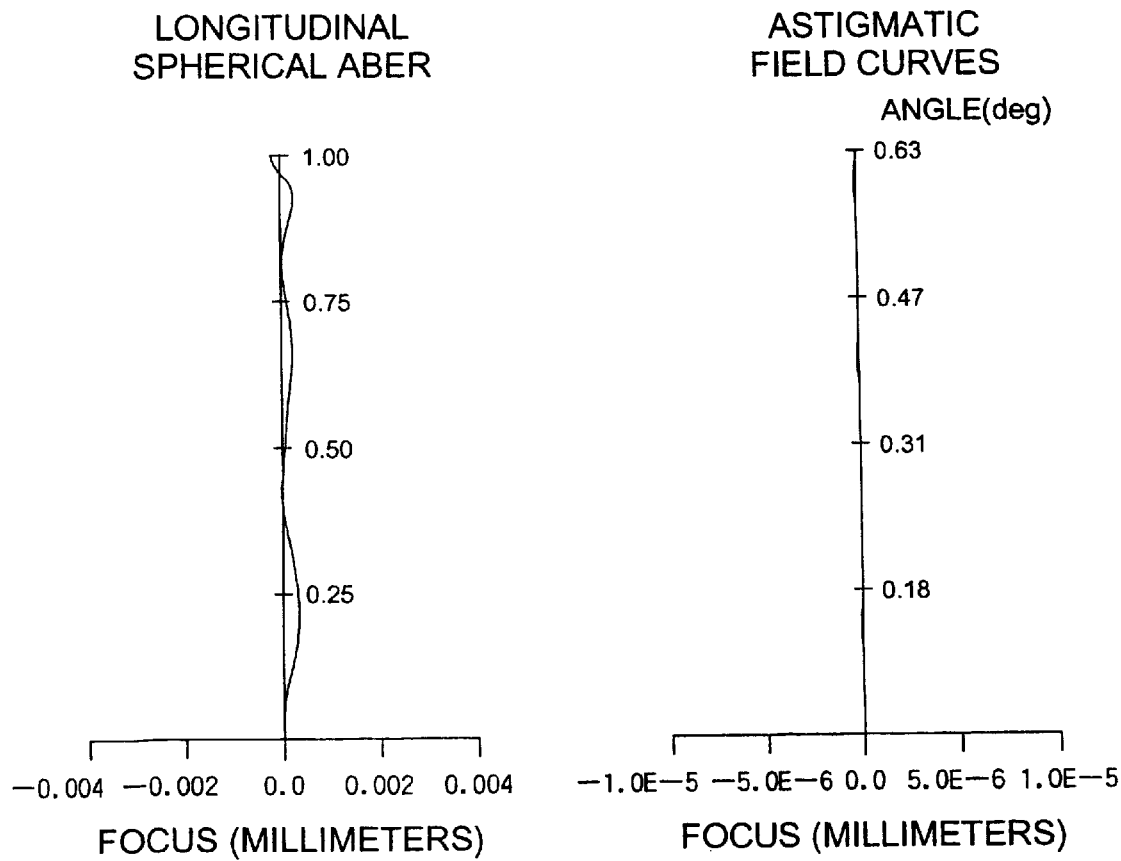
FIG. 5 shows a spherical aberration diagram and an astigmatism diagram under the conditions of the standard wavelength and standard temperature (25° C.) relating to the objective lens in Example 2.

This is an example wherein a ratio of refracting power ϕR/ϕ is 0.5 in the specifications stated above. Table 5 shows lens data, FIG. 4 shows a sectional view and FIG. 5 shows a spherical aberration diagram and an astigmatism diagram under the conditions of the standard wavelength and the standard temperature (25° C.). Table 4 shows that a change of spherical aberration which is caused by temperature change and is generated on the lens of the comparative example has been sufficiently corrected in the present example.

TABLE 5 fo = 2.75   NA = 0.65   ϕ R/ϕ = 0.5
Standard wavelength λ = 650 mn

| i | ri | di | Materials |
|---|---|---|---|
| 1 | ∞ | ∞ | |
| 2 | 3.37969 | 2.200 | PC |
| 3 | −40.61795 | 1.003 | |
| 4 | ∞ | 0.600 | PC |

Aspherical surface data

Second surface
Aspherical surface coefficient

| k | 5.70010E−01 | | |
|---|---|---|---|
| A1 | −1.32700E−02 | P1 | 4.0 |
| A2 | 3.71950E−03 | P2 | 6.0 |
| A3 | −1.05650E−03 | P3 | 8.0 |
| A4 | −8.77870E−05 | P4 | 10.0 |

Optical path difference function

| B2 | −9.27480E−02 |
|---|---|
| B4 | −7.0789E−03 |
| B6 | 3.64940E−03 |
| B8 | −9.69430E−04 |
| B10 | 5.41470E−05 |

Third surface
Aspherical surface coefficient

| k | −1.907061973E+04 | | |
|---|---|---|---|
| A1 | −2.60939E−02 | P1 | 4.0 |
| A2 | −3.52067E−03 | P2 | 6.0 |
| A3 | 7.10145E−03 | P3 | 8.0 |

-continued

Aspherical surface data

| A4 | −5.00795E−03 | P4 | 10.0 |
|---|---|---|---|
| A5 | 1.20301E−03 | P5 | 12.0 |

Example 3

Figure 6:
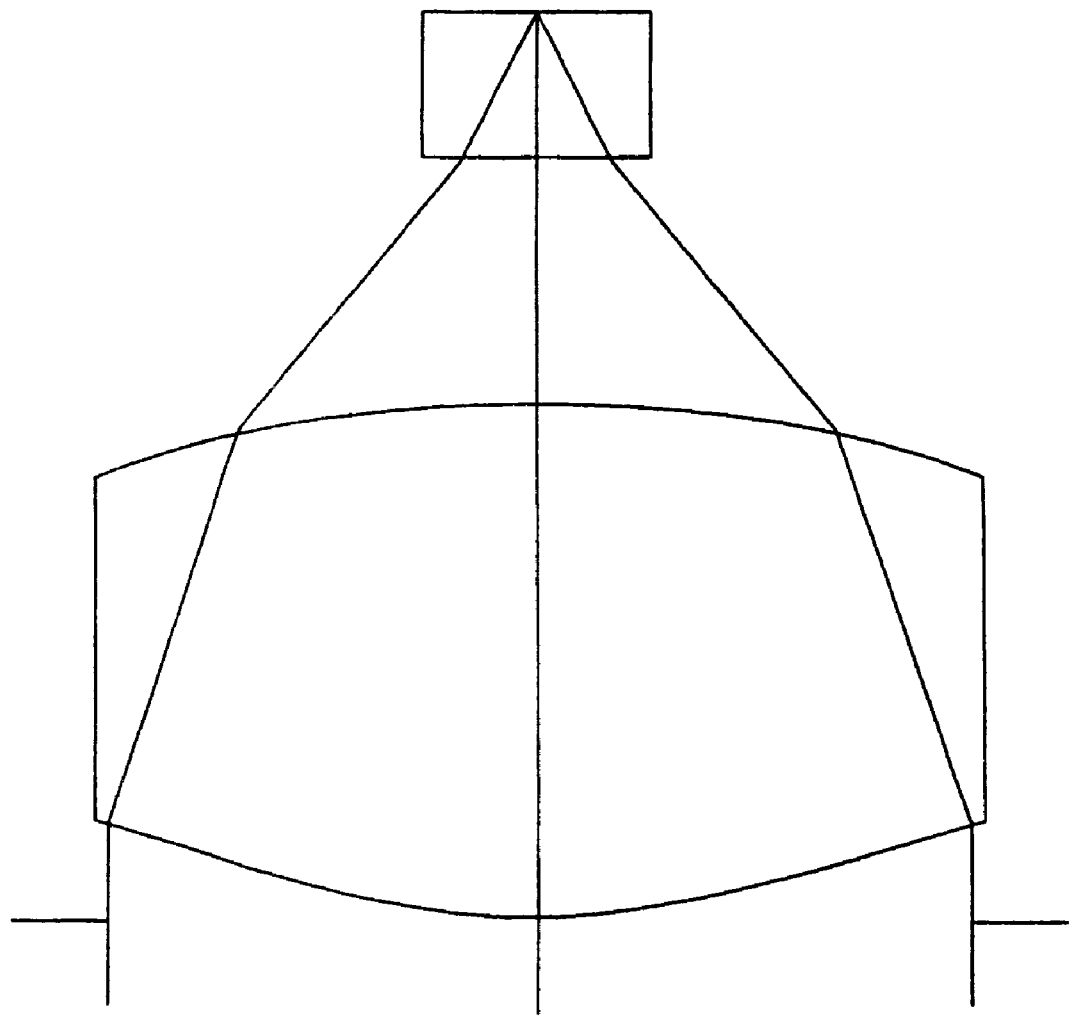
FIG. 6 is a sectional view relating to the objective lens in Example 3.
Figure 7:
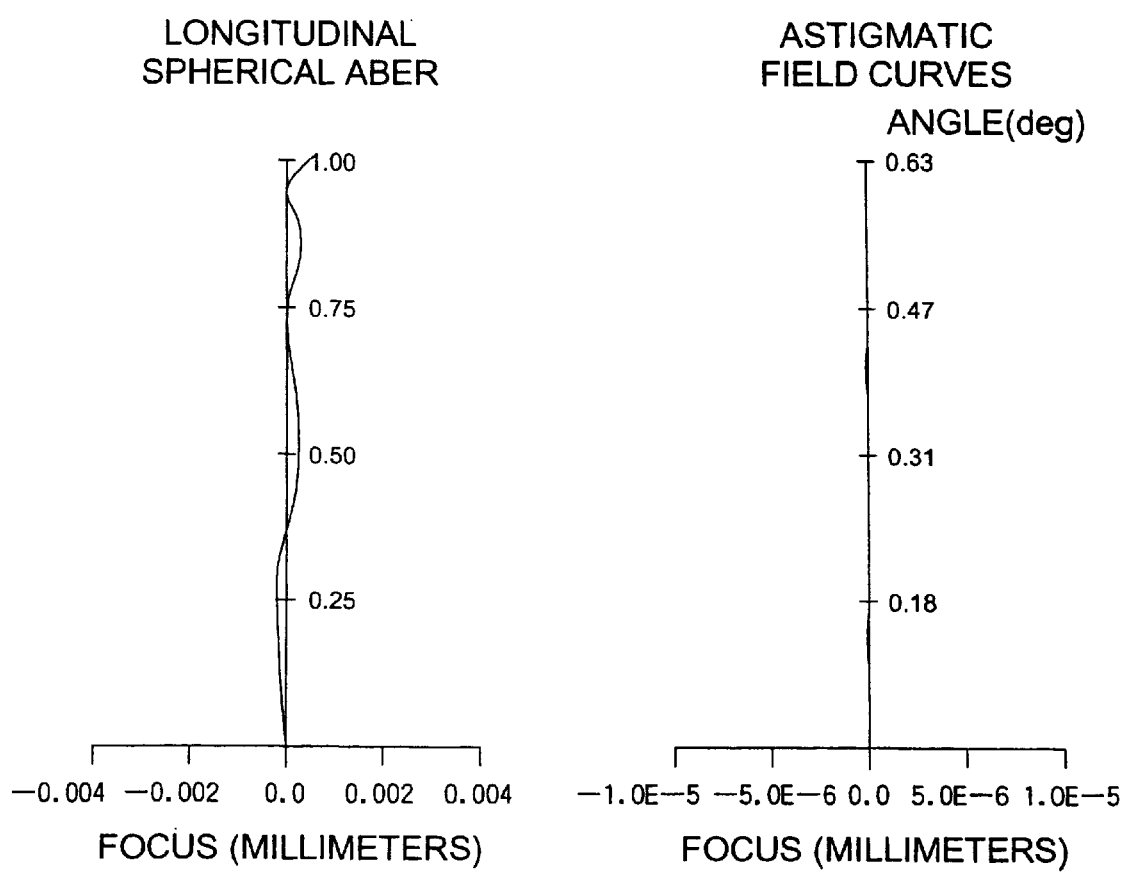
FIG. 7 shows a spherical aberration diagram and an astigmatism diagram under the conditions of the standard wavelength and standard temperature (25° C.) relating to the objective lens in Example 3.

This is an example wherein a ratio of refracting power ϕR/ϕ is 0.6 in the specifications stated above. Table 6 shows lens data, FIG. 6 shows a sectional view and FIG. 7 shows a spherical aberration diagram and an astigmatism diagram under the conditions of the standard wavelength and the standard temperature (25° C.). Table 4 shows that a change of spherical aberration which is caused by temperature change and is generated on the lens of the comparative example has been sufficiently corrected in the present example.

TABLE 6 fo = 2.75   NA = 0.65   ϕ R/ϕ = 0.6
Standard wavelength λ = 650 nm

| i | ri | di | Materials |
|---|---|---|---|
| 1 | ∞ | ∞ | |
| 2 | 3.05633 | 2.200 | PC |
| 3 | −14.61795 | 1.055 | |
| 4 | ∞ | 0.600 | PC |

Aspherical surface data

Second surface
Aspherical surface coefficient

| k | −3.20400E−01 | | |
|---|---|---|---|
| A1 | −4.51820E−03 | P1 | 4.0 |
| A2 | −7.74830E−04 | P2 | 6.0 |
| A3 | −1.44980E−04 | P3 | 8.0 |
| A4 | −1.32870E−04 | P4 | 10.0 |

Optical path difference function

| B2 | −7.69690E−02 |
|---|---|
| B4 | −2.80160E−03 |
| B6 | 2.01940E−04 |
| B8 | −1.45290E−04 |
| B10 | −5.26560E−06 |

Third surface
Aspherical surface coefficient

| k | 9.3053701E+01 | | |
|---|---|---|---|
| A1 | −5.12482E−03 | P1 | 4.0 |
| A2 | −5.08770E−03 | P2 | 6.0 |
| A3 | 5.82932E−04 | P3 | 8.0 |
| A4 | 1.13050E−04 | P4 | 10.0 |
| A5 | 1.83005E−04 | P5 | 12.0 |

Example 4

Figure 8:
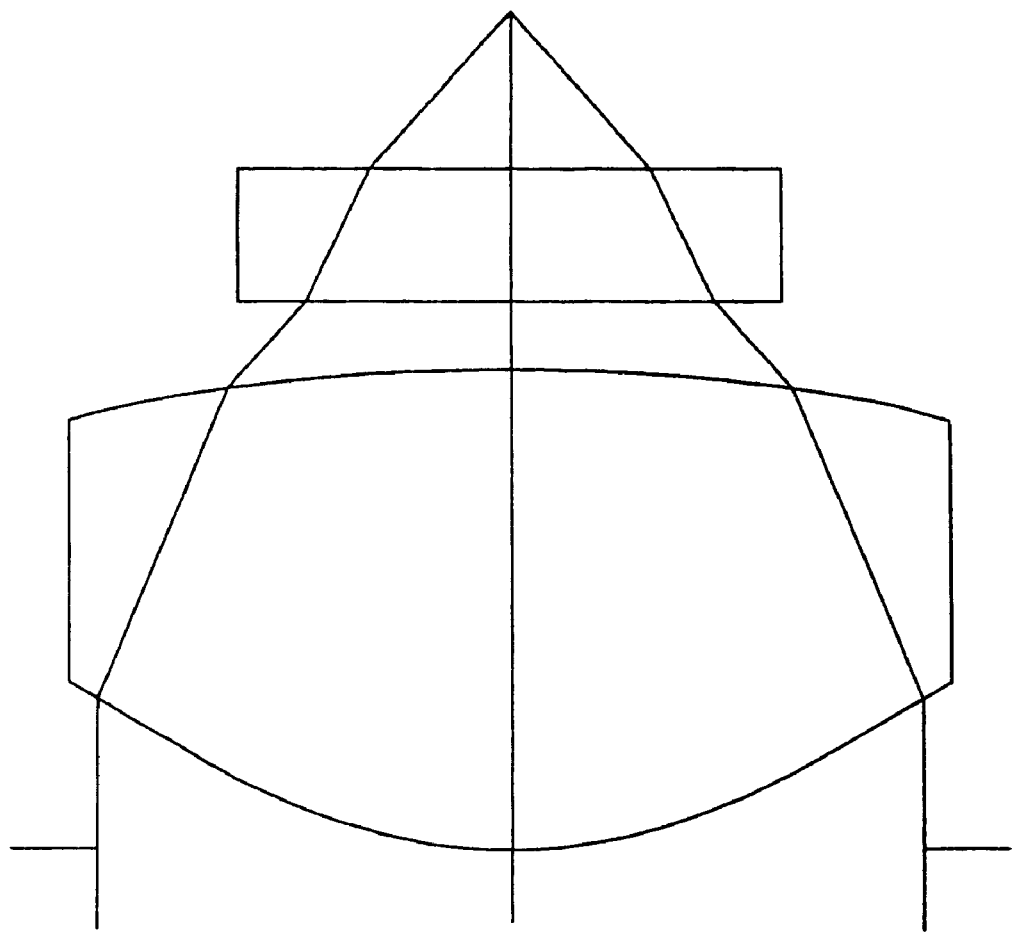
FIG. 8 is a sectional view relating to the objective lens in Example 4.

This is an example wherein a ratio of refracting power ϕR/ϕ is 0.78 in the specifications stated above. Table 7 shows lens data, FIG. 8 shows a sectional view and FIG. 9 shows a spherical aberration diagram and an astigmatism diagram under the conditions of the standard wavelength and the standard temperature (25° C.). Table 4 shows that a change of spherical aberration which is caused by temperature change and is generated on the lens of the comparative example has been sufficiently corrected in the present example.

TABLE 7

| fo = 2.75 NA = 0.65 $\phi R/\phi$ = 0.78 Standard wavelength $\lambda$ = 650 nm | | | |
|---|---|---|---|
| i | ri | di | Materials |
| 1 | ∞ | ∞ | |
| 2 | 2.60026 | 2.200 | PC |
| 3 | −11.70871 | 1.076 | |
| 4 | ∞ | 0.600 | PC |

| Aspherical surface data | | | |
|---|---|---|---|
| Second surface Aspherical surface coefficient | | | |
| k | −1.06930E+00 | | |
| A1 | 4.60100E−03 | P1 | 4.0 |
| A2 | −4.66010E−04 | P2 | 6.0 |
| A3 | −1.19280E−04 | P3 | 8.0 |
| A4 | −5.35210E−05 | P4 | 10.0 |
| Optical path difference function | | | |
| B2 | −4.31440E−02 | | |
| B4 | −2.54150E−03 | | |
| B6 | −2.29860E−04 | | |
| B8 | −1.11310E−04 | | |
| B10 | 2.48010E−05 | | |
| Third surface Aspherical surface coefficient | | | |
| k | −3.965775E+01 | | |
| A1 | 1.64851E−02 | P1 | 4.0 |
| A2 | −1.05879E−02 | P2 | 6.0 |
| A3 | −2.92477E−03 | P3 | 8.0 |
| A4 | 2.96195E−03 | P4 | 10.0 |
| A5 | −5.94646E−04 | P5 | 12.0 |

Example 5

Figure 10:
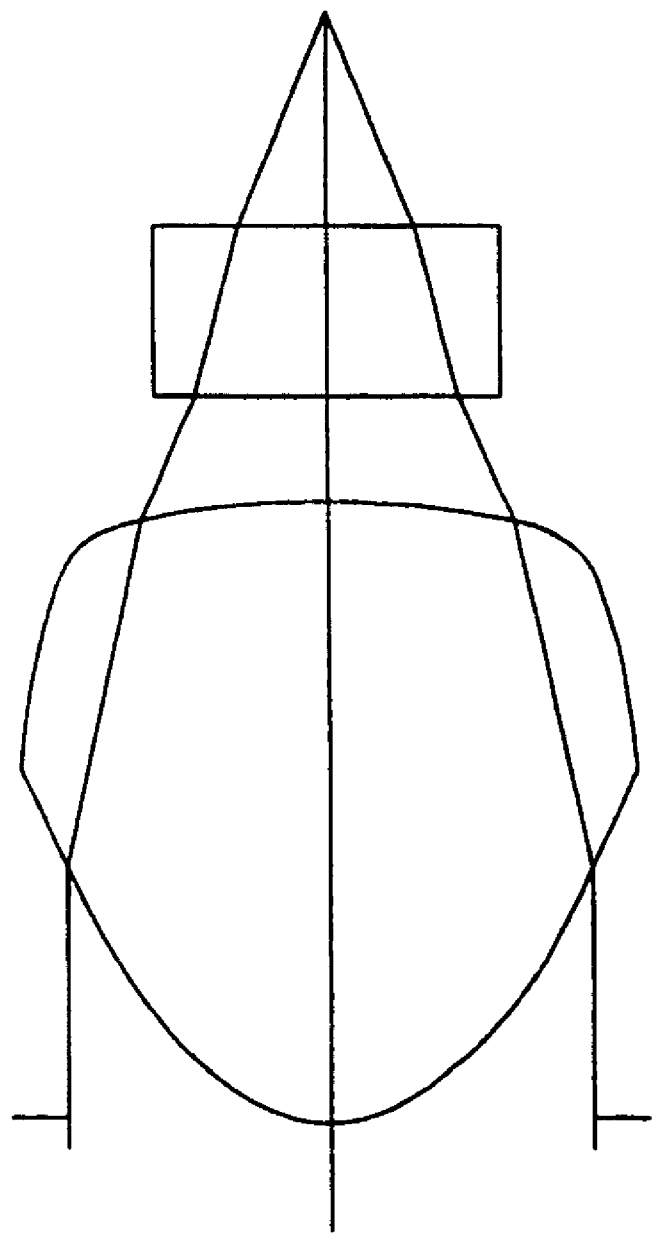
FIG. 10 is a sectional view relating to the objective lens in Example 5.

This is an example wherein a ratio of refracting power $\phi R/\phi$ is 0.9 in the specifications stated above. Table 8 shows lens data, FIG. 10 shows a sectional view and FIG. 11 shows a spherical aberration diagram and an astigmatism diagram under the conditions of the standard wavelength and the standard temperature (25° C.). Table 4 shows that a change of spherical aberration which is caused by temperature change and is generated on the lens of the comparative example has been sufficiently corrected in the present example.

TABLE 8

| fo = 2.75 NA = 0.65 $\phi R/\phi$ = 0.9 Standard wavelength $\lambda$ = 650 nm | | | |
|---|---|---|---|
| i | ri | di | Materials |
| 1 | ∞ | ∞ | |
| 2 | 2.00228 | 2.220 | PC |
| 3 | −9.04209 | 1.076 | |
| 4 | ∞ | 0.600 | PC |

| Aspherical surface data | | | |
|---|---|---|---|
| Second surface Aspherical surface coefficient | | | |
| k | −9.86540E−01 | | |
| A1 | 6.24420E−03 | P1 | 4.0 |
| A2 | −3.58550E−04 | P2 | 6.0 |
| A3 | −3.81790E−05 | P3 | 8.0 |
| A4 | −2.91810E−05 | P4 | 10.0 |
| Optical path difference function | | | |
| B2 | −2.02210E−02 | | |
| B4 | −2.69260E−03 | | |
| B6 | −2.91780E−04 | | |
| B8 | −9.19370E−05 | | |
| B10 | 2.49650E−05 | | |
| Third surface Aspherical surface coefficient | | | |
| k | −1.46180026E+02 | | |
| A1 | 1.37497E−02 | P1 | 4.0 |
| A2 | −7.90812E−03 | P2 | 6.0 |
| A3 | −5.23215E−04 | P3 | 8.0 |
| A4 | 1.04305E−03 | P4 | 10.0 |
| A5 | −2.03074E−04 | P5 | 12.0 |

Example 6

Figure 12:
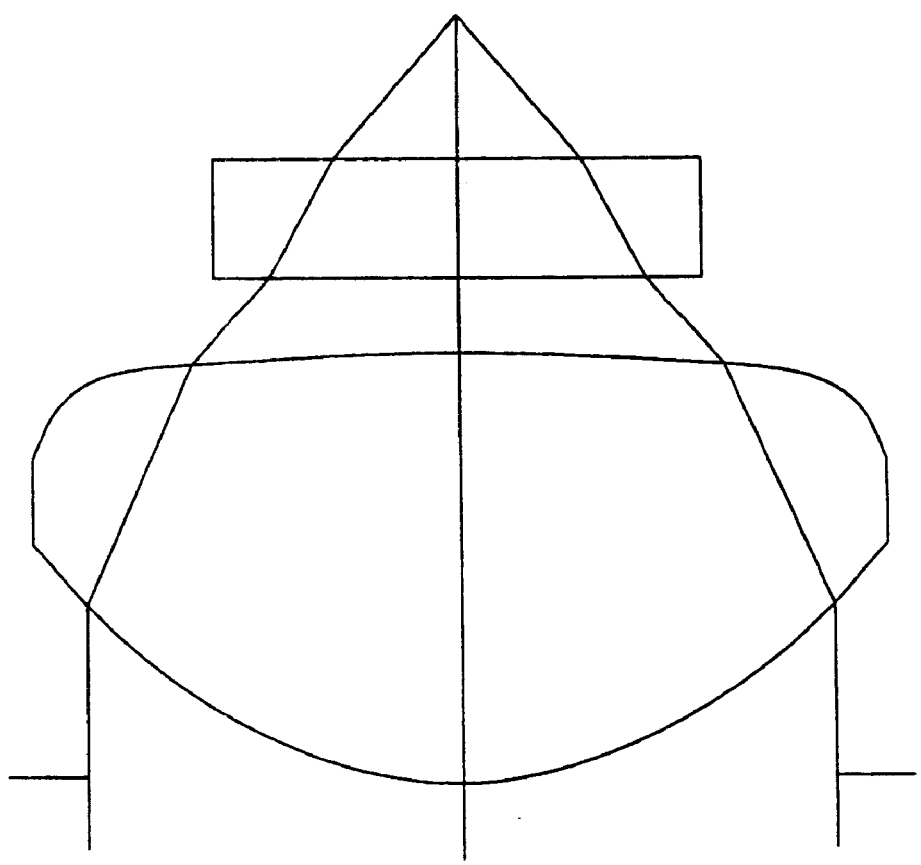
FIG. 12 is a sectional view relating to the objective lens in Example 6.
Figure 13:
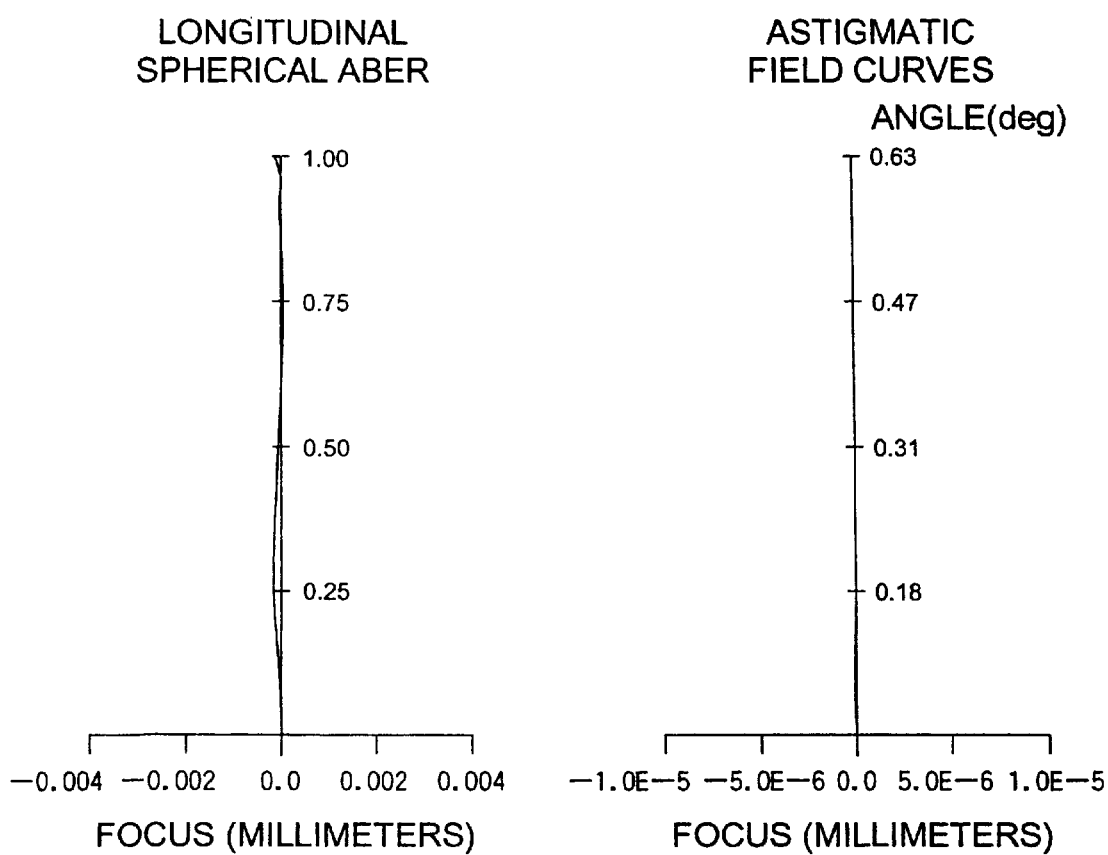
FIG. 13 shows a spherical aberration diagram and an astigmatism diagram under the conditions of the standard wavelength and standard temperature (25° C.) relating to the objective lens in Example 6.

This is an example wherein a ratio of refracting power $\phi R/\phi$ is 0.95 in the specifications stated above. Table 9 shows lens data, FIG. 12 shows a sectional view and FIG. 13 shows a spherical aberration diagram and an astigmatism diagram under the conditions of the standard wavelength and the standard temperature (25° C.). Table 4 shows that a change of spherical aberration which is caused by temperature change and is generated on the lens of the comparative example has been sufficiently corrected in the present example.

TABLE 9

| fo = 2.75 NA = 0.65 $\phi R/\phi$ = 0.95 Standard wavelength $\lambda$ = 650 nm | | | |
|---|---|---|---|
| i | ri | di | Materials |
| 1 | ∞ | ∞ | |
| 2 | 1.91187 | 2.200 | PC |
| 3 | −7.7384 | 1.133 | |
| 4 | ∞ | 0.600 | PC |

| Aspherical surface data | | | |
|---|---|---|---|
| Second surface Aspherical surface coefficient | | | |
| k | −7.00550E−01 | | |
| A1 | 2.55950E−03 | P1 | 4.0 |
| A2 | 3.08250E−05 | P2 | 6.0 |
| A3 | −2.14040E−04 | P3 | 8.0 |
| A4 | −1.83100E−05 | P4 | 10.0 |
| Optical path difference function | | | |
| B2 | −1.01450E−02 | | |
| B4 | −2.16370E−03 | | |
| B6 | −7.08990E−05 | | |
| B8 | −1.90870E−04 | | |
| B10 | 3.08250E−05 | | |

-continued

Aspherical surface data

Third surface
Aspherical surface coefficient

| k | −9.8990376E+01 | | |
|---|---|---|---|
| A1 | 1.68118E−02 | P1 | 4.0 |
| A2 | −8.26686E−03 | P2 | 6.0 |
| A3 | −6.07660E−04 | P3 | 8.0 |
| A4 | 1.24173E−03 | P4 | 10.0 |
| A5 | −2.61113E−04 | P5 | 12.0 |

Example 7

Figure 14:
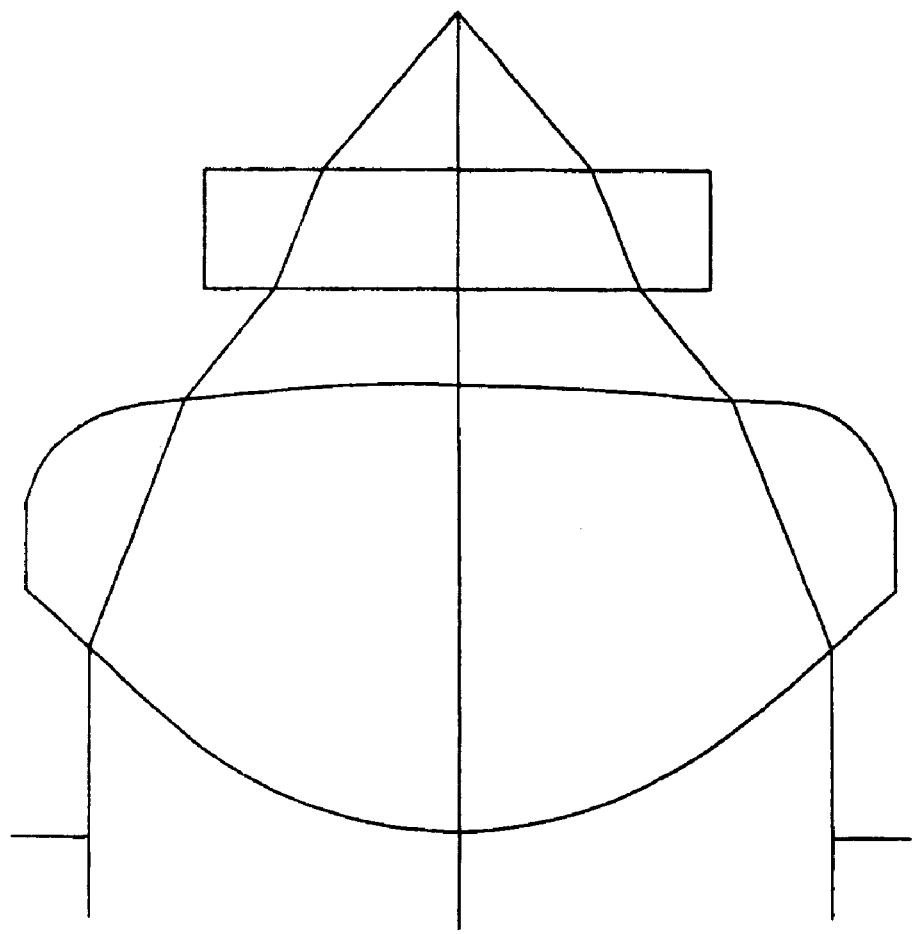
FIG. 14 is a sectional view relating to the objective lens in Example 7.
Figure 15:
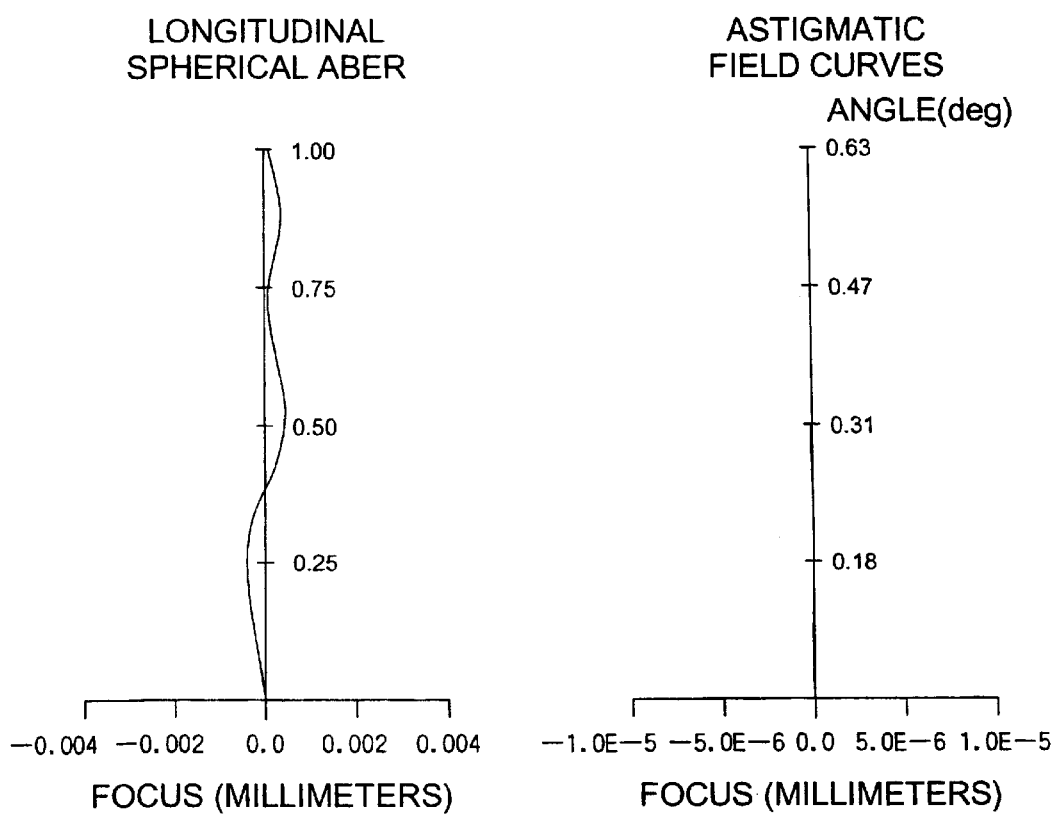
FIG. 15 shows a spherical aberration diagram and an astigmatism diagram under the conditions of the standard wavelength and standard temperature (25° C.) relating to the objective lens in Example 7.

This is an example wherein a ratio of refracting power $\phi R/\phi$ is 1.0 in the specifications stated above. Table 10 shows lens data, FIG. 14 shows a sectional view and FIG. 15 shows a spherical aberration diagram and an astigmatism diagram under the conditions of the standard wavelength and the standard temperature (25° C.). Table 4 shows that a change of spherical aberration which is caused by temperature change and is generated on the lens of the comparative example has been sufficiently corrected in the present example.

TABLE 10 fo = 2.75    NA = 0.65    $\phi R/\phi$ = 1.0
Standard wavelength λ = 650 nm

| i | ri | di | Materials |
|---|---|---|---|
| 1 | ∞ | ∞ | |
| 2 | 1.83457 | 2.200 | PC |
| 3 | −6.66171 | 1.162 | |
| 4 | ∞ | 0.600 | PC |

Aspherical surface data

Second surface
Aspherical surface coefficient

| k | −7.74230E−01 | | |
|---|---|---|---|
| A1 | 1.89400E−03 | P1 | 4.0 |
| A2 | −2.39900E−04 | P2 | 6.0 |
| A3 | −9.90000E−05 | P3 | 8.0 |
| A4 | −4.49950E−05 | P4 | 10.0 |

Optical path difference function

| B2 | 0.00000E+00 |
|---|---|
| B4 | −2.92840E−03 |
| B6 | −1.44080E−04 |
| B8 | −1.58230E−04 |
| B10 | 3.39450E−05 |

Third surface
Aspherical surface coefficient

| k | −6.4173984E+01 | | |
|---|---|---|---|
| A1 | 1.55063E−02 | P1 | 4.0 |
| A2 | −8.8022E−03 | P2 | 6.0 |
| A3 | −9.48605E−04 | P3 | 8.0 |
| A4 | 1.22499E−03 | P4 | 10.0 |
| A5 | −2.26593E−04 | P5 | 12.0 |

Example 8

Figure 16:
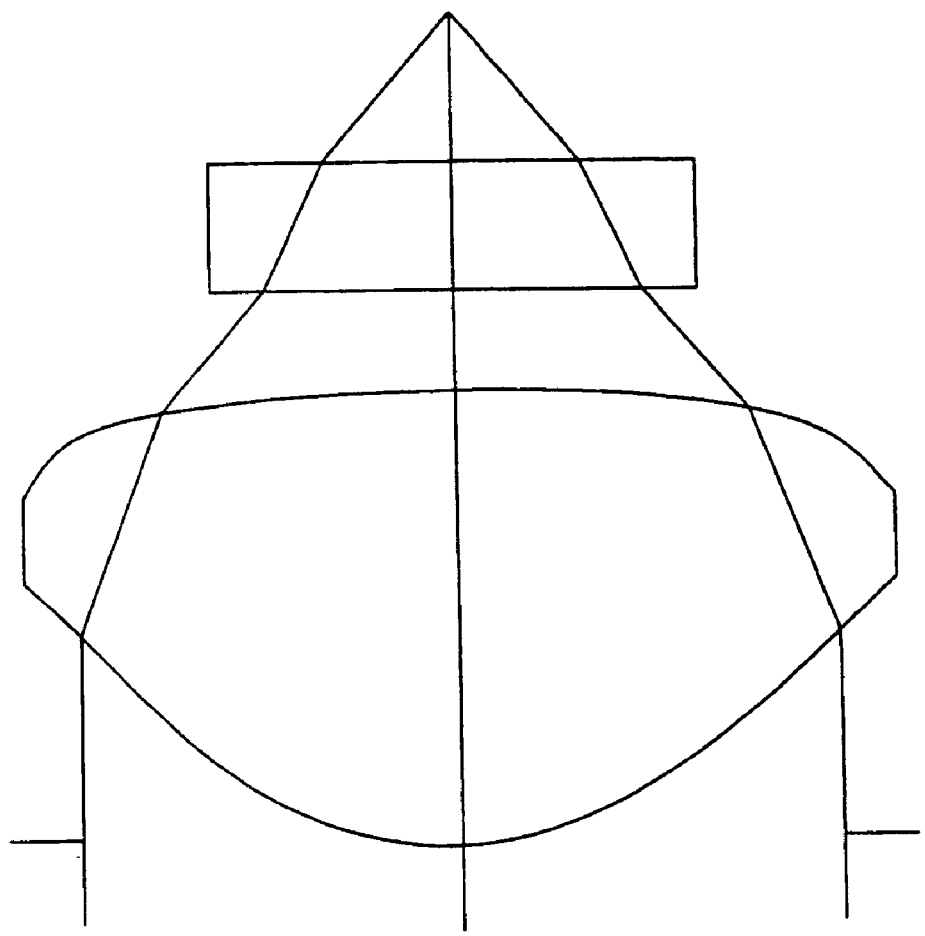
FIG. 16 is a sectional view relating to the objective lens in Example 8.

This is an example wherein a ratio of refracting power $\phi R/\phi$ is 1.1 in the specifications stated above. Table 11 shows lens data, FIG. 16 shows a sectional view and FIG. 17 shows a spherical aberration diagram and an astigmatism diagram under the conditions of the standard wavelength and the standard temperature (25° C.). Table 12 shows that a change of spherical aberration which is caused by temperature change and is generated on the lens of the comparative example has been sufficiently corrected in the present example.

TABLE 11 fo = 2.75    NA = 0.65    $\phi R/\phi$ = 1.1
Standard wavelength λ = 650 nm

| i | ri | di | Materials |
|---|---|---|---|
| 1 | ∞ | ∞ | |
| 2 | 1.68602 | 2.200 | PC |
| 3 | −5.2696 | 1.220 | |
| 4 | ∞ | 0.600 | PC |

Aspherical surface data

Second surface
Aspherical surface coefficient

| k | −7.60310E−01 | | |
|---|---|---|---|
| A1 | 1.06040E−03 | P1 | 4.0 |
| A2 | −5.97010E−04 | P2 | 6.0 |
| A3 | −2.75700E−05 | P3 | 8.0 |
| A4 | −9.14040E−05 | P4 | 10.0 |

Optical path difference function

| B2 | 2.14620E−02 |
|---|---|
| B4 | −2.97070E−03 |
| B6 | −8.47720E−05 |
| B8 | −1.95860E−04 |
| B10 | 3.68890E−05 |

Third surface
Aspherical surface coefficient

| k | −5.0188514E+01 | | |
|---|---|---|---|
| A1 | 9.94658E−03 | P1 | 4.0 |
| A2 | −4.59549E−03 | P2 | 6.0 |
| A3 | −2.20303E−03 | P3 | 8.0 |
| A4 | 1.38327E−03 | P4 | 10.0 |
| A5 | −2.20038E−04 | P5 | 12.0 |

The Examples 2–8 stated above are those for measures which are especially suitable for a light source (for example, an SHG laser) emitting light whose wavelength is not changed by temperature fluctuation. Examples shown next are those wherein a light source is a semiconductor laser that is relatively inexpensive. In a semiconductor laser, a wavelength of a laser beam usually changes when the ambient temperature used is changed. In the present example, an amount of laser wavelength change caused by temperature change of the semiconductor laser is 0.2 nm/° C.

Example 9

Figure 18:
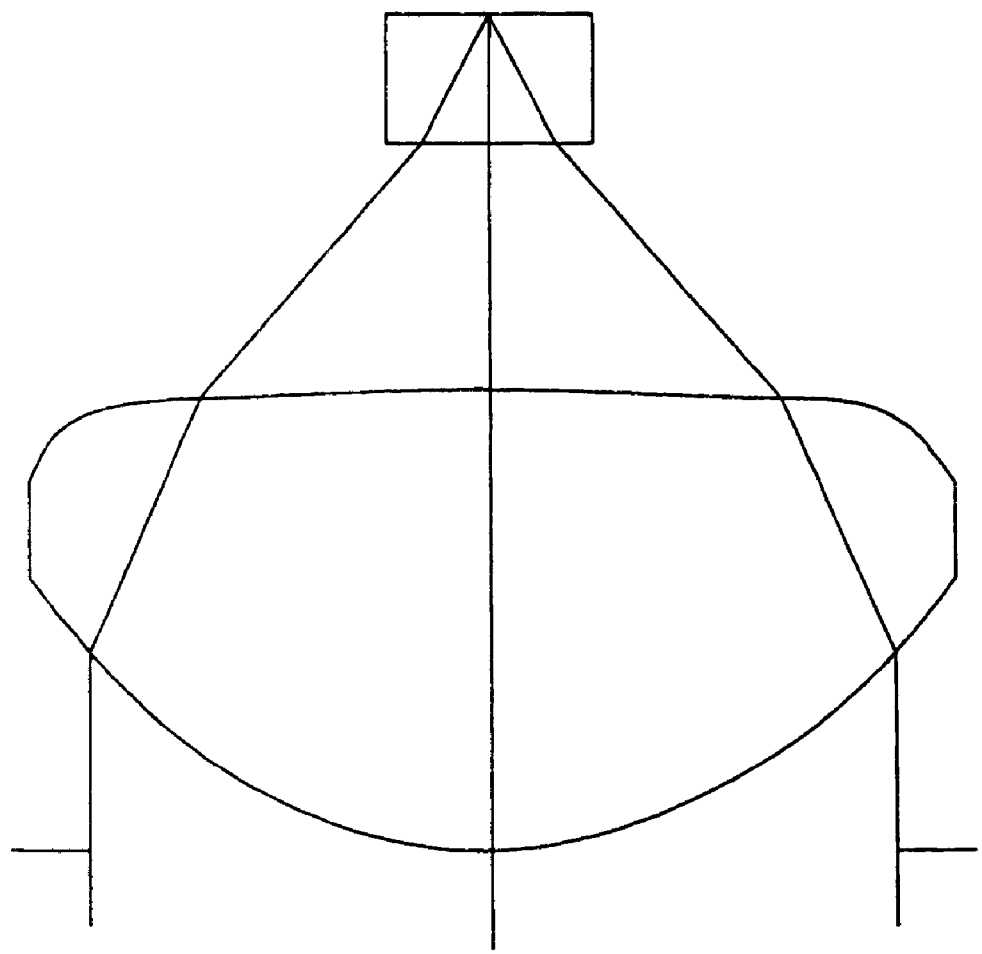
FIG. 18 is a sectional view relating to the objective lens in Example 9.

This is an example wherein a ratio of refracting power $\phi R/\phi$ is 0.95 in the specifications stated above. Table 12 shows lens data, FIG. 18 shows a sectional view and FIG. 19 shows a spherical aberration diagram and an astigmatism diagram under the conditions of the standard wavelength and the standard temperature (25° C.). It is understood from Table 13 showing a difference between the examples and the comparative example that the spherical aberration is sufficiently corrected in the present example, although aberration is deteriorated by spherical aberration caused by wavelength change and by spherical aberration caused by temperature change on the lens in the comparative example.

TABLE 12

$f_0 = 2.75$   $NA = 0.65$   $\phi R/\phi = 0.95$
Standard wavelength $\lambda = 650$ nm

| i | ri | di | Materials |
|---|---|---|---|
| 1 | ∞ | ∞ | |
| 2 | 1.91187 | 2.200 | PC |
| 3 | −7.7384 | 1.133 | |
| 4 | ∞ | 0.600 | PC |

Aspherical surface data

Second surface
Aspherical surface coefficient

| k | −6.84280E−01 | | |
|---|---|---|---|
| A1 | 2.66250E−03 | P1 | 4.0 |
| A2 | 4.72580E−04 | P2 | 6.0 |
| A3 | −1.712d90E−04 | P3 | 8.0 |
| A4 | −5.47700E−06 | P4 | 10.0 |

Optical path difference function

| B2 | −1.01450E−02 |
| B4 | −1.50170E−03 |
| B6 | 6.34070E−05 |
| B8 | −1.49820E−04 |
| B10 | 2.50300E−05 |

-continued

Aspherical surface data

Third surface
Aspherical surface coefficient

| k | −6.3827455E+01 | | |
|---|---|---|---|
| A1 | 1.87247E−02 | P1 | 4.0 |
| A2 | −7.93740E−03 | P2 | 6.0 |
| A3 | −3.74682E−04 | P3 | 8.0 |
| A4 | 1.02723E−03 | P4 | 10.0 |
| A5 | −2.11396E−04 | P5 | 12.0 |

TABLE 13

$f = 2.75$   $NA = 0.65$

| Example No. | $\phi R/\phi$ | $\lambda$(nm) | $\Delta T$ (° C.) −30 644 | 0 650 | 30 660 |
|---|---|---|---|---|---|
| 9 | 0.95 | SA3 ($\lambda$ rms) | −0.001 | 0.001 | 0.002 |
| Comparative Example 2 | 1 | SA3 ($\lambda$ rms) | −0.035 | 0.001 | 0.038 |

The number of ring-shaped bands, the minimum pitch, spherical aberration for the wavelength other than the standard wavelength and a difference of the focus position influencing wavelength shifting (mode hop of a semiconductor laser) depend on the refracting power. It is therefore necessary to make the refracting power to be the optimum ratio by accuracy of processing with a metal mold and by specifications of an optical system.

Incidentally, Table 14 shows refractive index changes of materials for laser beam wavelengths

TABLE 14

| Wavelength | 410 | 400 | 390 | | | | | |
|---|---|---|---|---|---|---|---|---|
| Olefin resin | 1.5229 | 1.5244 | 1.5261 | | | | | |
| $\Delta n/\Delta T$ | $1.2 \times 10^{-5}$/° C. | | | | | | | |
| Wavelength | 660 | 656 | 650 | 644 | 640 | 410 | 400 | 390 |
| PC | 1.57718 | 1.57745 | 1.57787 | 1.57829 | 1.57858 | 1.61752 | 1.62158 | 1.62612 |
| $\Delta n/\Delta T$ | $14 \times 10^{-5}$/° C. | | | | | | | |

FIG. 1 is a conceptual diagram showing an example of an embodiment of an optical pickup apparatus to which each of the Examples 1–9 of an objective lens is applied. In the example of this embodiment, it is especially preferable to apply the objective lens in each of Examples 1 and 9, because a semiconductor laser is used. In optical pickup apparatus 1, a light flux emitted from semiconductor laser 11 representing a light source is reflected on polarization beam splitter 12, then, passes through collimator 13 and ¼ λ plate 14 to be a circularly polarized parallel light flux, and is stopped down to the prescribed numerical aperture by diaphragm 3, and thus, diffracting objective lens 15 forms a spot on information recording surface 16" from the light flux through transparent base board 16' of high density recording optical disk 16 representing an optical information recording medium. It is preferable that a wavelength of the semiconductor laser beam is 680 nm or less, and 500 nm or less is more preferable. Here, a laser beam having a wavelength of 400 nm was used for the objective lens in Example 1, and a laser beam having a wavelength of 650 nm was used for the objective lens in Examples 2–9, by conforming to specifications of the objective lens in Examples 1–9.

The reflected light flux modulated by information bit on information recording surface 16" passes through diffracting objective lens 15, diaphragm 3, ¼ λ plate 14 and collimator lens 13 again to be a converged light, then, is transmitted through polarization beam splitter 12, and passes through cylindrical lens 17 and concave lens 18 to be subjected to astigmatism and magnification change, and is converged on photo-detector 18. Incidentally, the numeral 2 represents an actuator for controlling focus and tracking. In addition, diaphragm 3 was also established properly so that the numerical aperture on the disk 16 side may be a prescribed value, by conforming to specifications of the objective lens in Examples 1–9.

The objective lens 15 has flange section 15a outside the lens surface, and a cutout section (not shown) is provided at the location on this flange section corresponding to the position of the gate for injection molding.

Even in the case where any objective lens in Examples 1–9 is used, the following expression is satisfied when φ represents power of objective lens 15 for wavelength λ nm of the semiconductor laser beam and φR represents refracting power.

$$0.3 \leq \phi R/\phi \leq 1.5 \tag{39}$$

Further, the following expression is satisfied when r1 mm represents an axial radius of curvature on the base surface of objective lens 15 on the side opposite to the optical information recording medium side, n represents a refractive index of the objective lens, and fR mm represents a focal length for refraction.

$$1.0 \leq r1/\{(n-1) \cdot fR\} \leq 1.2 \tag{40}$$

Further, the following expression is satisfied when Δn represents an amount of refractive index change of the objective lens for temperature change ΔT° C. within a range of 20° C.–30° C. of ambient temperatures.

$$-0.002/° \text{C.} \leq \Delta n/\Delta T \leq -0.00005/° \text{C.} \tag{41}$$

The invention is not limited to the embodiment and example stated above. For example, the invention can be applied also to an optical pickup apparatus having two or more lights (light sources) whose wavelengths are different each other by several tens nm, although the optical pickup apparatus having only one light source was shown in the example of the embodiment stated above. In this case, the above-mentioned optical pickup apparatus having two or more lights which satisfies the structure of the invention for at least one wavelength-among those of the plural lights (according to circumstances, for at least one of optical information recording media which can use that light) can be included in the invention. Further, for example, the optical pickup apparatus wherein a collimator is used and light that is made to be almost in parallel by the collimator enters an objective lens, and the objective lens that is suitable for the optical pickup apparatus, were shown in the example of the embodiment stated above. However, it is naturally possible to apply the invention also to an optical pickup apparatus wherein a collimator is not used, or, another means to alter a divergence angle of a light flux is used, and thereby, diverged light or converged light enters an objective lens.

Though the objective lens composed of a plastic single lens was shown in the embodiment of the objective lens stated above, an objective lens composed of two or more lenses is included in the invention if at least one plastic lens is contained therein, provided that the structure of the objective lens is not restricted.

It is further possible to apply the objective lens of the invention to an objective lens optical system of the optical pickup optical system described in TOKKAIHEI No. 11-287765 filed by the inventors of the present invention earlier, or to an objective lens optical system of an optical pickup apparatus. In that case, it is possible to correct (reduce) an axial chromatic aberration of an objective lens having a diffraction pattern of the invention on at least one surface of the objective lens, or to correct (reduce) an axial chromatic aberration of the total optical system including an objective lens having a diffraction pattern of the invention on at least one surface of the objective lens, by the diffraction surface (diffraction pattern) provided on at least one surface of a coupling optical system (including a collimator optical system which collimates light to be almost in parallel) that changes a divergence angle of a light flux emitted from a light source, resulting in an effect of realization of an optical pickup apparatus wherein an axial chromatic aberration is corrected.

In general, a pitch of diffraction ring-shaped bands (position of each ring-shaped band) is defined by using a phase difference function which will be described in detail in the example described later or an optical path difference function. To be concrete, phase difference function $\Phi b$ is expressed by the following expression with a unit of radian, while optical path difference function $\Phi B$ is expressed by the following expression with a unit of mm.

Expression 1

$$\Phi_b = \sum_{i=1}^{\infty} b_{2i} h^{2i}$$

Expression 2

$$\Phi_B = \sum_{i=1}^{\infty} B_{2i} h^{2i}$$

These two methods for expression are the same in terms of meaning expressing a pitch of diffraction ring-shaped bands, though they are different in terms of unit. Namely, if coefficient b of the phase difference function is multiplied by λ/2π, for dominant wavelength λ (unit: mm), the coefficient b is converted into coefficient B of the optical path difference function, while, if coefficient B of the optical path difference function is multiplied by 2π/λ, on the contrary, the coefficient B can be converted into coefficient b of the phase difference function.

Now, a diffraction lens employing primary diffraction light will be explained to make the explanation simple. In that case, ring-shaped bands are formed each time the function value exceeds a multiple of integer of dominant wavelength λ for the optical path difference function, while, ring-shaped bands are formed each time the function value exceeds a multiple of integer of 2π for the phase difference function.

For example, when dominant wavelength is $0.5\mu$=0.0005 mm, secondary coefficient of an optical path difference function (the second power term) is −0.05 (which indicates −628.3 when it is converted into the secondary coefficient of the phase difference function), and all of coefficients of other orders are zero in the assumption of a cylindrical lens having no refracting power wherein diffraction ring-shaped bands are formed on the side closer to a subject among both sides of the lens, radius h of the first ring-shaped band is 0.1 mm and radius h of the second ring-shaped band is 0.141 mm. With regard to focal length f of the diffraction lens, it is known that f=−1/(2·B2)=10 mm holds for secondary coefficient B2 of the optical path difference function=−0.05.

Based on the definition stated above, it is possible to make a lens to have power by making the secondary coefficient of the phase difference function or of the optical path difference function to take a value that is not zero. It is also possible to control spherical aberration by making coefficients other than the secondary coefficient of the phase difference function or of the optical path difference function including, for example, $4^{th}$ power coefficient, $6^{th}$ power coefficient, $8^{th}$ power coefficient and $10^{th}$ power coefficient to take a value that is not zero. Incidentally, the wording "control" used in this case is to correct the spherical aberration of the section having refracting power by generating reverse spherical aberration, or by making all spherical aberrations to have desired values.

Further, in the objective lens for an optical pickup apparatus in Examples 1–4 stated later, a diffraction pattern is formed on an optical surface on at least one side, and an aspherical form expressed by the following expression is provided on each of both optical surfaces.

Expression 3

$$z = \frac{h^2/R_0}{1+\sqrt{1-(1+\kappa)(h/R_0)^2}} + \sum_{i=1}^{\infty} A_i h^{Pi}$$

In the above expression, Z represents an axis in the direction of an optical axis, h represents an axis in the direction perpendicular to the optical axis (for the height from the optical axis, the direction of light advancement is positive), Ro represents an axial radius of curvature, κ represents a constant of the cone, A represents a constant of the aspheric surface and P represents the power number.

EXAMPLE

The concrete example of the objective lens will be explained as follows.

Examples 10–12 are represented by the objective lens wherein standard wavelength λ is 650 nm, standard temperature T is 25° C., focal length f is 3.05 mm, numerical aperture NA is 0.6, a thickness of a transparent base board of an optical disk representing an optical information recording medium is 0.6 mm and image forming magnification mo is −⅙. Incidentally, in the lens data shown from now on, the power number for 10 (for example, $2.5 \times 10^{-3}$) is expressed by using E. (for example, 2.5×E-3).

Example 10

Figure 20:
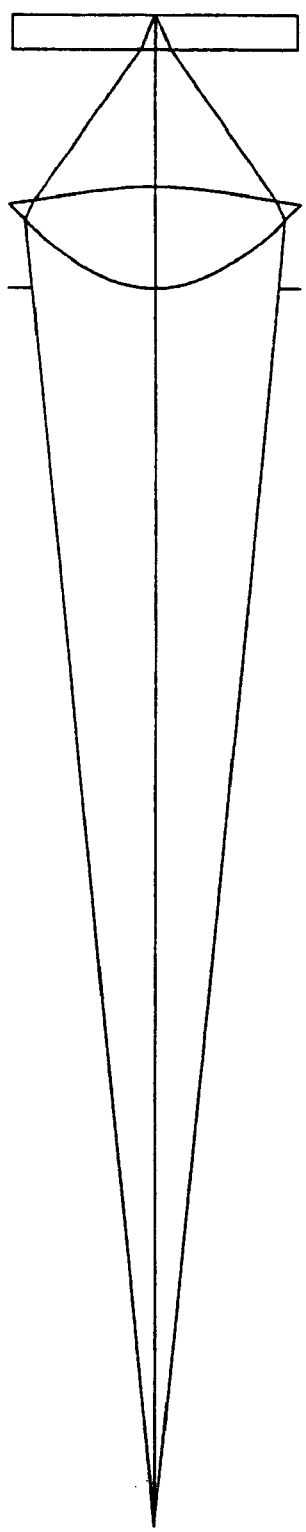
FIG. 20 is a dross sectional view of an objective lens in Example 10.
Figure 21:
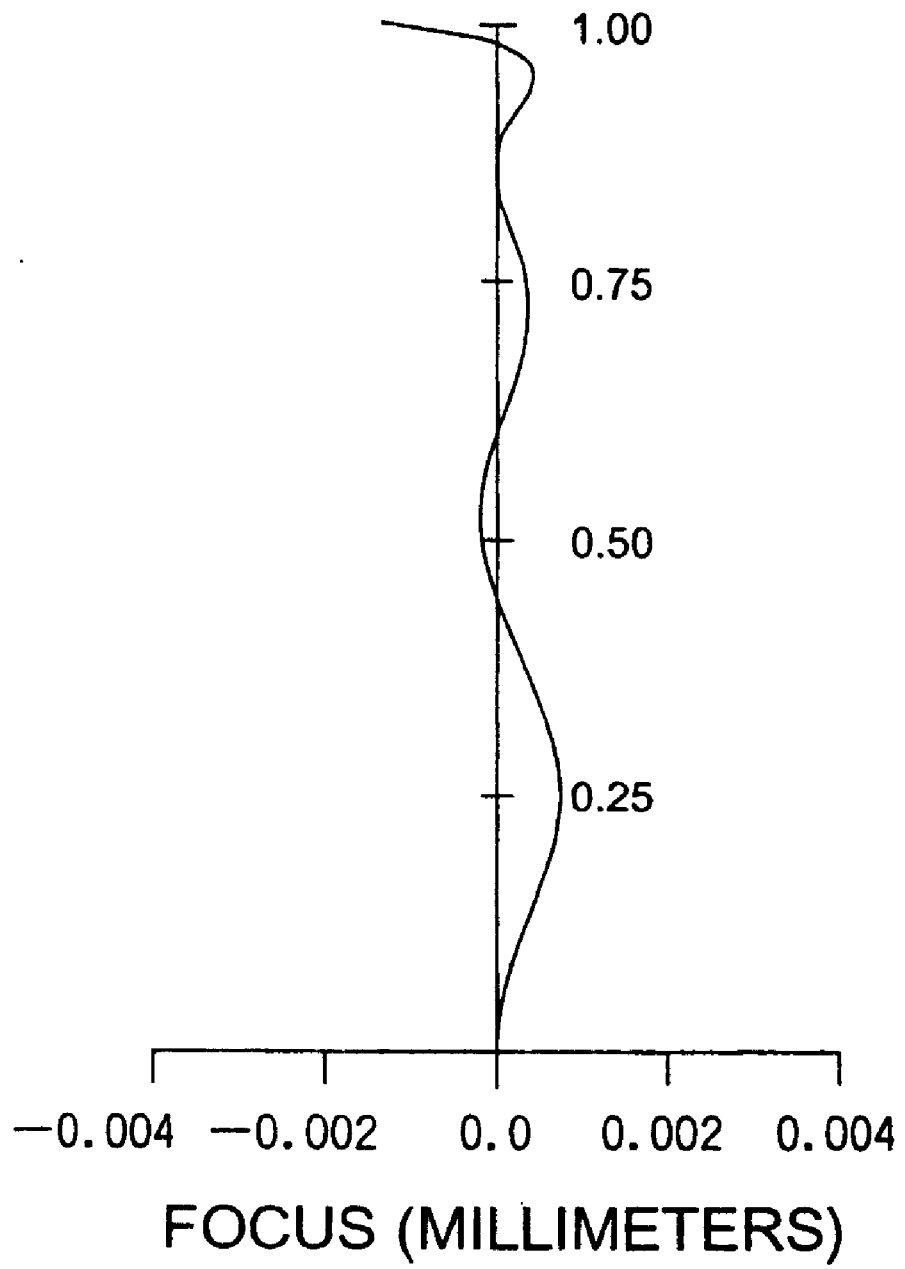
FIG. 21 is a spherical aberration diagram under the conditions of the standard wavelength and standard temperature relating to the objective lens in Example 11.

Table 15 shows lens data of an objective lens related to the present example, FIG. 20 shows a sectional view of the objective lens, and FIG. 21 shows a diagram of spherical aberration under the conditions of the standard wavelength and the standard temperature. The objective lens in the example has no paraxial power (a ratio of refracting power φR/φO=1.0) caused by diffraction effect. Incidentally, the ratio of refracting power is one expressed by φR/φO when φO represents power in wavelength λ nm of a light source for the objective lens and φR represents refracting power, and in the case of 0.3≦φR/φO≦1.5, the fluctuation of a focus position caused by variation of a wavelength of a light source can be repressed to be small.

TABLE 15 fo = 3.05  NA = 0.6  φ R/φ = 1.0
Standard wavelength λ = 400 nm

| i | ri | di | Materials |
|---|---|---|---|
| 1 | ∞ | 21.006 | |
| 2 | 2.11838 | 1.720 | Olefin resin |
| 3 | −5.345653 | 2.3075 | |
| 4 | ∞ | 0.600 | PC |

Aspherical surface date

Second surface
Aspherical surface coefficient

| k | −1.66947E+00 | | |
|---|---|---|---|
| A1 | 1.06186E−02 | P1 | 4.0 |
| A2 | −1.67834E−03 | P2 | 6.0 |
| A3 | 1.27113E−04 | P3 | 8.0 |
| A4 | 1.91739E−08 | P4 | 10.0 |

Optical path difference function

| B2 | 0.00000E+00 |
| B4 | −3.84012E−03 |
| B6 | −1.29575E−04 |
| B8 | −2.81584E−05 |
| B10 | 9.85356E−06 |
| B12 | −1.94542E−07 |

Third surface
Aspherical surface coefficient

| k | −3.1740431E+01 | | |
|---|---|---|---|
| A1 | 4.10213E−03 | P1 | 4.0 |
| A2 | −6.96987E−04 | P2 | 6.0 |
| A3 | 6.77155E−05 | P3 | 8.0 |
| A4 | −6.41841E−06 | P4 | 10.0 |
| A5 | 1.85087E−07 | P5 | 12.0 |

TABLE 16

φ = 650 nm

| | ΔT | −30 | 0 | 30 |
|---|---|---|---|---|
| Reference | SA3 | −0.094 | 0.000 | 0.092 |
| Example 1 | SA3 | 0.003 | 0.000 | −0.002 |
| Example 2 | SA3 | 0.001 | 0.001 | 0.000 |
| Example 3 | SA3 | −0.045 | 0.002 | 0.047 |
| Example 3 | λ | 644 nm | 650 nm | 656 nm |
| Example 3 | SA3 | −0.001 | 0.002 | 0.001 |

Unit of wavefront aberration is λ

Table 16 shows results of calculation of axial spherical aberration change amount SA3 for each of the objective lenses in Example 10 and in Example 11 and Example 12 described later under the conditions of the standard temperature 25° C., (25–30)° C. Table 16 shows only third order spherical aberration component, because the main portion of the change of spherical aberration for temperature fluctuation is the third order spherical aberration component (SA3: unit is λ). In the Table, there is shown a design example formed by the refraction system alone with the same specification as in the present example, as a comparative example.

As shown in Table 16, a spherical aberration change which is generated by temperature change in the comparative example is corrected satisfactorily in Example 10.

Example 11

Figure 22:
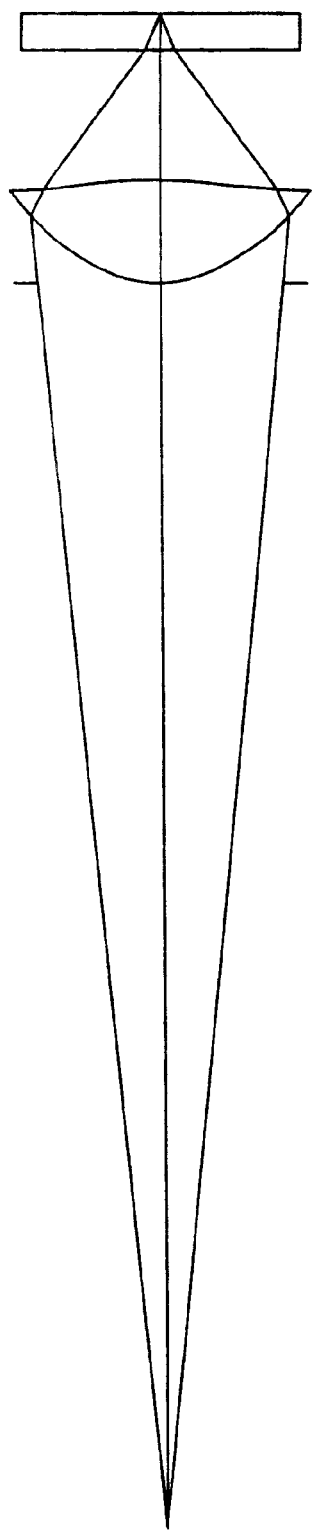
FIG. 22 is a dross sectional view of an objective lens in Example 10.
Figure 23:
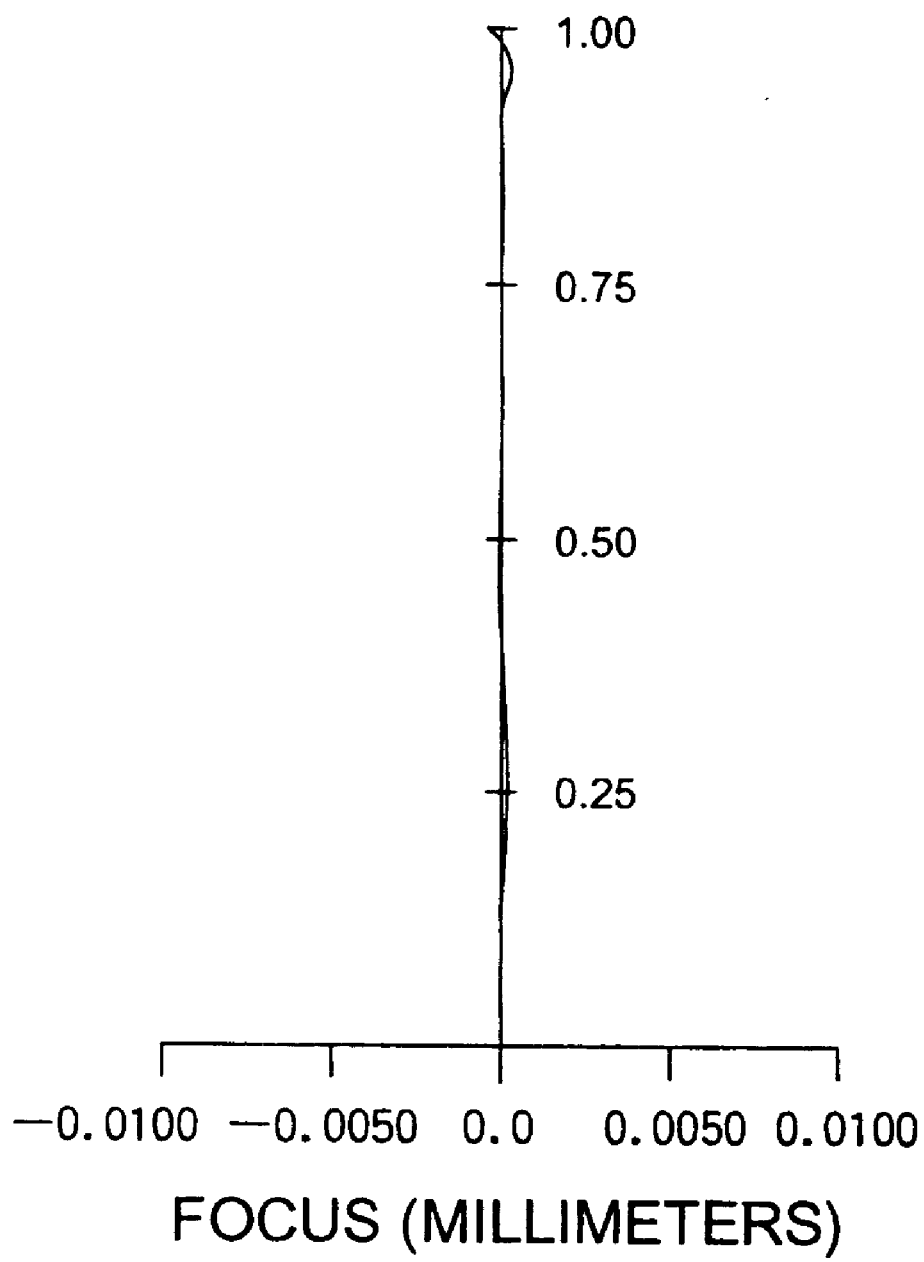
FIG. 23 is a spherical aberration diagram under the conditions of the standard wavelength and standard temperature relating to the objective lens in Example 11.

Table 17 shows lens data of an objective lens related to the present example, FIG. 22 shows a sectional view of the objective lens, and FIG. 23 shows a diagram of spherical aberration under the conditions of the standard wavelength and the standard temperature. The objective lens in the example has paraxial power (a ratio of refracting power $\phi R/\phi O = 0.9$) caused by diffraction effect.

TABLE 17 fo = 3.05  NA = 0.6  $\phi R/\phi = 0.9$
Standard wavelength $\lambda$ = 400 nm

| i | ri | di | Materials |
|---|---|---|---|
| 1 | ∞ | 21.1073 | |
| 2 | 2.220503 | 1.720 | Olefin resin |
| 3 | −7.5949 | 2.2288 | |
| 4 | ∞ | 0.600 | PC |

Aspherical surface data

Second surface
Aspherical surface coefficient

| | | | |
|---|---|---|---|
| k | −1.956039E+00 | | |
| A1 | 1.102176E−02 | P1 | 4.0 |
| A2 | −1.402180E−03 | P2 | 6.0 |
| A3 | 5.082352E−05 | P3 | 8.0 |
| A4 | 1.515291E−05 | P4 | 10.0 |

Optical path difference function

| | |
|---|---|
| B2 | −1.781068E−02 |
| B4 | −2.561246E−03 |
| B6 | −2.462032E−04 |
| B8 | −7.280545E−06 |
| B10 | 4.189715E−06 |

Third surface
Aspherical surface coefficient

| | | | |
|---|---|---|---|
| k | −3.468302E+01 | | |
| A1 | 2.339224E−03 | P1 | 4.0 |
| A2 | −5.434985E−05 | P2 | 6.0 |
| A3 | 1.083625E−04 | P3 | 8.0 |
| A4 | −1.202890E−05 | P4 | 10.0 |

As shown in Table 16, a spherical aberration change which is generated by temperature change in the comparative example is corrected satisfactorily in the present example.

Now, Example 10 and Example 11 shown above represent an example that is suitable for a light source (SHG laser) whose wavelength is not changed by temperature. The example shown next is an example wherein a light source (semiconductor laser) that is relatively inexpensive is used. In a semiconductor laser, its wavelength is also changed usually when ambient temperature used is changed. In the present example stated below, a change in wavelength of the laser caused by temperature of the semiconductor laser is assumed to be 0.2 nm/° C.

Example 12

Figure 24:
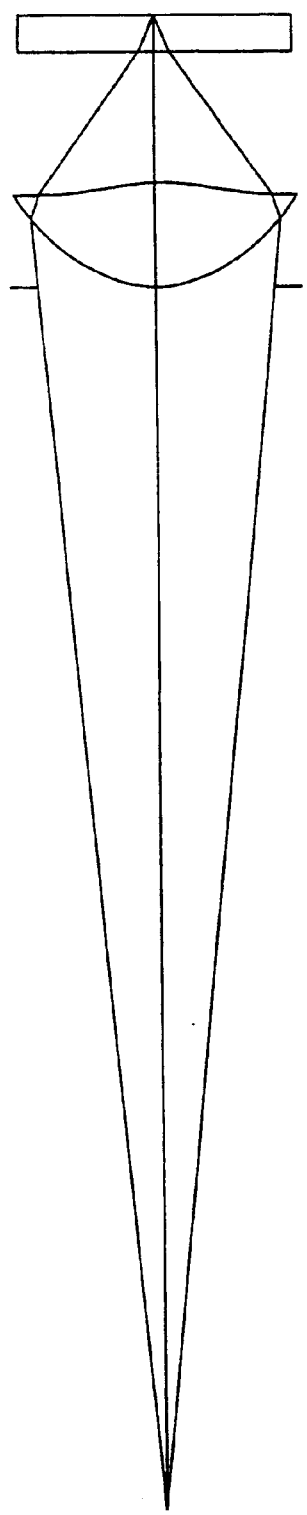
FIG. 24 is a dross sectional view of an objective lens in Example 12.
Figure 25:
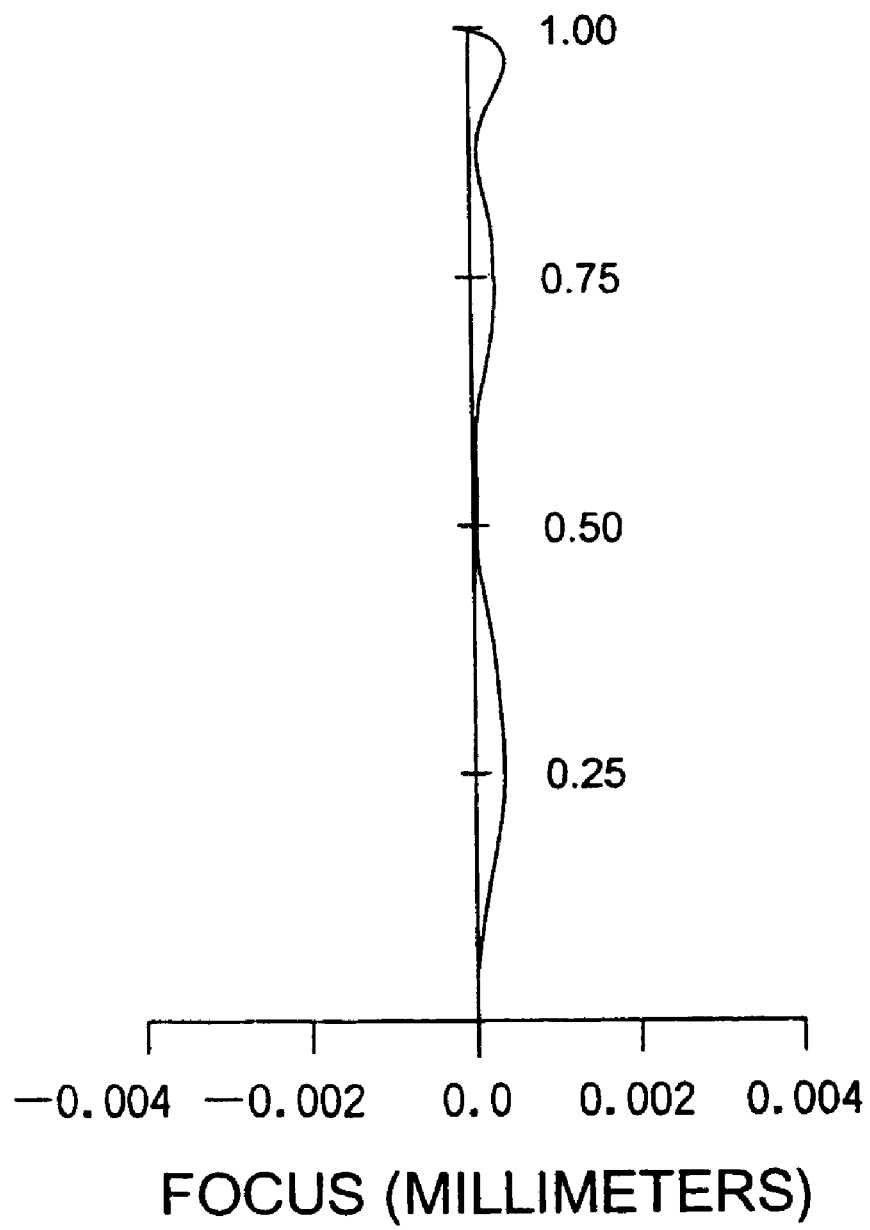
FIG. 25 is a spherical aberration diagram under the conditions of the standard wavelength and standard temperature relating to the objective lens in Example 12.

Table 18 shows lens data of an objective lens related to the present example, FIG. 24 shows a sectional view of the objective lens, and FIG. 25 shows a diagram of spherical aberration under the conditions of the standard wavelength and the standard temperature. Paraxial power (a ratio of refracting power $\phi R/\phi O = 0.9$) caused by diffraction effect is the same as that in Example 11.

TABLE 18 fo = 3.05  NA = 0.6  $\phi R/\phi = 0.9$
Standard wavelength $\lambda$ = 400 nm

| i | ri | di | Materials |
|---|---|---|---|
| 1 | ∞ | 21.1073 | |
| 2 | −2.220503 | 1.720 | Olefin resin |
| 3 | −7.57949 | 2.2288 | |
| 4 | ∞ | 0.600 | PC |

Aspherical surface data

Second surface
Aspherical surface coefficient

| | | | |
|---|---|---|---|
| κ | −1.946922E+00 | | |
| A1 | 1.183956E−02 | P1 | 4.0 |
| A2 | −1.173821E−03 | P2 | 6.0 |
| A3 | 5.529542E−05 | P3 | 8.0 |
| A4 | 1.381534E−05 | P4 | 10.0 |

Optical path difference function

| | |
|---|---|
| B2 | −1.781068E−02 |
| B4 | −1.039147E−03 |
| B6 | −1.322513E−04 |
| B8 | 6.933867E−07 |
| B10 | 9.144614E−07 |

Third surface
Aspherical surface coefficient

| | | | |
|---|---|---|---|
| ι | −1.547917E+01 | | |
| A1 | 1.587504E−03 | P1 | 4.0 |
| A2 | 1.830772E−05 | P2 | 6.0 |
| A3 | 1.097764E−04 | P3 | 8.0 |
| A4 | −1.125128E−05 | P4 | 10.0 |

In an ordinary lens, a third order spherical aberration is in a trend that it is minimum at a prescribed temperature, and it decreases gradually or increases gradually at temperatures before and behind the prescribed temperature. In view of this trend, it is possible to judge that the third order spherical aberration does not take the minimum value in any Example in the range from the standard temperature 25° C.+30° C. to the standard temperature 25° C.−30° C., because a sign of the value in the standard temperature 25° C.+30° C. is opposite to that of the value in the standard temperature 25° C.−30° C. It is therefore considered that unit change amount |SA3/ΔT| in the range of at least standard temperature 25° C.±5° C. (20° C.−30° C.) approximates to a mean value {(value in standard temperature 25° C.+30° C.)−(value in standard temperature 25° C−30° C.)}÷60.

As shown in the upper section of Table 16, third order spherical aberration change amount SA3 for temperature change ΔT° C. in Example 12 is the greatest among those in Examples 10–12. Accordingly, let it be assumed that Example 12 is compared with a comparative example. In consideration that a wavelength of a light source changes as a temperature changes in this case, actual third order spherical aberration change amount SA3 in Example 12 is small as shown in the lower section of Table 16.

Due to the foregoing, even in the case of Example 12 where the third order spherical aberration change amount is the greatest, a unit change amount in at least a range of standard temperature 25° C.=5° C. (20° C.−30° C.) is expressed by the following expression, $$|SA3/\Delta T|=(0.001+0.001)\lambda\div 60°\ C.=0.000033\leq 0.0005$$

which is judged to satisfy relations described in Structures (3-1), (3-6), (3-24), (3-25), (3-30) and (3-48). On the other hand, in the case of the comparative example wherein no fluctuation of a wavelength of a light source is considered, if a wavelength varies in the comparative example, it is clear that the fluctuation of spherical aberration is further increased to be as follows, $|SA3/\Delta T|>0.0005$ which indicates that relations described in Structures (3-1), (3-6), (3-24), (3-25), (3-30) and (3-48) are not satisfied. In the present example, spherical aberration change caused by temperature change in the comparative example is corrected satisfactorily.

Now, there will be examined an occasion wherein recording and/or reproducing of information is conducted for optical information recording media each having a base board with a different thickness, by using light fluxes emitted from light sources each having a different wavelength, in an optical pickup apparatus employing the objective lens related to the Example 12. In this case, the base board was arranged in a way that a distance between a light source and the surface of the transparent base board on the light source side may remain the same as that in Example 12 (namely, the mechanical reference surface of the transparent base board is made to be on the light source side). Namely, the position of a detector is made to be constant. To comply with this, a lens was defocused so that a focus position may be corrected, although a paraxial focus position is changed. Incidentally, the position of the detector is not constant in Example 13 and thereafter described later.

Figure 26:
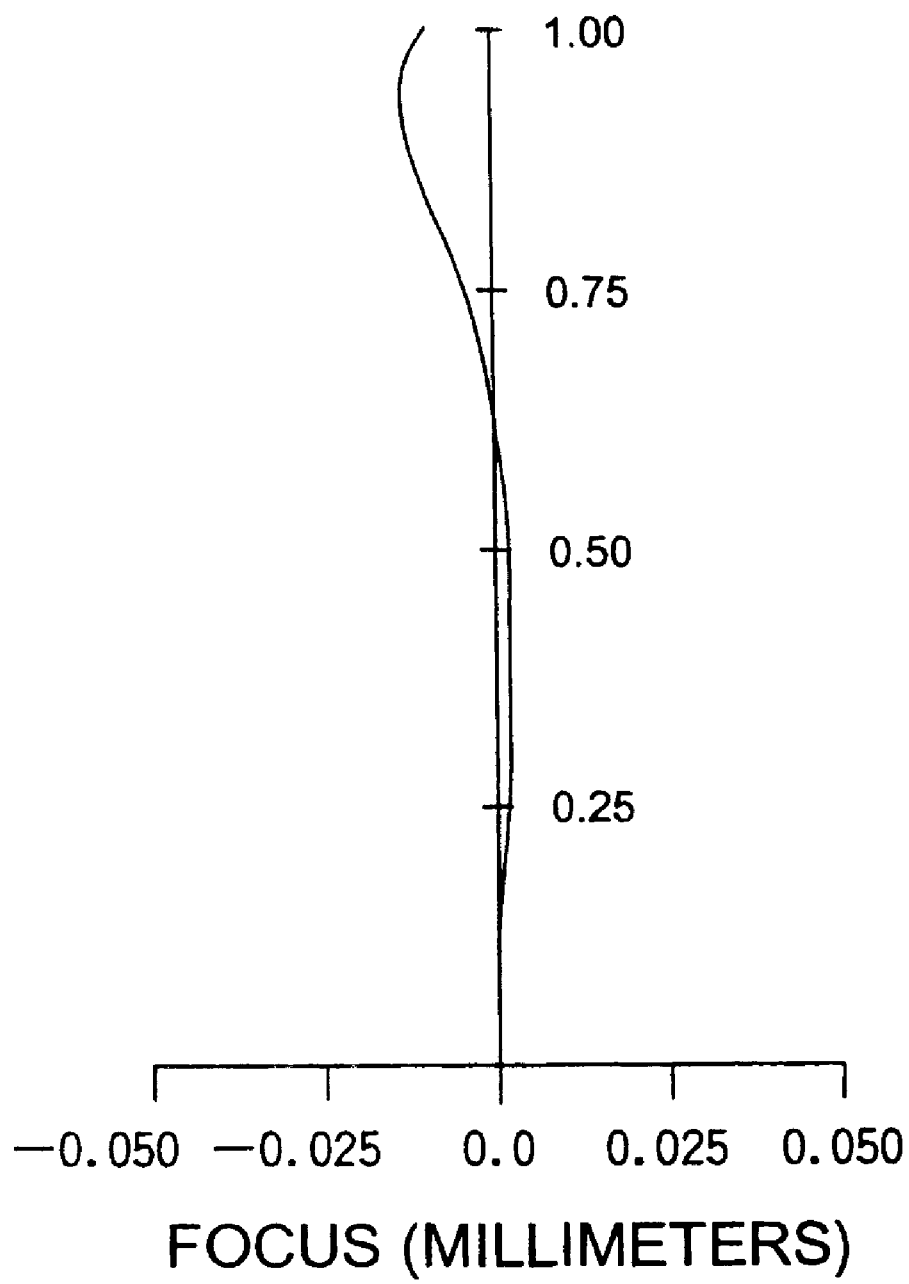
FIG. 26 is a spherical aberration diagram under the wavelength of 780 nm, the transparent base board thickness of 1.2 mm, and the numerical aperture of 0.6.

FIG. 26 is a diagram of spherical aberration wherein wavelength λ is 780 nm, a thickness of the transparent base board is 1,2 mm and a numerical aperture is 0.6. Though the numerical aperture 0.6 makes it impossible to obtain satisfactory image forming power because of residual aberrations, the numerical aperture of about 0.45 such as that in CD, for example, gives sufficient image forming power. Further, if the known wavelength selection filter is used, it is possible to remove a flare section, and thereby to obtain satisfactory image forming power. It is therefore possible to obtain necessary image forming power simultaneously with a single lens in different wavelengths (650 nm, 780 nm) and different base board thickness (0.6 mm, 1.2 mm).

Figure 27:
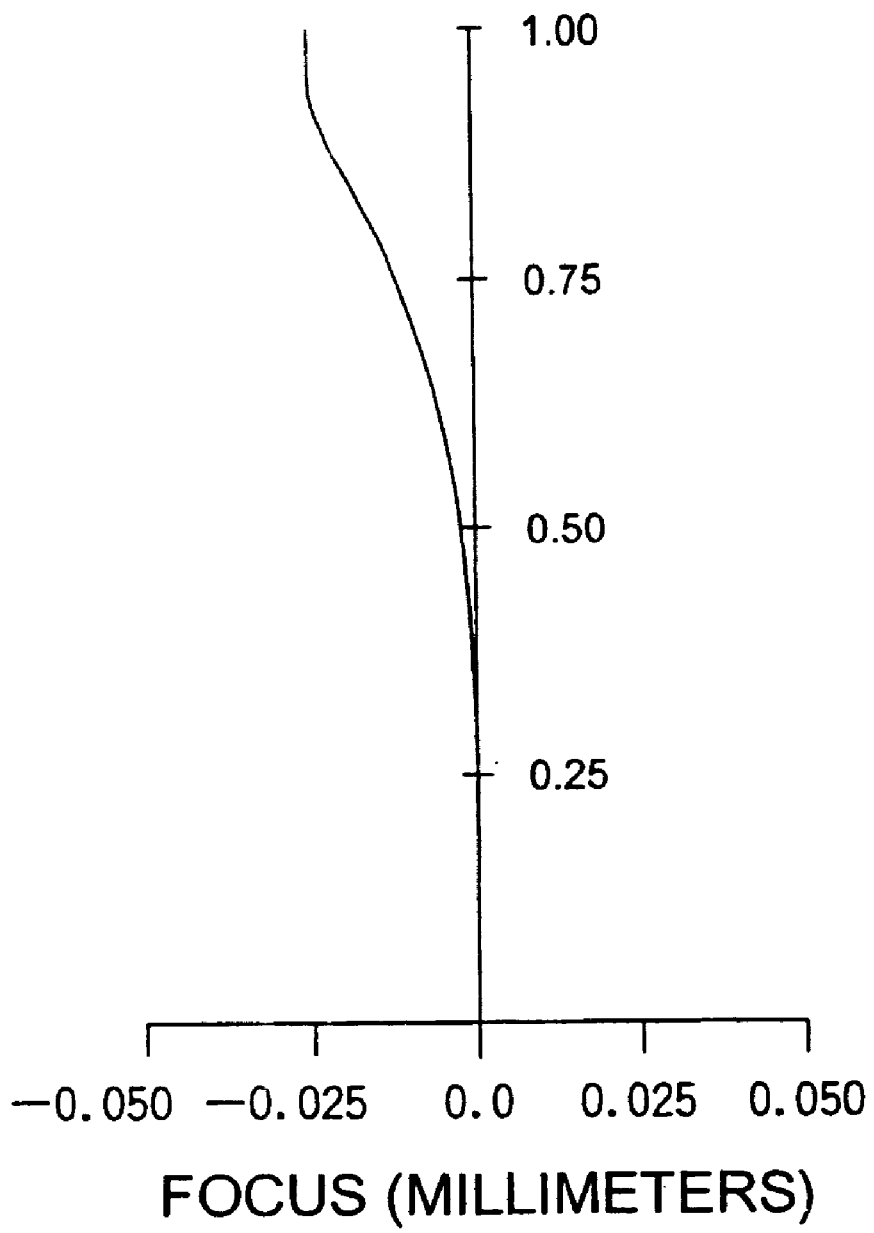
FIG. 27 is a spherical aberration diagram when the distance between the light source and the surface of the transparent base board at the light source-side in FIG. 26 is changed.

Next, FIG. 27 shows a diagram of spherical aberration wherein a distance between a light source and the surface of a transparent base board on the light source side is changed so that spherical aberration may remain even in the case of a small numerical aperture. Differing from the foregoing, sufficient image forming power can not be obtained even in the case of numerical aperture 0.45. However, when a split surface is provided on an optical surface on either side of an objective lens in the known technology as in Example 13 shown below, sufficient image forming power can be obtained. In that case, it is possible to obtain necessary image forming power simultaneously with a single lens in different wavelengths (650 nm, 780 nm) and different base board thickness (0.6 mm, 1.2 mm).

Example 13

Figure 28:
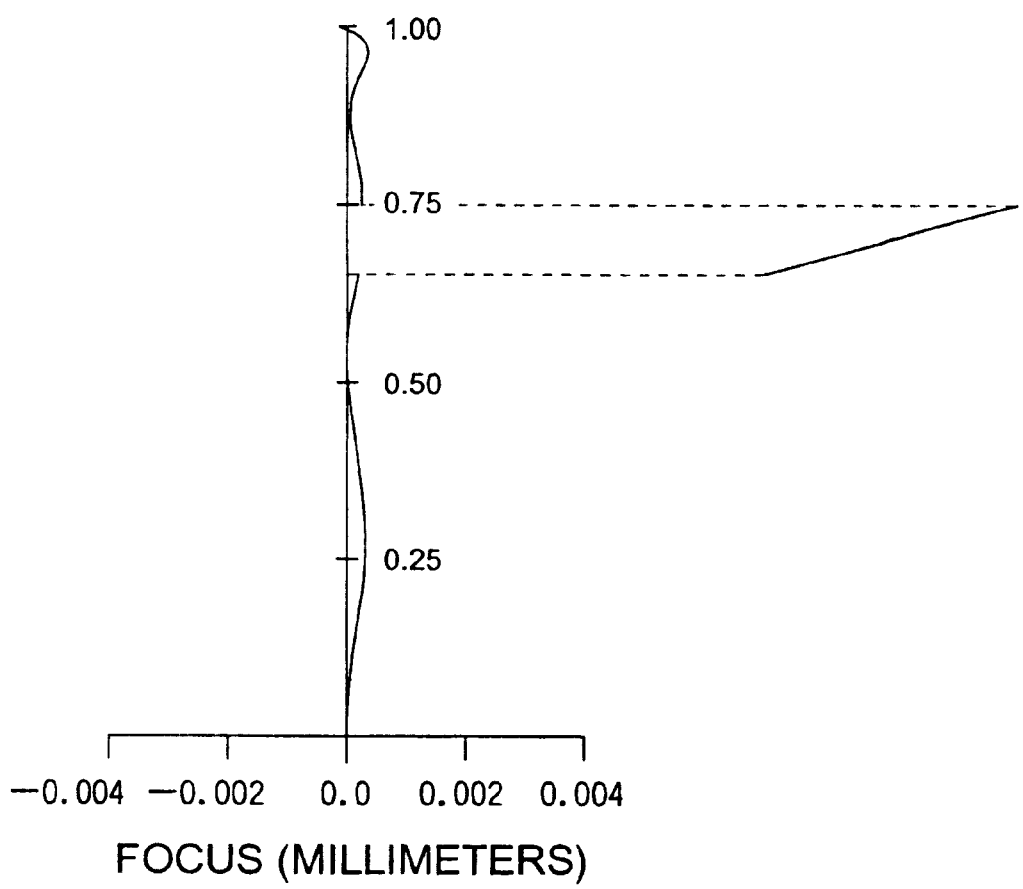
FIG. 28 is a spherical aberration diagram under the wavelength of 650 nm in the first light source , the transparent base board thickness t1 of 0.6 mm in the first optical information recording medium.
Figure 29:
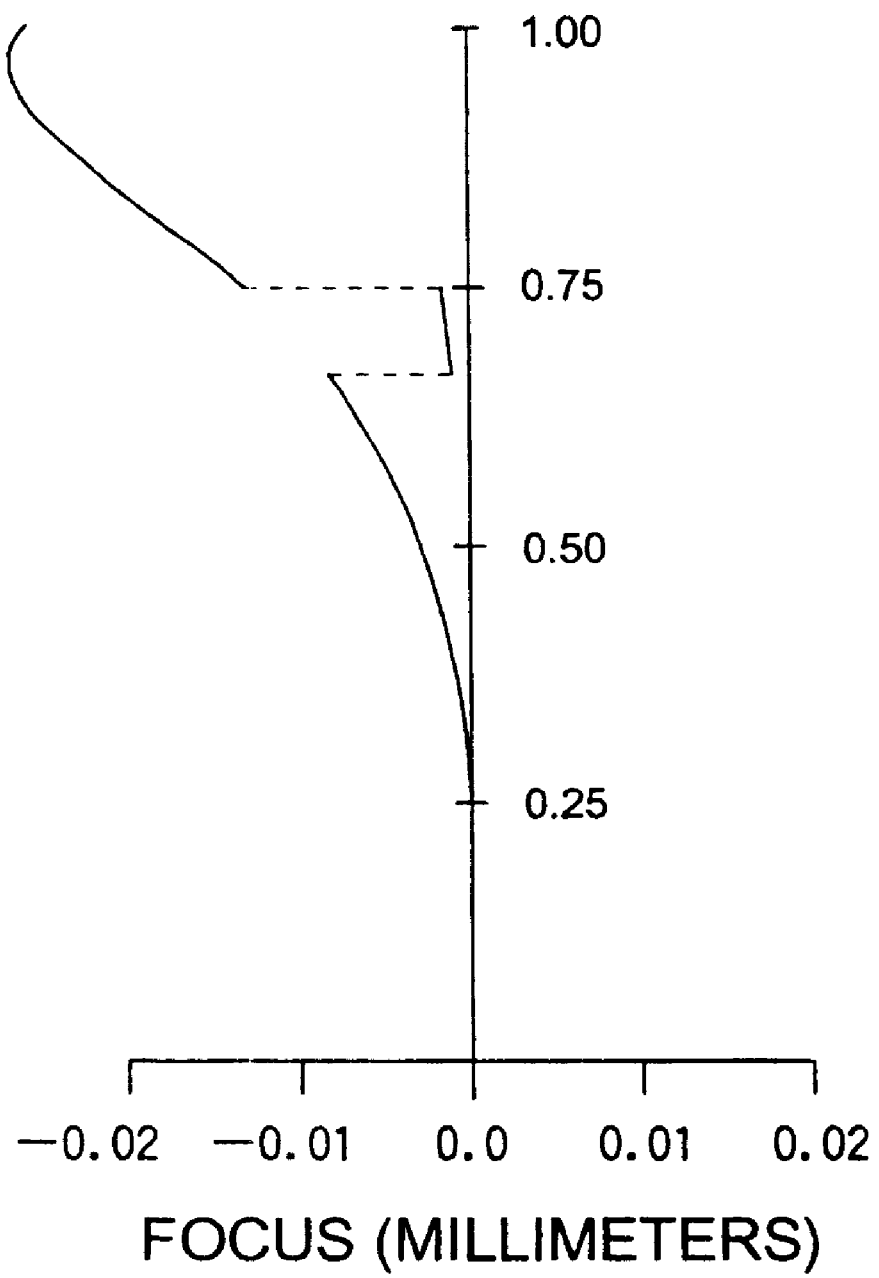
FIG. 29 is a spherical aberration diagram under the wavelength of 780 nm in the second light source , the transparent base board thickness t2 of 1.2 mm in the first optical information recording medium.
Figure 30:
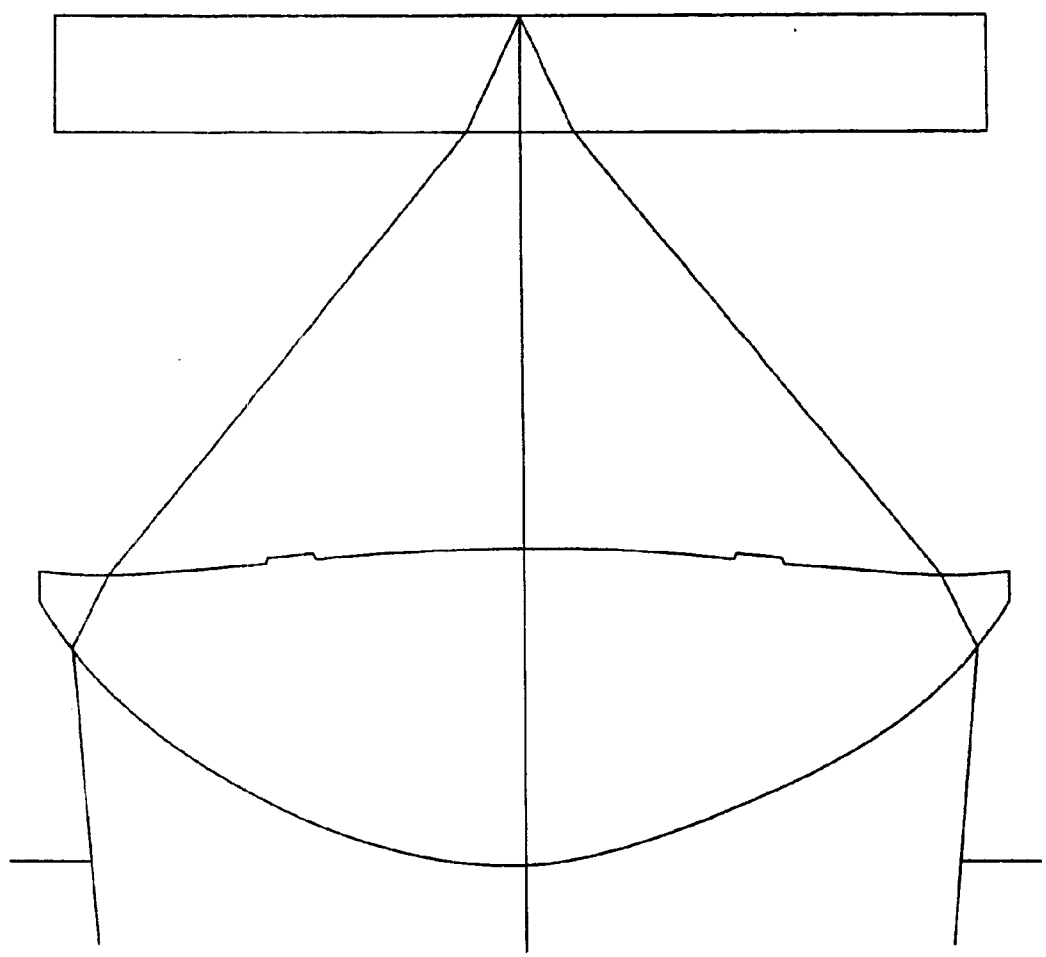
FIG. 30 is a dross sectional view of an objective lens in Example 13 corresponding to FIG. 28.
Figure 31:
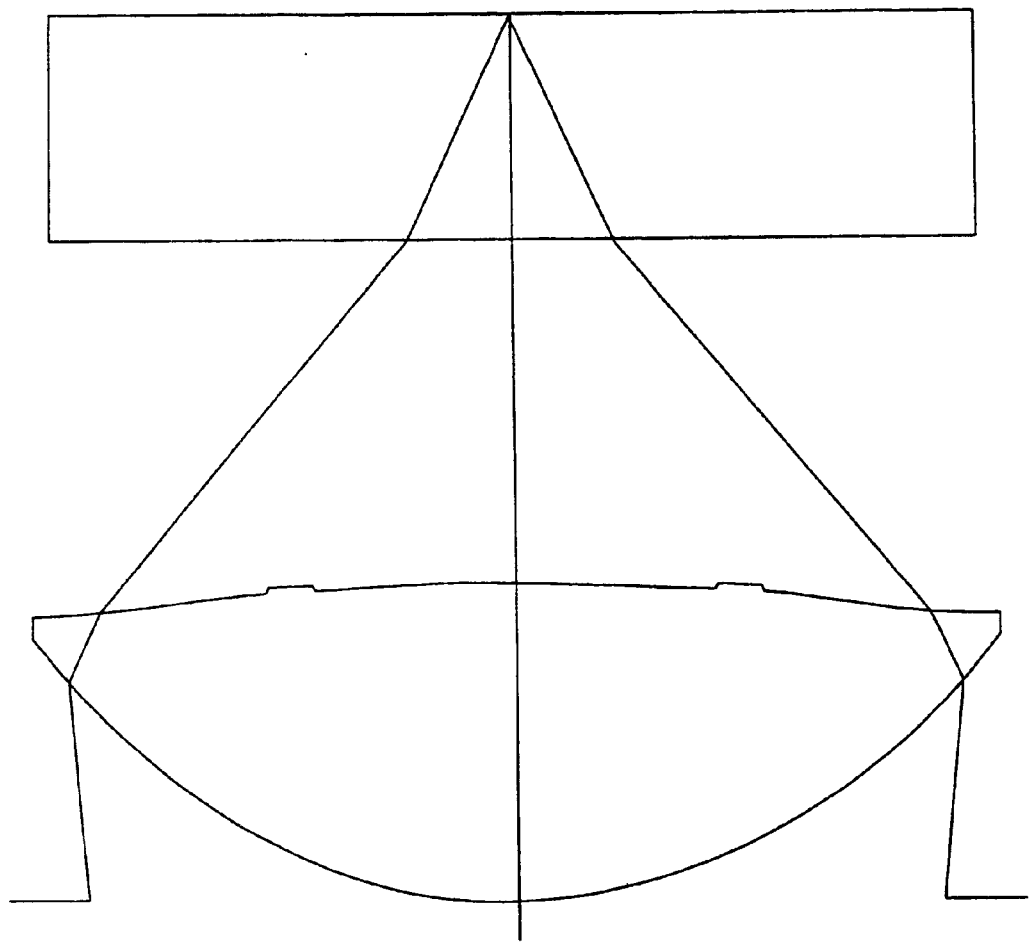
FIG. 31 is a dross sectional view of an objective lens in Example 13 corresponding to FIG. 29.

Table 19 shows lens data of an objective lens related to the present example, FIG. 28 shows a diagram of spherical aberration wherein the first light source λ1 is 650 nm and thickness t1 of a transparent base board of the first optical information recording medium is 0.6 mm, FIG. 29 shows a diagram of spherical aberration wherein the second light source λ2 is 780 nm and thickness t2 of a transparent base board of the second optical information recording medium is 1.2 mm, and each of FIGS. 30 and 31 shows a sectional view of the objective lens complying with each condition.

TABLE 19

| fo = 3.05 | NA = 0.6 | φ R/φ = 1.0 | |
|---|---|---|---|
| Standard wavelength λ = 400 nm | | | |

| i | ri | d1i | d2i | Materials |
|---|---|---|---|---|
| 1 | ∞ | 21.1073 | 19.6462 | |
| 2 | 2.220503 | 1.720 | 1.720 | Olefin resin |
| 3 | −7.57949 | 2.2288 | 1.8225 | |
| 4 | ∞ | 0.600 | 1.200 | PC |

Aspherical Surface Data
Second
Aspherical surface coefficient surface

| Aspherical surface data |
|---|

| Second surface | | | |
|---|---|---|---|
| Aspherical surface coefficient | | | |
| k | −1.946922E+00 | | |
| A1 | 1.183956E−02 | P1 | 4.0 |
| A2 | −1.173821E−03 | P2 | 6.0 |
| A3 | 5.529542E−05 | P3 | 8.0 |
| A4 | 1.381534E−05 | P4 | 10.0 |
| Optical path difference function | | | |
| B2 | −1.781068E−02 | | |
| B4 | −1.039147E−03 | | |
| B6 | −1.622513E−04 | | |
| B8 | 6.933867E−07 | | |
| B10 | 9.144614E−07 | | |
| Third surface | | | |
| Aspherical surface coefficient | | | |
| First and third split surfaces (0 ≦ H ≦ 1.404, 1.581 ≦ H) | | | |
| k | −1.547917E+01 | | |
| A1 | 1.587504E−03 | P1 | 4.0 |
| A2 | 1.830772E−05 | P2 | 6.0 |
| A3 | 1.097764E−04 | P3 | 8.0 |
| A4 | −1.125128E−05 | P4 | 10.0 |
| Second split surface (1.404 ≦ H ≦ 1.581) | | | |
| k | −1.371961E+01 | | |
| A1 | 2.178570E−03 | P1 | 4.0 |
| A2 | 1.601920E−05 | P2 | 6.0 |
| A3 | 1.015600E−04 | P3 | 8.0 |
| A4 | −1.102240E−05 | P4 | 10.0 |

In the present example, even when the necessary numerical aperture is made to be 0.6 for the first optical information recording medium and the necessary numerical aperture is made to be 0.45 for the second optical information recording medium, sufficient image forming power can be obtained for both cases.

Further, in Example 13, a split surface in the form of ring-shaped bands is provided on the surface opposite to the diffraction surface of the objective lens in Example 12, and temperature characteristics under the conditions of λ1=650 nm and t1=0.6 mm are sufficiently corrected and are the same as those in Example 12. Incidentally, H in Table 19 represents a height from an optical axis, and it stipulates the split area.

Table 20 shows refractive indexes for wavelengths of resin materials used in Examples 10–13.

TABLE 20

| Olefin resin | 656 nm | 650 nm | 644 nm | 780 nm |
|---|---|---|---|---|
| Refractive index | 1.5398 | 1.5400 | 1.5403 | 1.5362 |
| Δn/ΔT | 1.2 × 10-5/° C. | | | |
| PC | 656 | 650 | 644 | 780 nm |
| Refractive index | 1.57745 | 1.57787 | 1.57829 | 1.5700 |
| Δn/ΔT | 1.4 × 10-5/° C. | | | |

Figure 32:
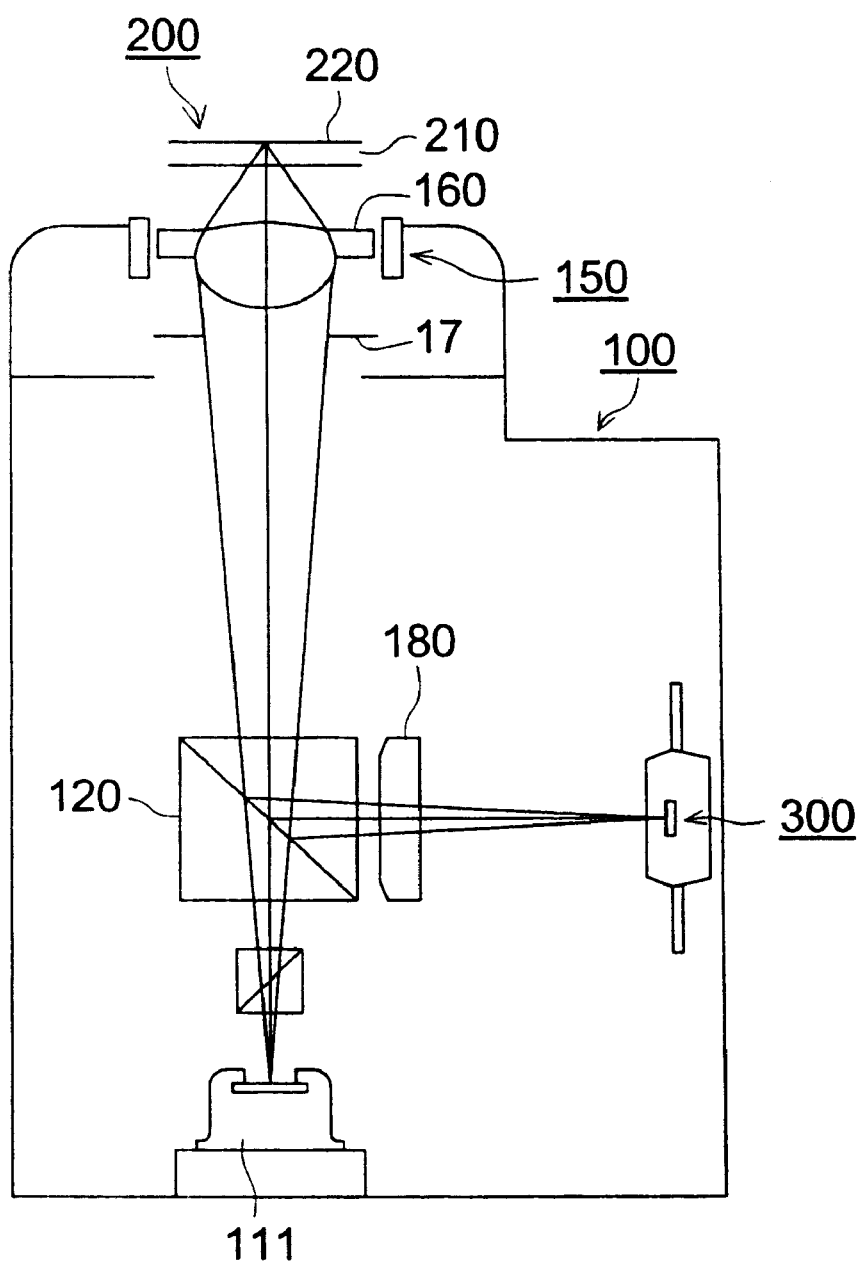
FIG. 32 is an outlined view of an optical pickup apparatus in the first embodiment.

FIG. 32 is a conceptual diagram showing an example of the embodiment related to an optical pickup apparatus (a type of one light source and one detector) to which the Examples 10–13 of the objective lens can be applied. In this example of the embodiment, it is preferable to apply the objective lens especially in Example 12, because a semiconductor laser is used. In optical pickup apparatus 100, a light flux emitted from semiconductor laser 111 representing a light source passes through beam splitter 120 which is a light mixing means, then, is stopped down to the prescribed numerical aperture by diaphragm 17, and forms a spot on information recording surface 220 through diffraction-integrated objective lens 160 and through transparent base board 210 of high density recording optical disk 200 representing an optical information recording medium. It is preferable that a wavelength (standard wavelength) of the semiconductor laser beam is 680 nm or less, and 500 nm or less is more preferable. In this case, a laser beam with wavelength of 650 nm was used to comply with specifications of the objective lens in Examples 10–12.

A reflected light flux modulated by information bit on information recording surface 220 becomes a converged light again through diffraction-integrated objective lens 160, then, further passes through diaphragm 17 to be reflected on beam splitter 120, and passes through cylindrical lens 180 to be subjected to astigmatism and magnification change, and is converged on a light-receiving surface of photo-detector 300. Incidentally, the numeral 150 in the diagram represents an actuator for focus control and tracking control.

Incidentally, including an embodiment described later, objective lens 160 is driven by actuator 150 for tracking in the direction perpendicular to an optical axis, and thereby, its relative position with semiconductor laser 111 representing a light source is changed. In this case, a position where an astigmatism component of wavefront aberration of a light flux emerged from objective lens 160 is minimum is a position where an optical axis of the objective lens 160 is deviated from the center of a light flux emitted from the semiconductor laser 111, and therefore, it is possible to expand a range where astigmatism is smaller than a prescribed value. Further, when distance U between the semiconductor laser and the information recording surface of the optical information recording medium is made to be within a range from 10 mm to 40 mm, optical pickup apparatus 100 can be made compact, which is preferable.

In addition, diaphragm 17 was also set properly so that the numerical aperture on the disk 16 side may have the prescribed value to comply with specifications of the objective lens in the example. In the present embodiment, it is also possible to provide a liquid crystal shutter right ahead of the diaphragm 17.

Figure 33:
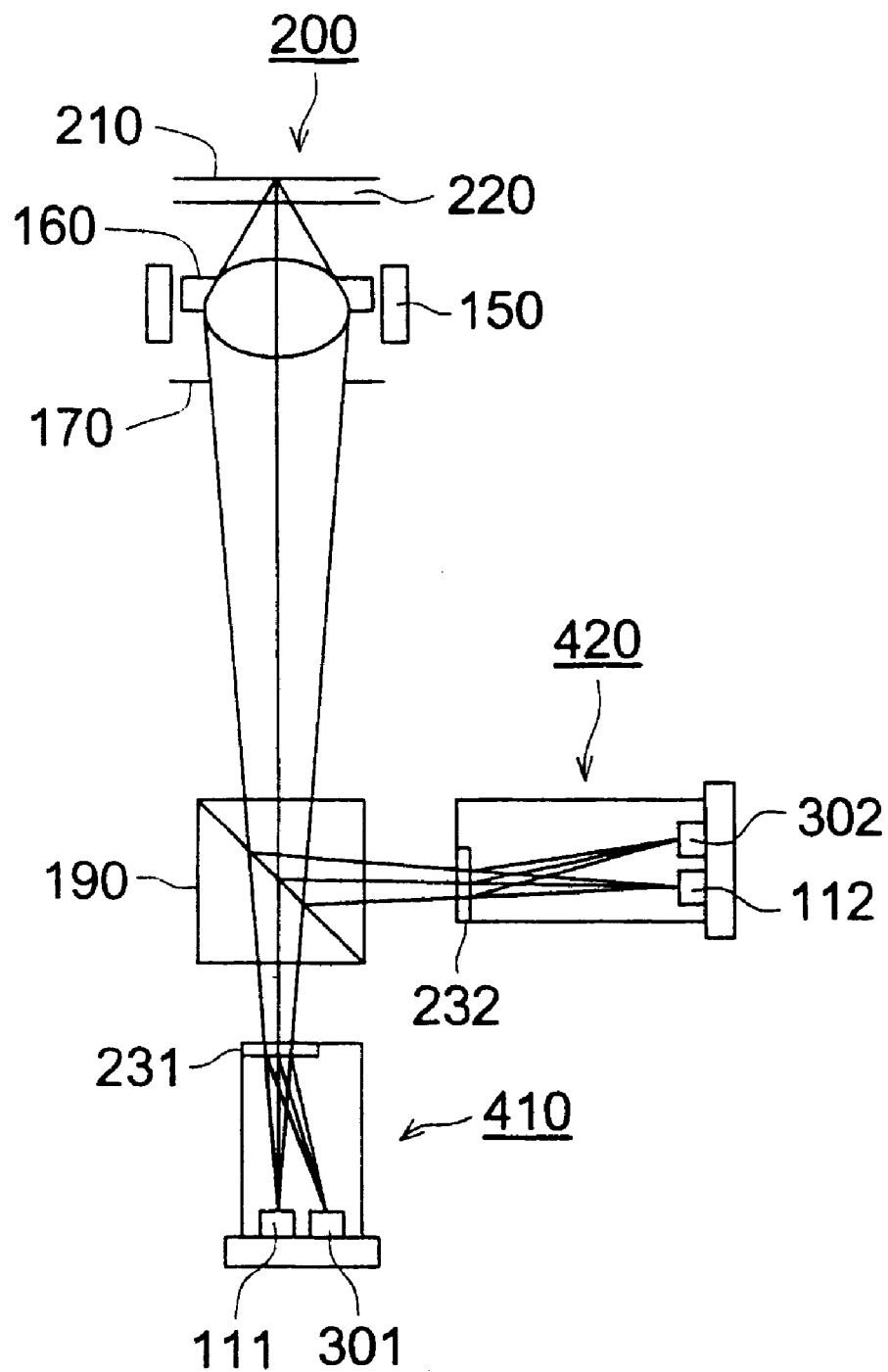
FIG. 33 is an outlined view of an optical pickup apparatus in the second embodiment.

FIG. 33 is a conceptual diagram showing an example of the embodiment related to an optical pickup apparatus (a type of two light sources and two detectors) to which the Examples 10 to 13 of the objective lens can be applied. In this example of the embodiment, it is preferable to apply the objective lens especially in Example 13, because two light sources are used. In the optical pickup apparatus in FIG. 33, when reproducing the first optical disk, the first semiconductor laser 111 unitizes photo-detector 301 and hologram 231 in laser/detector integrating unit 410, and a light flux emitted from the first semiconductor laser 111 is transmitted through hologram 231, then, is transmitted through beam splitter 190 representing a light mixing means, then is stopped down by diaphragm 170, and is converged by objective lens 160 on information recording surface 220 through transparent base board 210 of the first optical disk 200.

A light flux modulated by information bit and reflected on information recording surface 220 is transmitted through beam splitter 190 again through objective lens 160 and diaphragm 170, and is diffracted by hologram 231 to enter photo-detector 301, thereby, its output signal is used to obtain reading signals for information recorded on the first optical disk 200.

Further, it is arranged so that a light quantity change caused by a change in a shape of the spot and a change in position of the spot on photo-detector 301 is detected, and thereby, detection of focusing and track detection are conducted so that objective lens 160 is moved by two-dimensional actuator 150 for focusing and tracking.

When reproducing the second optical disk, the second semiconductor laser 112 unitizes photo-detector 302 and hologram 232 in laser/detector integrating unit 42, and a light flux emitted from the second semiconductor laser 112 is transmitted through hologram 232, then, is reflected on beam splitter 190 representing a light mixing means, and is converged on information recording surface 220 through diaphragm 170, objective lens 160 and further through transparent base board 210 of the second optical disk 200.

A light flux modulated by information bit and reflected on information recording surface 220 passes through objective lens 160 and diaphragm 170, and is reflected on beam splitter 190, and is diffracted by hologram 232 to enter photo-detector 302, thereby, its output signal is used to obtain reading signals for information recorded on the second optical disk 200.

Further, it is arranged so that a light quantity change caused by a change in a shape of the spot and a change in position of the spot on photo-detector 302 is detected, and based on this detection, detection of focusing and track detection are conducted so that objective lens 160 is moved by two-dimensional actuator 150 for focusing and tracking.

In the present embodiment and in an embodiment of a 2-laser type which will be described later, t1<t2 and NA1>NA2 hold when NA1 represents a necessary numerical aperture of objective lens 160 on the optical disk side in recording or reproducing the first optical disk 200 by the use of the first light flux having wavelength λ1, and when NA2 represents a necessary numerical aperture of objective lens 160 on the optical disk side in recording or reproducing the second optical disk 200 by the use of the second light flux having wavelength λ2, the following expressions are satisfied when NA (1) represents a numerical aperture of objective lens 160 on the side of an optical disk for the first light flux and when mo1 represents an image forming magnification of objective lens 160 for the first light flux, $$NA(1) \geq 0.56 \qquad (17)$$

$$-\tfrac{1}{5} \leq mo1 \leq -\tfrac{1}{7.5} \qquad (18)$$

and the following expression is satisfied as stated above when ΔSA1 represents an axial spherical aberration change amount of objective lens 160 for at least temperature change $\Delta T°$ C. in a range of 20° C.–30° C. of ambient temperature.

$$|\Delta SA1/\Delta T| \leq 0.0005 \; \lambda\text{rms}/° \text{C}. \tag{19}$$

Further, on the unillustrated optical path through which the first light flux and the second light flux pass in common, namely, on the surface of objective lens 160 opposite to the diffraction pattern surface, there is provided a partial dichroic coating representing an aperture regulating means that allows the first light flux and the central portion of the second light flux to pass through and reflects (intercepts) the outer area of the second light flux. The reflectance of the partial dichroic coating for a light flux having wavelength $\lambda 2$ is in a range from 30% to 70%.

As a variation of the present embodiment, it is also possible to consider that a diffraction pattern is provided on each of both sides of objective lens 160, and a partial diffraction pattern which allows the first light flux positioned on the surface on one side of objective lens 160 and the central portion of the second light flux to pass through and diffracts an outer area of the second light flux is formed.

As another variation of the present embodiment, it is also possible to arrange as follows; when a light flux entering information recording surface 220 of optical disk 200 is divided into at least three light fluxes including an inner light flux in the vicinity of an optical axis, an intermediate light flux that is outside the inner light flux and an outer light flux that is outside the intermediate light flux, a beam spot is formed by using mainly the inner light flux and the outer light flux in a light flux emitted from the first semiconductor laser 111, and thereby recording and/or reproducing of information is conducted for the first optical disk 200, and a beam spot is formed by using mainly the inner light flux and the intermediate light flux in a light flux emitted from the second semiconductor laser 112, and thereby recording and/or reproducing of information is conducted for the second optical disk 200.

By providing an aperture regulating means as stated above, it is possible to adjust a spot diameter on information recording surface 220, and thereby to conduct appropriate recording or reproducing of information for optical disks of different types.

Incidentally it is preferable that third order spherical aberration of wavefront aberration of an inner area among a light flux emitted from the second semiconductor laser 112 that enters information recording surface 220 of the second-optical disk 200, is under (see FIG. 29).

Figure 34:
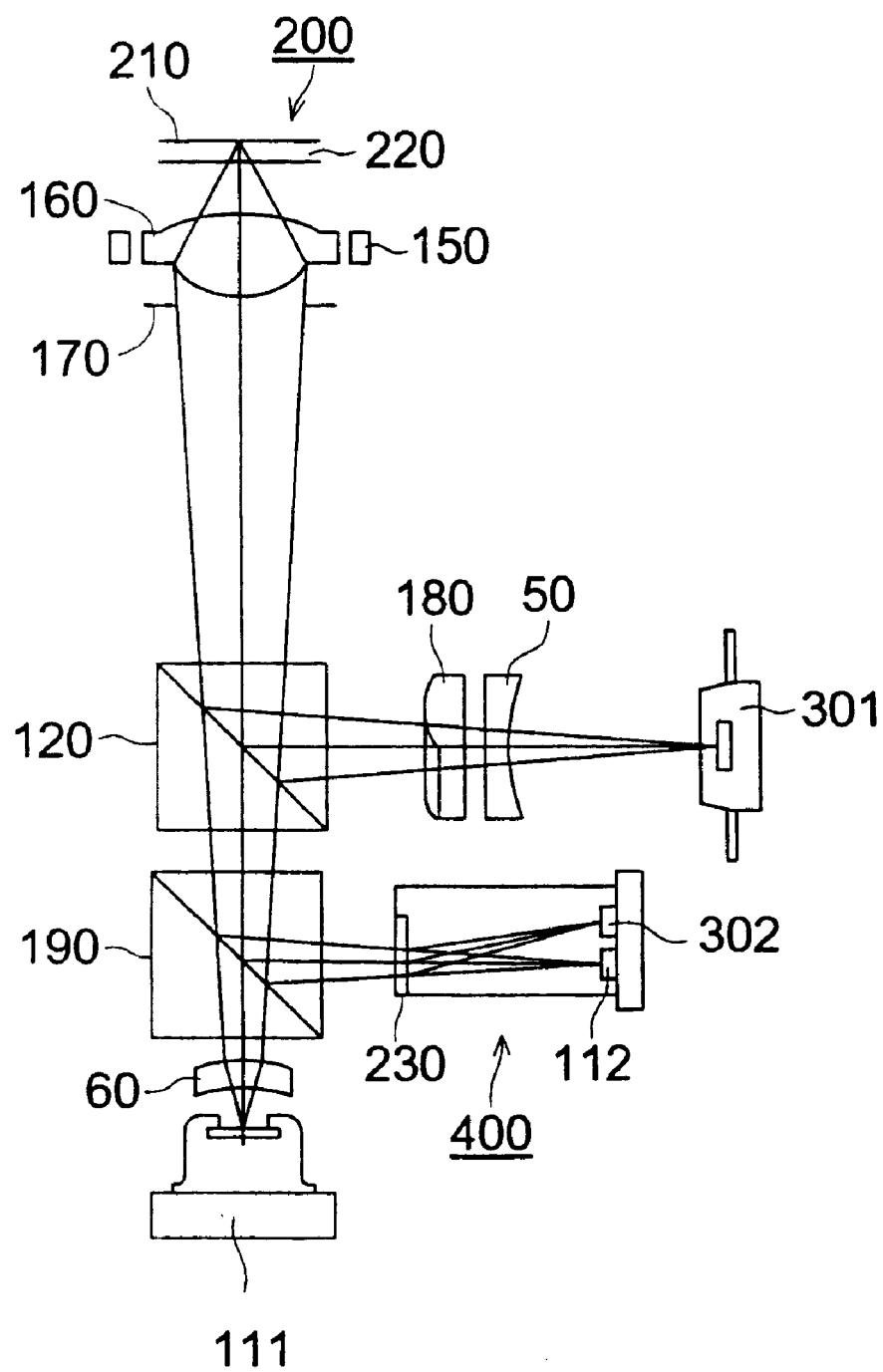
FIG. 34 is an outlined view of an optical pickup apparatus in the third embodiment.

The third optical pickup apparatus (a type of 2 light sources and 2 detectors) shown in FIG. 34 is of the structure suitable for an optical system for recording and reproducing, and an embodiment for recording and reproducing of information will be explained below.

When reproducing the first optical disk, first semiconductor laser 111 representing a first light source emits a beam which passes through coupling lens 60 that makes a degree of divergence of a divergent light flux to be small, beam splitter 190 representing a light mixing means, and beam splitter 120, then, is stopped down by diaphragm 170, and is converged by objective lens 160 on information recording surface 220 through transparent base board 210 of the first optical disk 200.

A light flux modulated by information bit and reflected on information recording surface 220 passes again through objective lens 160 and diaphragm 170, then, enters beam splitter 120 and reflected there to be given astigmatism by cylindrical lens 180, and enters photo-detector 301 through concave lens 50, thus, signals of reading information recorded on the first optical disk 200 is obtained by using output signals.

Further, a light quantity change caused by a change in a shape of the spot and a change in position of the spot on photo-detector 301 is detected, and thereby, detection of focusing and track detection are conducted. Then, objective lens 160 is moved so that two-dimensional actuator 150 may make a light flux emitted from the first semiconductor laser 111 to form images on recording surface 220 of the first optical disk 200 based on the aforesaid detection, and the objective lens 160 is moved so that a light flux emitted from the first semiconductor laser 111 may form images on the prescribed track.

The second semiconductor laser 112 representing the second light source for reproducing the second optical disk is unitized integrally with photo-detector 302 and hologram 230 on laser/detector integrating unit 400. "Unit" or "unitization" means that a unitized member and a unitized means can be incorporated in an optical pickup apparatus as one body, and they are in the state to be mounted as a part in the course of assembling of an apparatus.

A light flux emitted from the second semiconductor laser 112 passes through hologram 230, then, reflected on beam splitter 190 representing a light mixing means, then, passes beam splitter 120, and is converged on information recording surface 220 through diaphragam 170 and objective lens 160 and through transparent base board 210 of the second optical disk 200.

A light flux modulated by information bit and reflected on information recording surface 220 passes again through objective lens 160, diaphragm 170 and beam splitter 120, then, is reflected on beam splitter 190, and is diffracted by hologram 230 to enter photo-detector 302, thus, signals of reading information recorded on the second optical disk 200 is obtained by using output signals.

Further, a light quantity change caused by a change in a shape of the spot and a change in position of the spot on photo-detector 302 is detected, and detection of focusing and track detection are conducted so that objective lens 160 is moved by two-dimensional actuator 150 for focusing and tracking.

Figure 35:
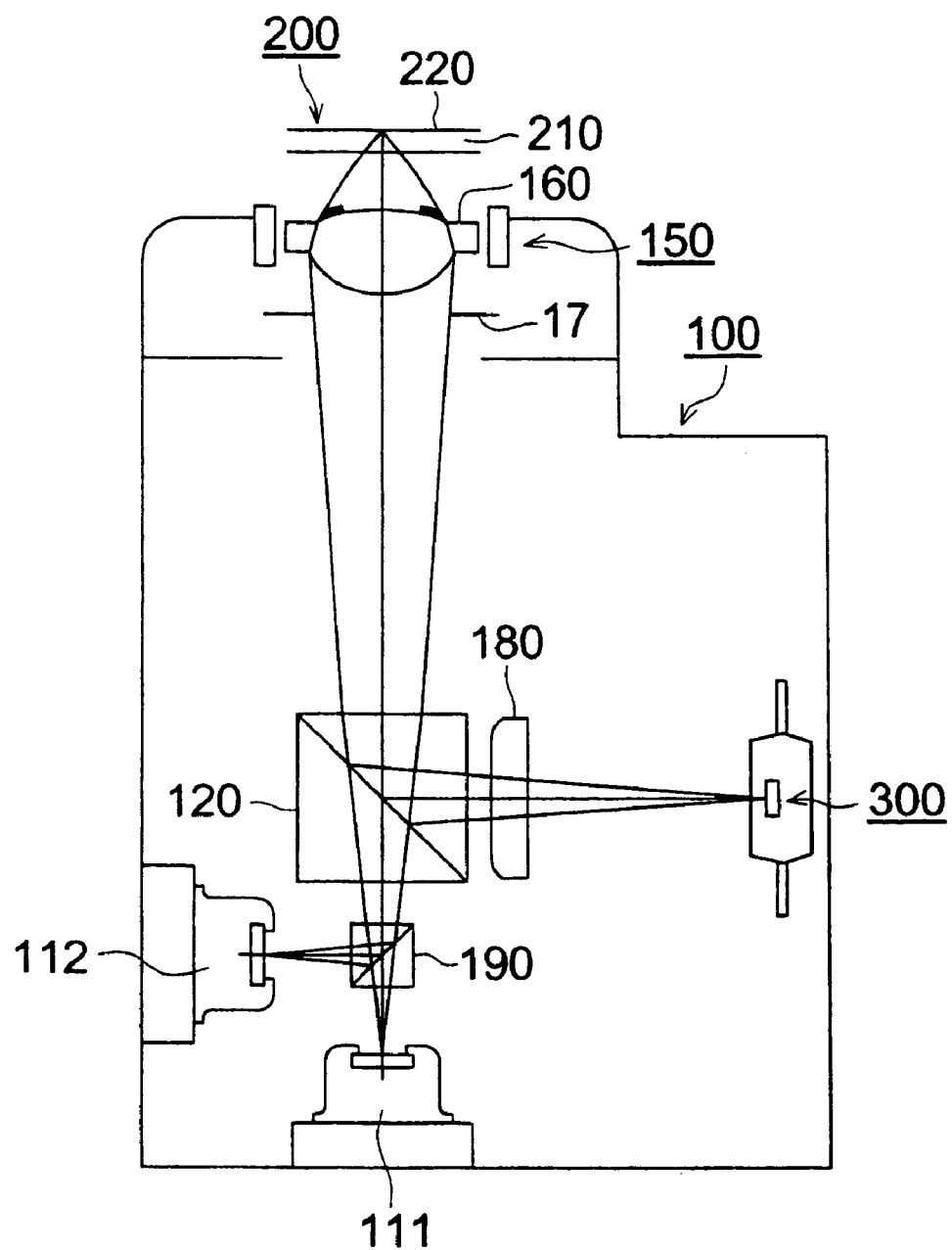
FIG. 35 is an outlined view of an optical pickup apparatus in the fourth embodiment.

In the optical pickup apparatus (of a type of two light sources and one detector) relating to the fourth embodiment shown in FIG. 35, there are provided semiconductor laser 111 representing the first light source for reproducing the first optical disk and semiconductor laser 112 representing the second light source for reproducing the second optical disk.

First, when reproducing the first optical disk, the first semiconductor laser 111 emits a beam representing a light flux which passes through beam splitter 190 representing a light mixing means for light fluxes emitted from both semiconductor lasers 111 and 112 and beam splitter 120, then, is stopped down by diaphragm 17, and is converged by objective lens on information recording surface 220 through transparent base board 210 of the first optical disk 200.

A light flux modulated by information bit and reflected on information recording surface 220 passes again through objective lens 160 and diaphragm 17, then, enters beam splitter 120 and reflected there to be given astigmatism by cylindrical lens 180, and enters photo-detector 300, thus, signals of reading information recorded on the first optical disk 200 is obtained by using output signals.

Further, a light quantity change caused by a change in a shape of the spot and a change in position of the spot on photo-detector 300 is detected, and thereby, detection of focusing and track detection are conducted. Then, based on this detection, two-dimensional actuator 150 moves objective lens 160 so that a light flux emitted from the first semiconductor laser 111 may form images on recording surface 220 of the first optical disk 200, and moves the objective lens 160 so that a light flux emitted from semiconductor laser 111 may form images on the prescribed track.

When reproducing the second optical disk, second semiconductor laser 112 emits a beam representing a light flux which is reflected on beam splitter 190 representing a light mixing means, and is converged on information recording surface 220 through beam splitter 190, diaphragm 17 and objective lens 160 and through transparent base board 210 of the second optical disk 200, in the same way as in the light flux emitted from the first semiconductor laser 111.

A light flux modulated by information bit and reflected on information recording surface 220 passes again through objective lens 160, diaphragm 17, beam splitter 190 and cylindrical lens 180, and enters photo-detector 300, thus, signals of reading information recorded on the second optical disk 200 is obtained by using output signals.

Further, in the same way as in the case of the first optical disk, it is arranged so that a light quantity change caused by a change in a shape of the spot and a change in position of the spot on photo-detector 300 is detected, and thereby, detection of focusing and track detection are conducted, and objective lens 160 is moved by two-dimensional actuator 150 for focusing and tracking.

Figure 36:
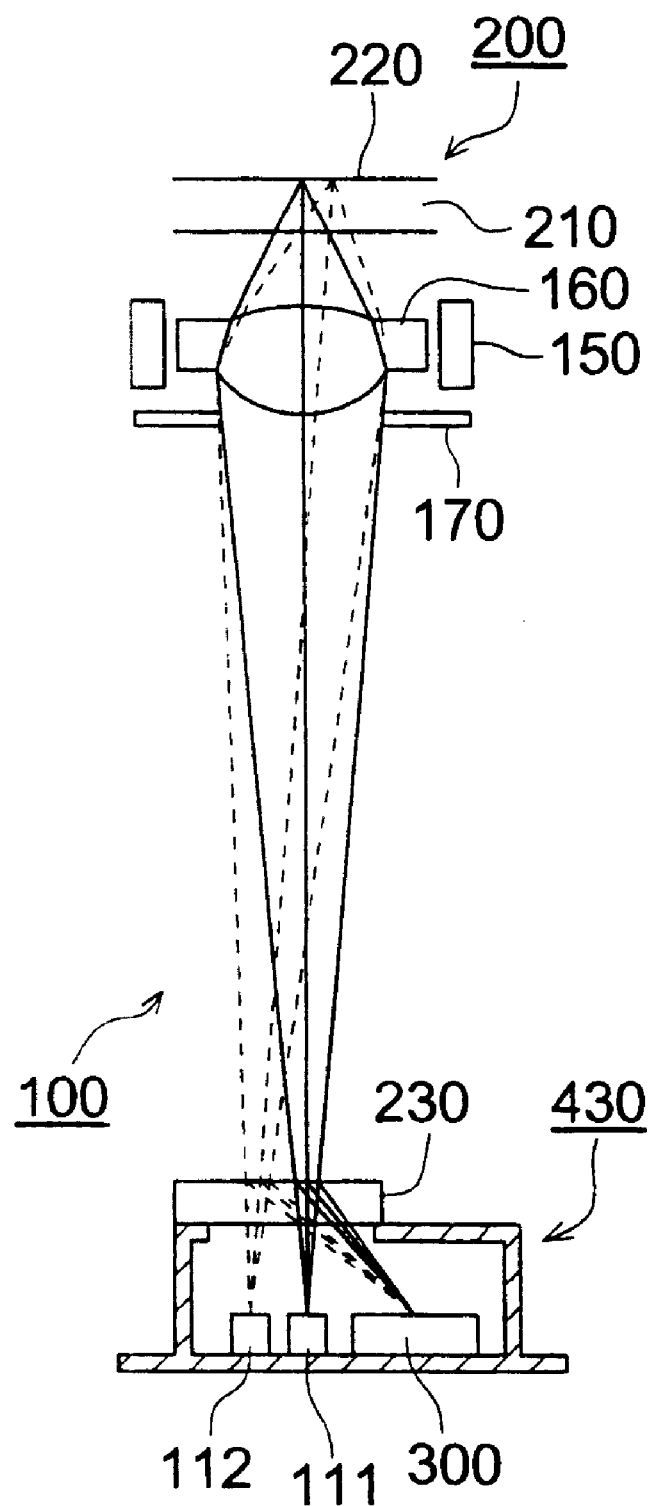
FIG. 36 is an outlined view of an optical pickup apparatus in the fifth embodiment.

In the optical pickup apparatus (of a type of two light sources, one detector and one unit) in the fifth embodiment shown in FIG. 36, first semiconductor laser 111 representing the first light source, second semiconductor laser 112 representing the second light source, photo-detector 30 and hologram 230 are unitized integrally as laser/detector integrating unit 430.

When reproducing the first optical disk, a light flux emitted from the first semiconductor laser 111 passes through hologram 230, then, is stopped down by diaphragm 170, and is converged by objective lens 160 on image recording surface 220 through transparent base board 210 of the first optical disk 200.

A light flux modulated by information bit and reflected on information recording surface 220 passes again through objective lens 160 and diaphragm 170, then, is diffracted by hologram 230 to enter photo-detector 300, thus, signals of reading information recorded on the first optical disk 200 is obtained by using output signals.

Further, a light quantity change caused by a change in a shape of the spot and a change in position of the spot on photo-detector 300 is detected, and thereby, detection of focusing and track detection are conducted, and objective lens 160 is moved by two-dimensional actuator 150 for focusing and tracking.

When reproducing the second optical disk, a light flux emitted from the second semiconductor laser 112 passes through hologram 230 to become the almost-collimated light flux which further passes through diaphragm 170 and objective lens 160 to be converged on information recording surface 220 through transparent base board 210 of the second optical disk 200.

A light flux modulated by information bit and reflected on information recording surface 220 passes again through objective lens 160 and diaphragm 170, then, is diffracted by hologram 230 to enter photo-detector 300, thus, signals of reading information recorded on the second optical disk 200 is obtained by using output signals.

Further, a light quantity change caused by a change in a shape of the spot and a change in position of the spot on photo-detector 300 is detected, and thereby, detection of focusing and track detection are conducted, and objective lens 160 is moved by two-dimensional actuator 150 for focusing and tracking, based on the aforesaid detection.

Figure 37:
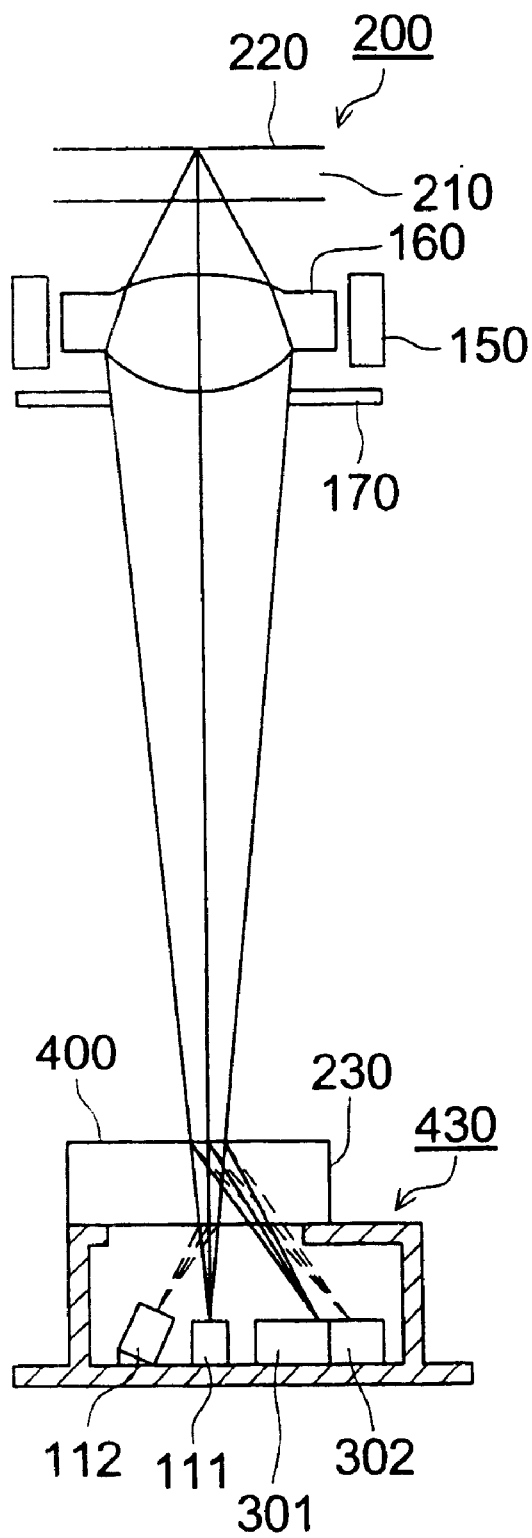
FIG. 37 is an outlined view of an optical pickup apparatus in the sixth embodiment.

In the optical pickup apparatus (of a type of two light sources, two detectors and one unit) in the sixth embodiment shown in FIG. 37, first semiconductor laser 111 representing the first light source, second semiconductor laser 112 representing the second light source, first photo-detector 301, second photo-detector 302 and hologram 230 are unitized integrally as laser/detector integrating unit 430.

When reproducing the first optical disk, a light flux emitted from the first semiconductor laser 111 passes through the surface of hologram 230 on the disk side, then, is stopped down by diaphragm 170, and is converged by objective lens 160 on image recording surface 220 through transparent base board 210 of the first optical disk 200.

A light flux modulated by information bit and reflected on information recording surface 220 passes again through objective lens 160 and diaphragm 170, then, is diffracted by the surface of hologram 230 on the disk side to enter photo-detector 301 corresponding to the first light source, thus, signals of reading information recorded on the first optical disk 200 is obtained by using output signals.

Further, a light quantity change caused by a change in a shape of the spot and a change in position of the spot on photo-detector 301 is detected, and thereby, detection of focusing and track detection are conducted, and objective lens 160 is moved by two-dimensional actuator 150 for focusing and tracking.

When reproducing the second optical disk, a light flux emitted from the second semiconductor laser 112 is diffracted by the surface of hologram 230 on the semiconductor laser side. This surface of hologram 230 on the semiconductor laser side functions as a light mixing means. This diffracted light further passes through diaphragm 170 and objective lens 160 to be converged on information recording surface 220 through transparent base board 210 of the second optical disk 200.

A light flux modulated by information bit and reflected on information recording surface 220 passes again through objective lens 160 and diaphragm 170, then, is diffracted by the surface of hologram 230 on the disk side to enter photo-detector 302 corresponding to the second light source, thus, signals of reading information recorded on the second optical disk 200 is obtained by using output signals.

Further, a light quantity change caused by a change in a shape of the spot and a change in position of the spot on photo-detector 302 is detected, and thereby, detection of focusing and track detection are conducted, and objective lens 160 is moved by two-dimensional actuator 150 for focusing and tracking.

Figure 38:
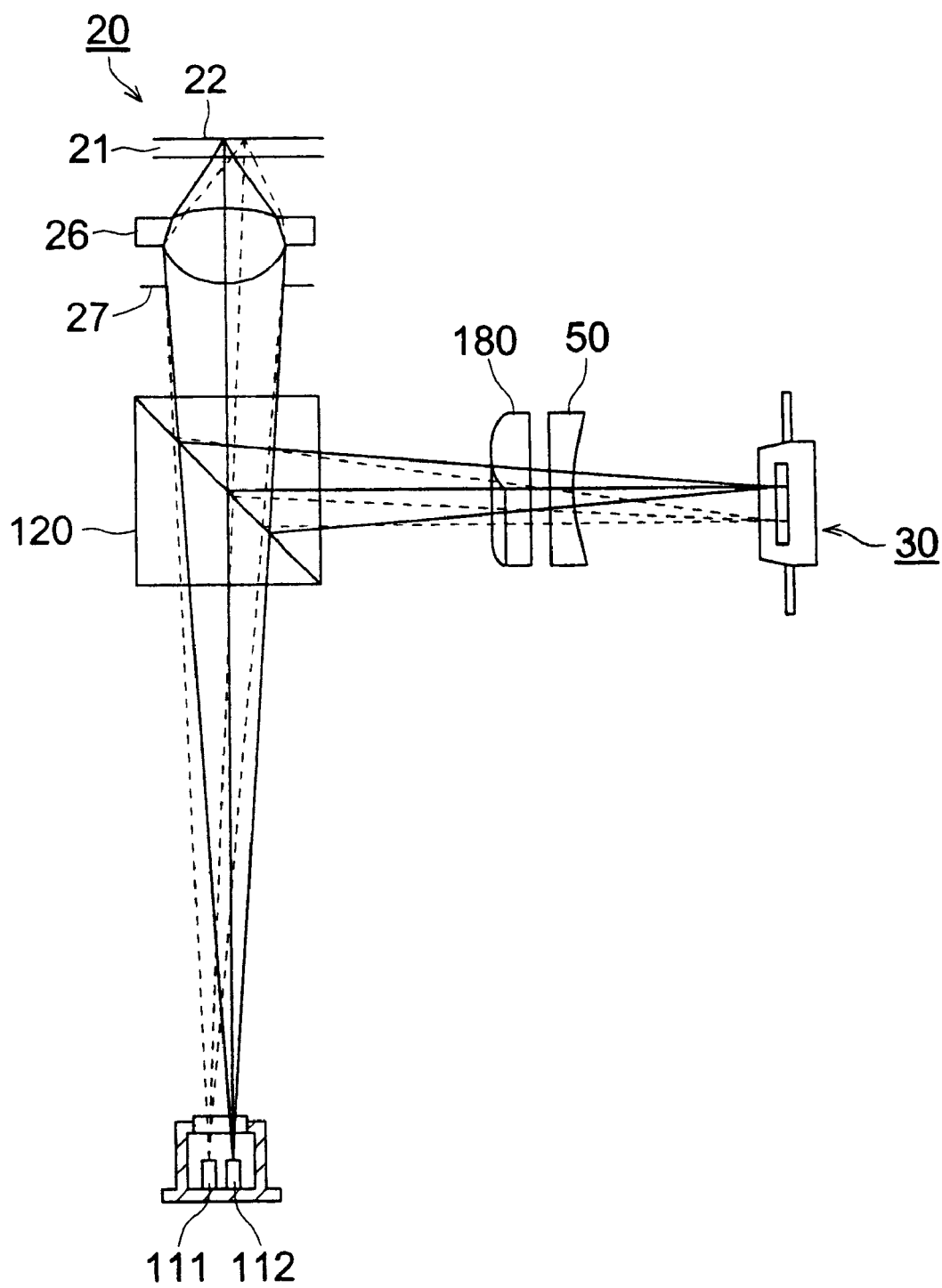
FIG. 38 is an outlined view of an optical pickup apparatus in the seventh embodiment.

In the optical pickup apparatus (of a type of two light sources and one package) in the seventh embodiment shown in FIG. 38, a beam emitted from the first semiconductor laser 111 representing the first light source passes through beam splitter 120 representing a light mixing means, then, is stopped down by diaphragm 17, and is converged by objective lens 16 on image recording surface 22 through transparent base board 21 of the first optical disk 20.

A light flux modulated by information bit and reflected on information recording surface 22 passes again through objective lens 16 and diaphragm 17, then, enters beam splitter 12 and reflected there to be given astigmatism by cylindrical lens 180, and enters photo-detector 301 through concave lens 50, thus, signals of reading information recorded on the first optical disk 20 is obtained by using output signals.

Further, a light quantity change caused by a change in a shape of the spot and a change in position of the spot on photo-detector 301 is detected, and thereby, detection of focusing and track detection are conducted. Then, based on this detection, two-dimensional actuator (not shown) moves objective lens 16 so that a light flux emitted from the first semiconductor laser 111 may form images on recording surface 22 of the first optical disk 20, and moves the objective lens 16 so that a light flux emitted from semiconductor laser 111 may form images on the prescribed track.

A beam emitted from the second semiconductor laser 112 passes through beam splitter 120 representing a light mixing means and further passes through diaphragm 17 and objective lens 16 to be converged on information recording surface 22 through transparent base board 21 of the second optical disk 20.

A light flux modulated by information bit and reflected on information recording surface 22 passes again through objective lens 16 and diaphragm 17 and is reflected on beam splitter 120 to be given astigmatism by cylindrical lens 180, and enters photo-detector 301 through concave lens 50, thus, signals of reading information recorded on the second optical disk 20 is obtained by using output signals.

Further, it is arranged so that a light quantity change caused by a change in a shape of the spot and a change in position of the spot on photo-detector 302 is detected, and thereby, detection of focusing and track detection are conducted, and objective lens 160 is moved by two-dimensional actuator (not shown) for focusing and tracking.

As explained above, the invention makes it possible to correct, through a relatively simple structure, a change of spherical aberration caused by temperature changes even when using a material whose refractive index is changed by ambient temperature used, and to correct both a change of spherical aberration caused by wavelength fluctuation and a change of spherical aberration caused by fluctuation of refractive index of a material, even in the case of an optical system wherein a wavelength of a light source is changed by ambient temperature. It is therefore possible to obtain an objective lens that can be manufactured at low cost for an optical pickup apparatus, an optical pickup apparatus equipped with that objective lens, and a recording and reproducing apparatus equipped with that objective lens.

Disclosed embodiment can be varied by a skilled person without departing from the spirit and scope of the invention.

What is claimed is:

1. An optical pickup apparatus to conduct reproducing and/or recording information of an optical information recording medium, comprising:
   a light source to emit a light flux having a wavelength of $\lambda$ (nm);
   a converging optical system to converge the light flux emitted from the light source onto a information recording surface of the optical information recording medium, the converging optical system having an objective lens; and
   an optical detector to receive reflected light from the optical information recording medium; wherein the objective lens is a plastic lens, has a diffracting section on at least one surface thereof and satisfies the following conditional formula:

$$0.3 \leq \phi R/\phi \leq 1.5$$

where $\phi R$ represents a refracting power of the objective lens on wavelength $\lambda$ (nm) of the light source and $\phi$ represents a power of the objective lens in wavelength $\lambda$ nm of the light source.

2. The optical pickup apparatus of claim 1, wherein the following conditional formula is satisfied:

$$(\Delta SA2/\Delta\lambda1) \times (\Delta SA1/\Delta T) < 0 \text{ } \lambda\text{rms}^2/(°\text{ C.·nm})$$

where $\Delta SA2$ represents a fluctuation amount of third order axial spherical aberration of the objective lens for wavelength variation $\Delta\lambda1$ (nm) within a range of ±5 nm in wavelength $\lambda$ (nm) of a light source, and $\Delta SA1$ represents a fluctuation amount of third order axial spherical aberration of the objective lens for temperature variation $\Delta T$(° C.) within a range of 20° C. to 30° C. for ambient temperature, wherein a value of $(\Delta SA2/\Delta\lambda1)$ is under a constant temperature and a value of $(\Delta SA1/\Delta T)$ is under a constant wavelength.

3. The optical pickup apparatus of claim 2, wherein a numerical aperture NA of the objective lens at the optical information recording medium-side is not smaller than 0.58 and an image forming magnification mo1 of the objective lens is almost 0 (zero).

4. The optical pickup apparatus of claim 2, wherein the image forming magnification mo1 of the objective lens satisfies the following conditional formula:

$$-\tfrac{1}{2} \leq mo1 \leq -\tfrac{1}{7.5}$$

5. The optical pickup apparatus of claim 2, wherein the following conditional formula is satisfied:

$$\Delta SA2/\Delta\lambda1 < 0 \text{ } \lambda\text{rms/nm}$$

$$\Delta SA1/\Delta T > 0 \lambda\text{rms/° C.}$$

6. The optical pickup apparatus of claim 1, wherein the following conditional formula is satisfied:

$$|\Delta SA1/\Delta T| \leq 0.001 \text{ } \lambda\text{rms/° C.}$$

where $\Delta SA1$ represents a fluctuation amount of third order axial spherical aberration of the objective lens for temperature variation $\Delta T$(° C.) within a range of 20° C. to 30° C. for ambient temperature, wherein a value of $(\Delta SA1/\Delta T)$ is under a constant wavelength.

7. The optical pickup apparatus of claim 6, wherein the following conditional formula is satisfied:

$$|\Delta SA1/\Delta T| 0.004 \text{ } \lambda\text{rms/° C.}$$

8. The optical pickup apparatus of claim 6, wherein a numerical aperture NA of the objective lens at the optical information recording medium-side is not smaller than 0.58 and an image forming magnification mo1 of the objective lens is almost 0 (zero).

9. The optical pickup apparatus of claim 6, wherein the wavelength $\lambda$ (nm) of the light source is not larger than 680 (nm).

10. The optical pickup apparatus of claim 6, wherein a numerical aperture NA of the objective lens at the optical information recording medium-side is not smaller than 0.48 and smaller than 0.58, an image forming magnification mo1 of the objective lens is almost 0 (zero), and the following conditional formula is satisfied:

$$|\Delta SA1/\Delta T| \leq 0.0004 \text{ } \lambda\text{rms/° C.}$$

11. The optical pickup apparatus of claim 6, wherein a numerical aperture NA of the objective lens at the optical information recording medium-side is not smaller than 0.49, an image forming magnification mo1 of the objective lens satisfies the following conditional formula:

$-\frac{1}{2} \leq mo1 \leq -\frac{1}{7.5}$ and the following conditional formula is satisfied:

$|\Delta SA1/\Delta T| \leq 0.0005 \, \lambda\text{rms}/° \text{C}.$

12. The optical pickup apparatus of claim 11, wherein the objective lens is shiftable in a direction perpendicular to an optical axis thereof, a relative position between the objective lens and the light source is changeable and an astigmatism component of a wavefront aberration of a light flux which have been emitted from the light source and have passed through the objective lens becomes smallest at a position where the optical axis of the objective lens deviates from a center of the light flux of the light source.

13. The optical pickup apparatus of claim 11, wherein the following conditional formula is satisfied:

10 mm<U<40 mm where U is a distance of an optical path between the light source and a information recording surface of the optical information recording medium.

14. The optical pickup apparatus of claim 11, wherein the optical pickup apparatus is an optical pickup apparatus to conduct reproducing and/or recording information of a first information recording medium including a transparent base plate having a thickness of t1 and a second information recording medium including a transparent base plate having a thickness of t2 (t2<t1) and further comprises a second light source to emit a second light flux having a wavelength of $\lambda 2$ ($\lambda < \lambda 2$) in addition to the light source to emit the light flux having the wavelength of $\lambda$;

the converging optical system converges light flux emitted from the light source or the second light source onto an information recording surface of the first optical information recording medium or the second optical information recording medium;

the optical detector receives reflected light from the first optical information recording medium or the second optical information recording medium;

the NA is a numerical aperture of the objective lens at the first optical information recording medium-side and necessary to record or reproduce information in the first optical information recording medium with the light flux of the wavelength of $\lambda$;

the NA2 (NA2<NA) is a numerical aperture of the objective lens at the second optical information recording medium-side and necessary to record or reproduce information in the second optical information recording medium with the light flux of the wavelength of $\lambda 2$;

the mo1 is the image forming magnification when recording or reproducing information in the first optical information recording medium; and the following conditional formula is satisfied:

$NA \geq 0.56$ $-\frac{1}{5} \leq mo1 \leq -\frac{1}{7.5}$

15. The optical pickup apparatus of claim 14, wherein the following conditional formula is satisfied:

$|mo2-mo1>0.1$ where mo2 is a image forming magnification when recording or reproducing the second optical information recording medium.

16. The optical pickup apparatus of claim 1, wherein the following conditional formula is satisfied:

$0 \, \text{nm}/° \text{C} . < \Delta\lambda 2/\Delta T \leq 0.5 \, \text{nm}/° \text{C}.$ where $\Delta\lambda 2$ (nm) represents a wavelength variation amount of the light source for temperature variation $\Delta T(° \text{C}.)$ within a range of 20° C. to 30° C. of ambient temperature.

17. The optical pickup apparatus of claim 1, wherein the following conditional formula is satisfied:

$-0.002/° \text{C}. \leq \lambda n/\Delta T \leq -0.00005/° \text{C}.$ where $\Delta n$ represents a refractive index variation amount of the objective lens for temperature variation $\Delta T(° \text{C}.)$ within a range of 20° C. to 30° C. of ambient temperature.

18. The optical pickup apparatus of claim 17, wherein the following conditional formula is satisfied:

$-0.0002/° \text{C}. < \Delta n/\Delta T < -0.00005/° \text{C}.$

19. The optical pickup apparatus of claim 1, wherein the wavelength $\lambda$ of the light source and the numerical aperture NA of the objective lens at the optical information recording medium-side satisfy the following conditional formula:

$0.00015/\text{nm} \leq (NA)^4/\lambda \leq 40/\text{nm}$

20. The optical pickup apparatus of claim 1, wherein the wavelength $\lambda$ of the light source and the numerical aperture NA of the objective lens at the optical information recording medium-side satisfy the following conditional formula:

$10 \, \text{nm} \leq \lambda/NA \leq 1100 \, \text{nm}$

21. The optical pickup apparatus of claim 1, wherein the following conditional formula is satisfied:

$|\Delta SA2/\Delta\lambda 1| \leq 0.10 \, \lambda\text{rms}/\text{nm}$ where $\Delta SA2$ represents a fluctuation amount of third order axial spherical aberration of the objective lens for wavelength variation $\Delta\lambda 1$ nm within a range of ±5 nm in wavelength $\lambda$ nm of the light source, wherein $\Delta SA2/\Delta\lambda$ is a value under a constant temperature.

22. The optical pickup apparatus of claim 1, wherein the following conditional formula is satisfied:

$|\Delta f/\Delta\lambda 1| \leq 200$ where $\Delta f$ ($\mu$m) represents a focus position variation amount of the objective lens for wavelength variation $\Delta\lambda 1$ nm within a range of ±5 nm in wavelength $\lambda$ nm of the light source.

23. The optical pickup apparatus of claim 1, wherein at least one surface of the objective lens is an aspherical surface.

24. The optical pickup apparatus of claim 1, wherein the diffracting section is a plurality of ring-shaped bands in a form of concentric circles whose centers are mostly on an optical axis of the objective lens, and an optical path difference function showing a position of each of the plurality of ring-shaped bands includes at least $6^{th}$ power term of power series.

25. The optical pickup apparatus of claim 1, wherein the objective lens is a single lens.

26. The optical pickup apparatus of claim 1, wherein the following conditional formula is satisfied:

$1.0 \leq r1/\{(n-1) \cdot fR\} \leq 1.2$ where r1 (mm) represents an axial radius of curvature on the base surface of the objective lens at an opposite side to an optical information recording medium-side, n represents a refractive index of the objective lens and fR (mm) represents a focal length for refraction of the objective lens.

27. The optical pickup apparatus of claim 1, wherein the objective lens is made of either one of polyolefin resin, norbornane resin and fluorine resin.

28. The optical pickup apparatus of claim 1, wherein an axial spherical aberration change amount caused by ambient temperature variation is corrected by making at least one surface of the objective lens to be an aspherical surface and a spherical aberration is corrected by providing a diffracting section on at least one surface of the objective lens.

29. The optical pickup apparatus of claim 1, wherein when a numerical aperture of the objective lens at the optical information recording medium-side necessary to conduct recording and reproducing the optical information recording medium with the light flux of the wavelength λ is NA, and when a light flux which is emitted from the light source under ambient temperature of 20° C. to 30° C., is inside of NA and is converged on a information recording surface of the optical information recording medium, an absolute value of a third order axial spherical aberration is not larger than 0.07 λrms.

30. The optical pickup apparatus of claim 1, wherein the optical pickup apparatus is an optical pickup apparatus to conduct reproducing and/or recording information of a first information recording medium including a transparent base plate having a thickness of t1 and a second information recording medium including a transparent base plate having a thickness of t2 (t2>t1) and further comprises a second light source to emit a second light flux having a wavelength of λ2 (λ<λ2) in addition to the light source to emit the light flux having the wavelength of λ;

the converging optical system converges light flux emitted from the light source or the second light source onto an information recording surface of the first optical information recording medium or the second optical information recording medium; and the optical detector receives reflected light from the first optical information recording medium or the second optical information recording medium, wherein the optical pickup apparatus conducts recording and/or reproducing information of the first optical information recording medium by using the light flux having the wavelength of λ and conducts recording and/or reproducing information of the second optical information recording medium by using the light flux having the wavelength of λ2.

31. The optical pickup apparatus of claim 30, wherein a numerical aperture of the objective lens at the first optical information recording medium-side necessary to record or reproduce information in the first optical information recording medium with the light flux of the wavelength of λ is NA and a numerical aperture of the objective lens at the second optical information recording medium-side necessary to record or reproduce information in the second optical information recording medium with the light flux of the wavelength of λ2 is NA2 (NA2<NA), and wherein when a light flux which is emitted from the light source under ambient temperature of 20° C. to 30° C., is inside of NA and is converged on a information recording surface of the first optical information recording medium, an absolute value of a third order axial spherical aberration is not larger than 0.07 λrms, and when a light flux which is emitted from the second light source under ambient temperature of 20° C. to 30° C., is inside of NA2 and is converged on a information recording surface of the second optical information recording medium, an absolute value of a third order axial spherical aberration is not larger than 0.07 λrms.

32. An objective lens for use in an optical pickup apparatus to conduct reproducing and/or recording information of an optical information recording medium, comprising lens surfaces; and a diffracting section;

wherein the lens is a plastic lens, the diffracting section is provided on at least one of the lens surfaces and the following conditional formula is satisfied:

$$0.3 \leq \phi R/\phi \leq 1.5$$

where $\phi R$ represents a refracting power of the objective lens on wavelength λ (nm) of the light source and $\phi$ represents a power of the objective lens in wavelength λ nm of the light source.

33. The objective lens of claim 32, wherein the following conditional formula is satisfied:

$$(\Delta SA2/\Delta\lambda1) \times (\Delta SA1/\Delta T) < 0 \ \lambda\text{rms}^2/(°\text{C.}\cdot\text{nm})$$

where $\Delta SA2$ represents a fluctuation amount of third order axial spherical aberration of the objective lens for wavelength variation Δλ1 (nm) within a range of ±5 nm in wavelength λ (nm) of a light source, and ΔSA1 represents a fluctuation amount of third order axial spherical aberration of the objective lens for temperature variation ΔT(° C.) within a range of 20° C. to 30° C. for ambient temperature, wherein a value of (ΔSA2/Δλ1) is under a constant temperature and a value of (ΔSA1/ΔT) is under a constant wavelength.

34. The objective lens of claim 32, wherein the following conditional formula is satisfied:

$$|\Delta SA1/\Delta T| \leq 0.001 \ \lambda\text{rms}/°\text{C.}$$

where ΔSA1 represents a fluctuation amount of third order axial spherical aberration of the objective lens for temperature variation ΔT(° C.) within a range of 20° C. to 30° C. for ambient temperature, wherein a value of (ΔSA1/ΔT) is under a constant wavelength).

35. A recording and/or reproducing apparatus to conduct reproducing and recording information of an optical information recording medium, comprising:

an optical pickup apparatus, comprising:

a light source to emit a light flux having a wavelength of λ (nm);

a converging optical system to converge the light flux emitted from the light source onto a information recording surface of the optical information recording medium, the converging optical system having an objective lens; and an optical detector to receive reflected light from the optical information recording medium; wherein the objective lens is a plastic lens, has a diffracting section on at least one surface thereof and satisfies the following conditional formula:

$$0.3 \leq \phi R/\phi \leq 1.5$$

where $\phi R$ represents a refracting power of the objective lens on wavelength λ (nm) of the light source and $\phi$ represents a power of the objective lens in wavelength λ nm of the light source.

* * * * *

UNITED STATES PATENT AND TRADEMARK OFFICE
CERTIFICATE OF CORRECTION

PATENT NO. : 6,366,542 B1
DATED : April 2, 2002
INVENTOR(S) : Toshiyuki Kojima and Norikazu Arai It is certified that error appears in the above-identified patent and that said Letters Patent is hereby corrected as shown below:

<u>Column 78,</u>
Formula on line 45, before "0.004" insert -- $\leq$ --.

<u>Column 79,</u>
Formula on line 64, ">" should read -- < --.

<u>Column 80,</u>
Formula on line 11, "$\lambda n$" should read -- $\Delta n$ --.

<u>Column 82,</u>
Line 42, after "wavelength" delete ")".

Signed and Sealed this

Twelfth Day of November, 2002

JAMES E. ROGAN
Director of the United States Patent and Trademark Office

Attest:

Attesting Officer